(12) United States Patent
Wexler et al.

(10) Patent No.: US 10,821,657 B2
(45) Date of Patent: Nov. 3, 2020

(54) SYSTEMS AND METHODS FOR LINER BRAIDING AND RESIN APPLICATION

(71) Applicant: Other Lab, LLC, San Francisco, CA (US)

(72) Inventors: Jason Stein Wexler, San Francisco, CA (US); Kevin Kai Morris, Tiburon, CA (US); Rustie Nate McCumber, Oakland, CA (US)

(73) Assignee: OTHER LAB, LLC, San Francisco, CA (US)

( * ) Notice: Subject to any disclaimer, the term of this patent is extended or adjusted under 35 U.S.C. 154(b) by 629 days.

(21) Appl. No.: 15/627,814

(22) Filed: Jun. 20, 2017

(65) Prior Publication Data

US 2017/0291328 A1    Oct. 12, 2017

Related U.S. Application Data

(63) Continuation of application No. 15/368,182, filed on Dec. 2, 2016.

(Continued)

(51) Int. Cl.
*B29C 63/06* (2006.01)
*B29C 63/04* (2006.01)
(Continued)

(52) U.S. Cl.
CPC ............ *B29C 63/06* (2013.01); *B29B 15/122* (2013.01); *B29C 63/04* (2013.01); *B29C 63/105* (2013.01);
(Continued)

(58) Field of Classification Search
CPC ....... B29C 63/04; B29C 63/06; B29C 63/105; B29C 53/56; B29C 53/566; F17C 1/00; F17C 1/06
(Continued)

(56) References Cited

U.S. PATENT DOCUMENTS 2,025,038 A    12/1935 Cannon
2,380,372 A    7/1945 Alderfer
(Continued)

FOREIGN PATENT DOCUMENTS

CA    2636100 A1    12/2009
CN    1036534 A     10/1989
(Continued)

OTHER PUBLICATIONS

Machine translation of JP 2005337272 date unknown.*
(Continued)

*Primary Examiner* — John L Goff, II
(74) *Attorney, Agent, or Firm* — Davis Wright Tremaine LLP

(57) ABSTRACT

A method of selecting a braid configuration for a braided liner. The method includes calculating a size ratio based on the smallest first diameter and the largest second diameter of the liner and selecting a braid material having a tensile strength. The method further includes calculating a strength ratio based on the tensile strength of the braid material and a selected target strength threshold for the braided liner and determining an optimal braid angle for the smallest first diameter portions of the liner based on the calculated size ratio.

19 Claims, 31 Drawing Sheets

Related U.S. Application Data

(60) Provisional application No. 62/262,101, filed on Dec. 2, 2015.

(51) Int. Cl.
*B29C 63/10* (2006.01)
*F17C 1/06* (2006.01)
*B29B 15/12* (2006.01)
*F17C 1/00* (2006.01)
B29L 31/08 (2006.01)
B29C 53/08 (2006.01)
B29K 105/08 (2006.01)
B29L 31/00 (2006.01)

(52) U.S. Cl.
CPC .................. *F17C 1/00* (2013.01); *F17C 1/06* (2013.01); *B29C 53/083* (2013.01); *B29K 2105/08* (2013.01); *B29L 2031/085* (2013.01); *B29L 2031/712* (2013.01); *F17C 2201/0138* (2013.01); *F17C 2201/056* (2013.01); *F17C 2201/058* (2013.01); *F17C 2203/0619* (2013.01); *F17C 2203/0663* (2013.01); *F17C 2205/0111* (2013.01); *F17C 2205/0332* (2013.01); *F17C 2209/2154* (2013.01); *F17C 2221/033* (2013.01); *F17C 2223/0123* (2013.01); *F17C 2223/036* (2013.01); *F17C 2260/017* (2013.01); *F17C 2260/018* (2013.01); *F17C 2270/0168* (2013.01); *F17C 2270/0178* (2013.01); *Y02P 70/523* (2015.11)

(58) Field of Classification Search
USPC .................................................. 156/148, 149
See application file for complete search history.

(56) References Cited

U.S. PATENT DOCUMENTS

| | | |
|---|---|---|
| 3,579,402 A | 5/1971 | Goldsworthy |
| 3,643,813 A | 2/1972 | Noonan |
| 4,139,019 A | 2/1979 | Bresie et al. |
| 4,253,454 A | 3/1981 | Warncke |
| 4,432,302 A | 2/1984 | Farris et al. |
| 4,901,870 A | 2/1990 | Wright et al. |
| 4,932,403 A | 6/1990 | Scholley |
| 5,036,845 A | 8/1991 | Scholley |
| 5,040,933 A | 8/1991 | Lee et al. |
| 5,123,547 A | 6/1992 | Koch |
| 5,127,307 A | 7/1992 | Pimpis |
| 5,653,358 A | 8/1997 | Sneddon |
| 5,830,400 A | 11/1998 | Huvey et al. |
| 5,839,383 A | 11/1998 | Stenning et al. |
| 6,047,860 A | 4/2000 | Sanders |
| 6,116,464 A | 9/2000 | Sanders |
| 6,293,590 B1 | 9/2001 | Ogasa |
| 6,453,920 B1 | 9/2002 | Izuchukwu et al. |
| 6,494,497 B1 | 12/2002 | Kertesz |
| 6,513,523 B1 | 2/2003 | Izuchukwu et al. |
| 6,527,075 B1 | 3/2003 | Izuchukwu et al. |
| 6,579,401 B1 | 6/2003 | Izuchukwu et al. |
| 6,676,159 B1 | 1/2004 | Sellergren |
| 7,080,864 B2 | 7/2006 | Casteran |
| 7,494,308 B2 | 2/2009 | Chun |
| 7,757,727 B2 | 7/2010 | Handa |
| 8,308,407 B2 | 11/2012 | Praud |
| 9,217,538 B2 | 12/2015 | Griffith et al. |
| 9,279,541 B2 | 3/2016 | Cohen |
| 9,850,852 B2 | 12/2017 | Kondogiani et al. |
| 10,219,621 B2 | 3/2019 | Wilhelmsen |
| 10,472,145 B2 | 11/2019 | Lu |
| 2004/0145091 A1 | 7/2004 | Willig et al. |
| 2004/0216656 A1 | 11/2004 | Fitzpatrick et al. |
| 2004/0250871 A1 | 12/2004 | Bingham et al. |
| 2004/0256016 A1 | 12/2004 | Arima et al. |
| 2005/0205137 A1 | 9/2005 | Pouchkarev |
| 2006/0006645 A1 | 1/2006 | Mukawa et al. |
| 2007/0075085 A1 | 4/2007 | Arnold et al. |
| 2007/0221281 A1 | 9/2007 | Takagi |
| 2008/0098562 A1 | 5/2008 | Tagliaferri et al. |
| 2009/0308475 A1 | 12/2009 | Stringfellow et al. |
| 2010/0075200 A1 | 3/2010 | Hatta |
| 2011/0041518 A1 | 2/2011 | Peterson et al. |
| 2012/0161434 A1 | 6/2012 | Wells |
| 2013/0092311 A1 | 4/2013 | Kobayashi |
| 2013/0092561 A1 | 4/2013 | Wellnitz |
| 2013/0125740 A1 | 5/2013 | Kang et al. |
| 2013/0154257 A1 | 6/2013 | Ault |
| 2013/0299503 A1 | 11/2013 | Griffith et al. |
| 2014/0305951 A1 | 10/2014 | Griffith et al. |
| 2015/0034233 A1 | 2/2015 | Hatta et al. |
| 2015/0048095 A1 | 2/2015 | Sanders |
| 2015/0177172 A1 | 6/2015 | Upasani et al. |
| 2015/0308621 A1 | 10/2015 | Mathison |
| 2016/0018057 A1 | 1/2016 | Griffith et al. |
| 2016/0363265 A1 | 12/2016 | Griffith et al. |
| 2017/0145961 A1 | 5/2017 | Myers et al. |
| 2017/0159862 A1 | 6/2017 | Vizzarri |
| 2018/0029465 A1 | 2/2018 | Abd Elhamid et al. |
| 2018/0080609 A1 | 3/2018 | Abd Elhamid et al. |
| 2018/0111302 A1 | 4/2018 | Kondogiani et al. |
| 2019/0264839 A1 | 8/2019 | Powell et al. |

FOREIGN PATENT DOCUMENTS

| | | |
|---|---|---|
| CN | 1231639 A | 10/1999 |
| CN | 2416338 Y | 1/2001 |
| CN | 1306173 A | 8/2001 |
| CN | 2542907 Y | 4/2003 |
| CN | 1518511 A | 8/2004 |
| EP | 0767338 A2 | 4/1997 |
| EP | 2404872 A1 | 1/2012 |
| EP | 3141793 A1 | 3/2017 |
| JP | 2005-265138 A | 9/2005 |
| JP | 2005337272 A * | 12/2005 |
| JP | 2010-167695 A | 8/2010 |
| RU | 42863 U1 | 12/2004 |
| RU | 81568 U1 | 3/2009 |
| RU | 2426024 C2 | 8/2011 |
| RU | 141427 U1 | 6/2014 |
| WO | 9012982 A1 | 11/1990 |
| WO | 9814362 A1 | 4/1998 |
| WO | 200195967 A1 | 12/2001 |
| WO | 2001095966 A1 | 12/2001 |
| WO | 0239010 A2 | 5/2002 |
| WO | 2008081401 A1 | 7/2008 |
| WO | 2010107317 A1 | 9/2010 |
| WO | 2013056785 A2 | 4/2013 |
| WO | 2013166452 A1 | 11/2013 |
| WO | 2014123928 A1 | 8/2014 |

OTHER PUBLICATIONS

Guyader et al., "Analysis of 2D and 3D circular braiding processes: Modeling the interaction between the process parameters and preform architecture", 2013.*

DeMiguel et al., "The role of initial tank temperature on refuelling of on-board hydrogen tanks," Nov. 20, 2015, available online Apr. 22, 2016, retrieved Jul. 18, 2019, from https://www.sciencedirect.com/science/article/pii/S0360319915315391, 10 pages.

Reddi et al., "Impact of hydrogen SAE J2601 fueling methods on fueling time of light-duty fuel cell electric vehicles," May 16, 2017, retrieved Jul. 18, 2019, from https://www.osti.gov/servlets/purl/1389635, 23 pages.

Schneider, "SAE J2601—Worldwide Hydrogen Fueling Protocol: Status, Standardization & Implementation," Jul. 10, 2012, retrieved Jul. 18, 2019, from https://ww2.energy.ca.gov/contracts/notices/2012-07-10_workshop/presentations/SAE_Jesse_Schneider_Fueling_Protocol.pdf, 32 pages.

U.S. Appl. No. 13/887,201, filed May 3, 2013.

(56) References Cited

OTHER PUBLICATIONS

U.S. Appl. No. 14/172,831, filed Feb. 4, 2014.
U.S. Appl. No. 15/183,614, filed Jun. 15, 2016.
U.S. Appl. No. 14/624,370, filed Feb. 17, 2015.
U.S. Appl. No. 15/232,355, filed Aug. 9, 2016.
U.S. Appl. No. 15/368,182, filed Dec. 2, 2016.
U.S. Appl. No. 15/792,090, filed Oct. 24, 2017.
U.S. Appl. No. 15/940,793, filed Mar. 29, 2018.
U.S. Appl. No. 15/940,862, filed Mar. 29, 2018.
Extended European Search Report issued in EP Patent Application No. 16871653.8, dated Oct. 25, 2018, six pages.
International Search Report and Written Opinion dated Aug. 27, 2013, International Patent Application No. PCT/US2013/039565, filed May 3, 2013, 13 pages.
International Search Report and Written Opinion dated Feb. 21, 2018, International Patent Application No. PCT/US2017/058068, filed Oct. 24, 2017, 8 pages.
International Search Report and Written Opinion dated Jun. 21, 2018, International Patent Application No. PCT/US2018/025280, filed Mar. 29, 2018, 7 pages.
International Search Report and Written Opinion dated Jun. 28, 2018, International Patent Application No. PCT/US2018/025283, filed Mar. 29, 2018, 8 pages.
International Search Report and Written Opinion dated Mar. 16, 2017, International Patent Application No. PCT/US2016/064796, filed Dec. 2, 2016, six pages.
International Search Report and Written Opinion dated Mar. 23, 2017, International Patent Application No. PCT/US2016/037633, eight pages.
International Search Report and Written Opinion dated May 14, 2014, International Patent Application No. PCT/US2014/014729, filed Feb. 4, 2014, 11 pages.
Supplementary European Search Report issued in EP Patent Application No. 13784302.5, dated Nov. 24, 2015, 11 pages.

* cited by examiner

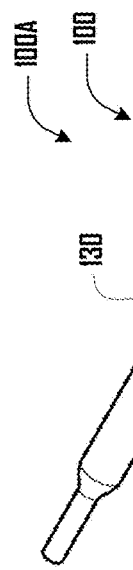
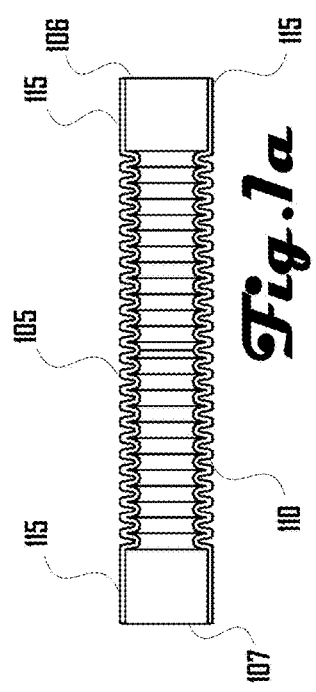
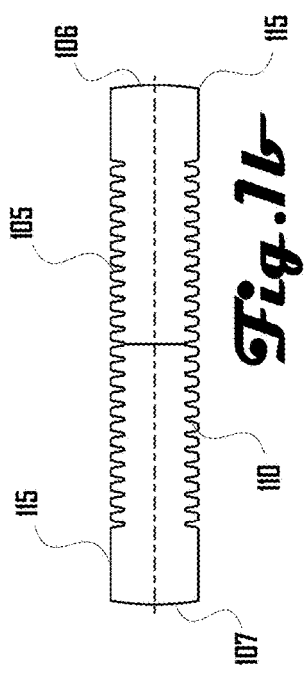
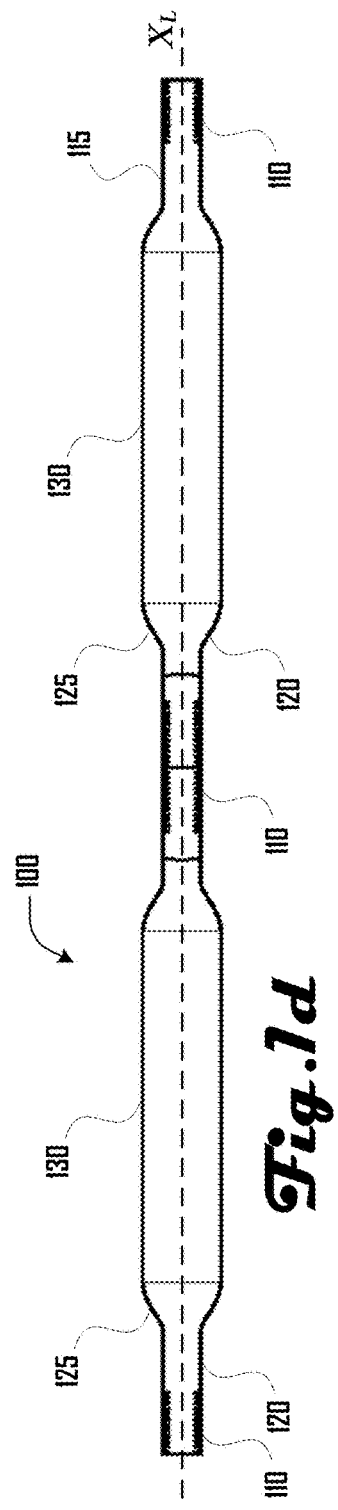

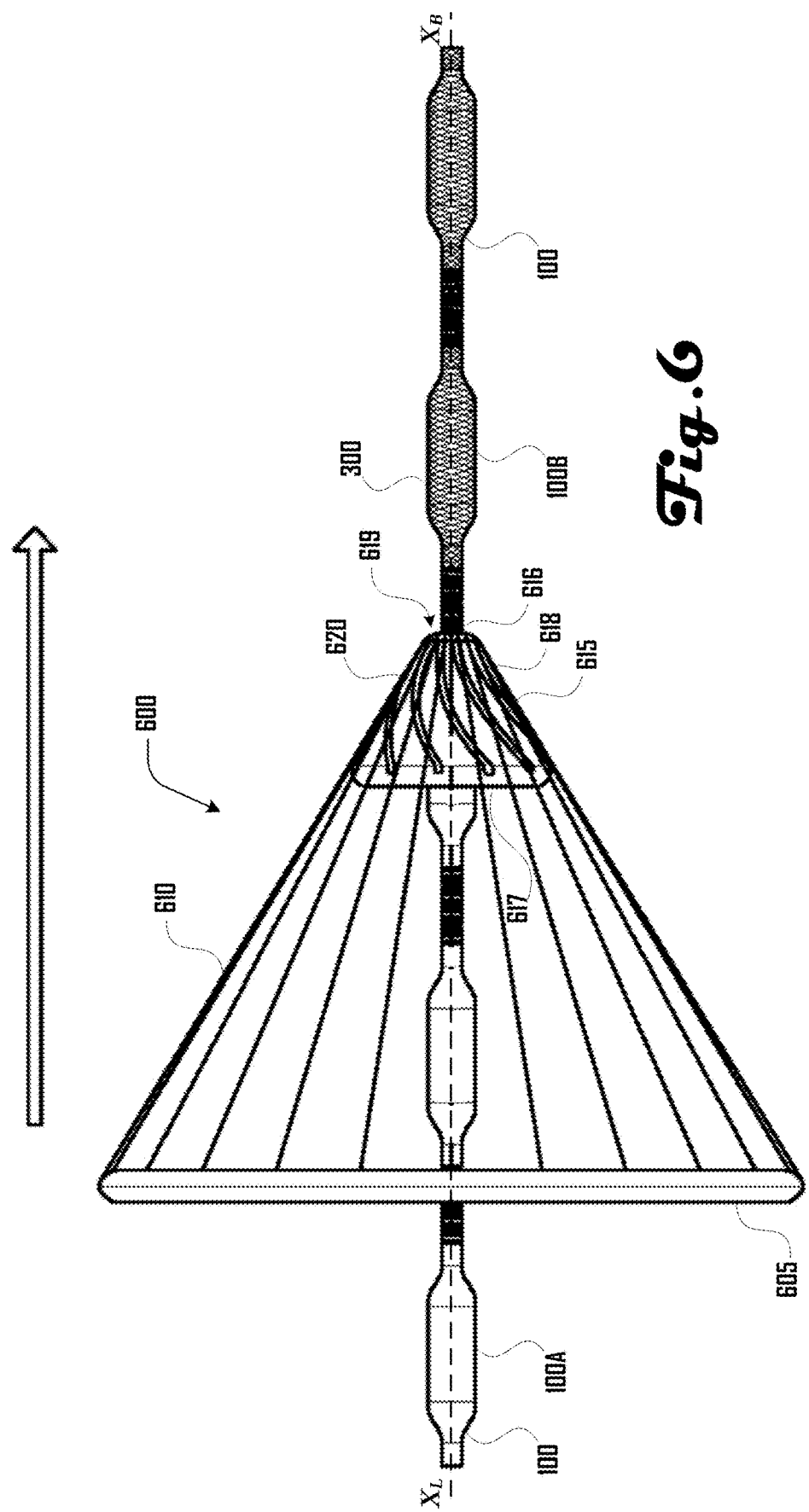

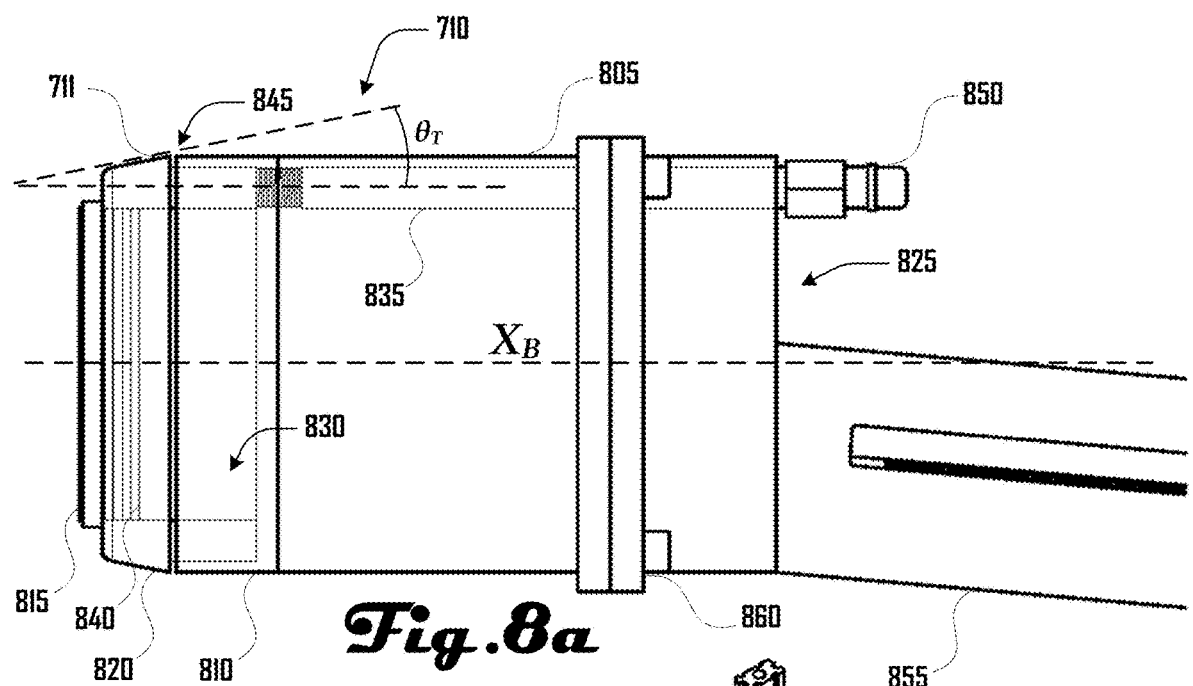
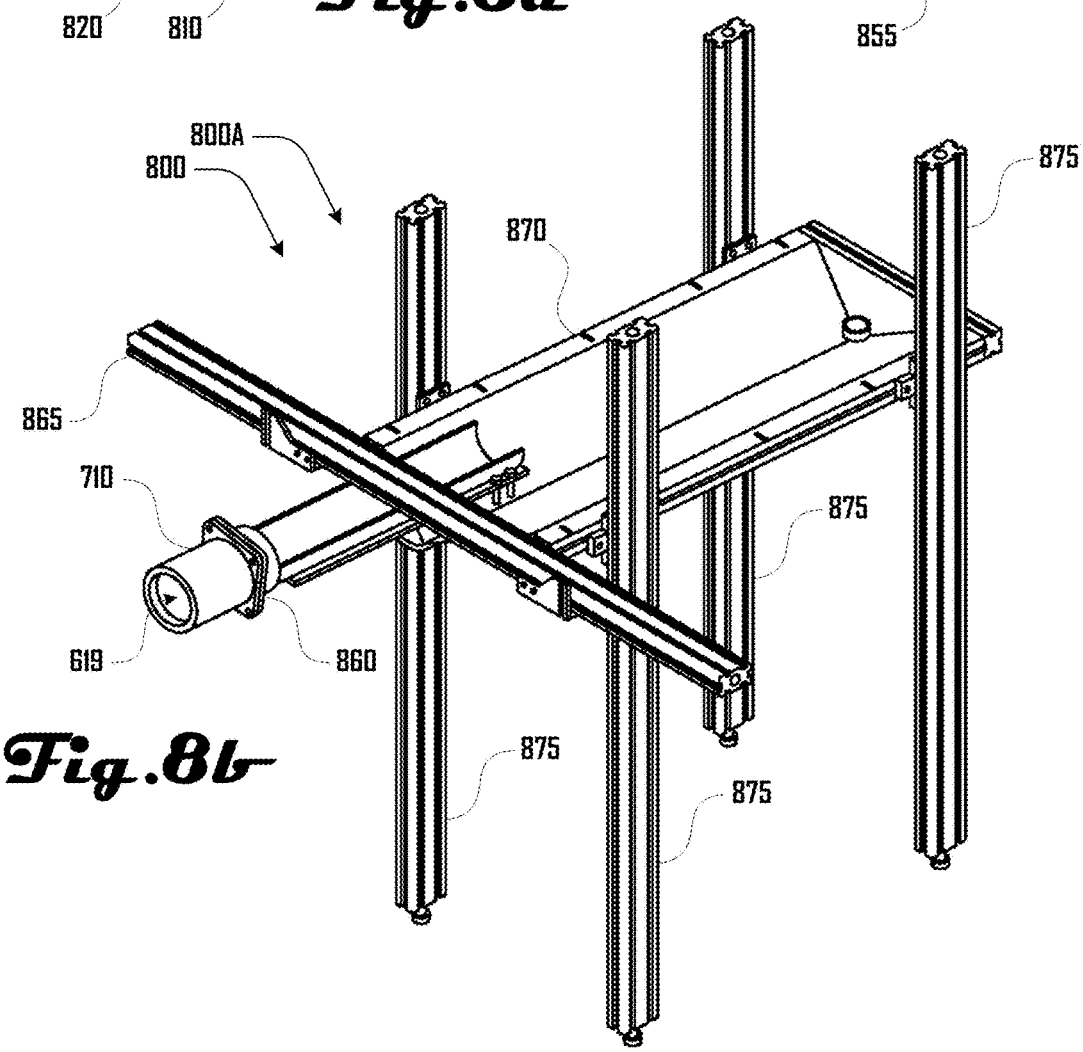

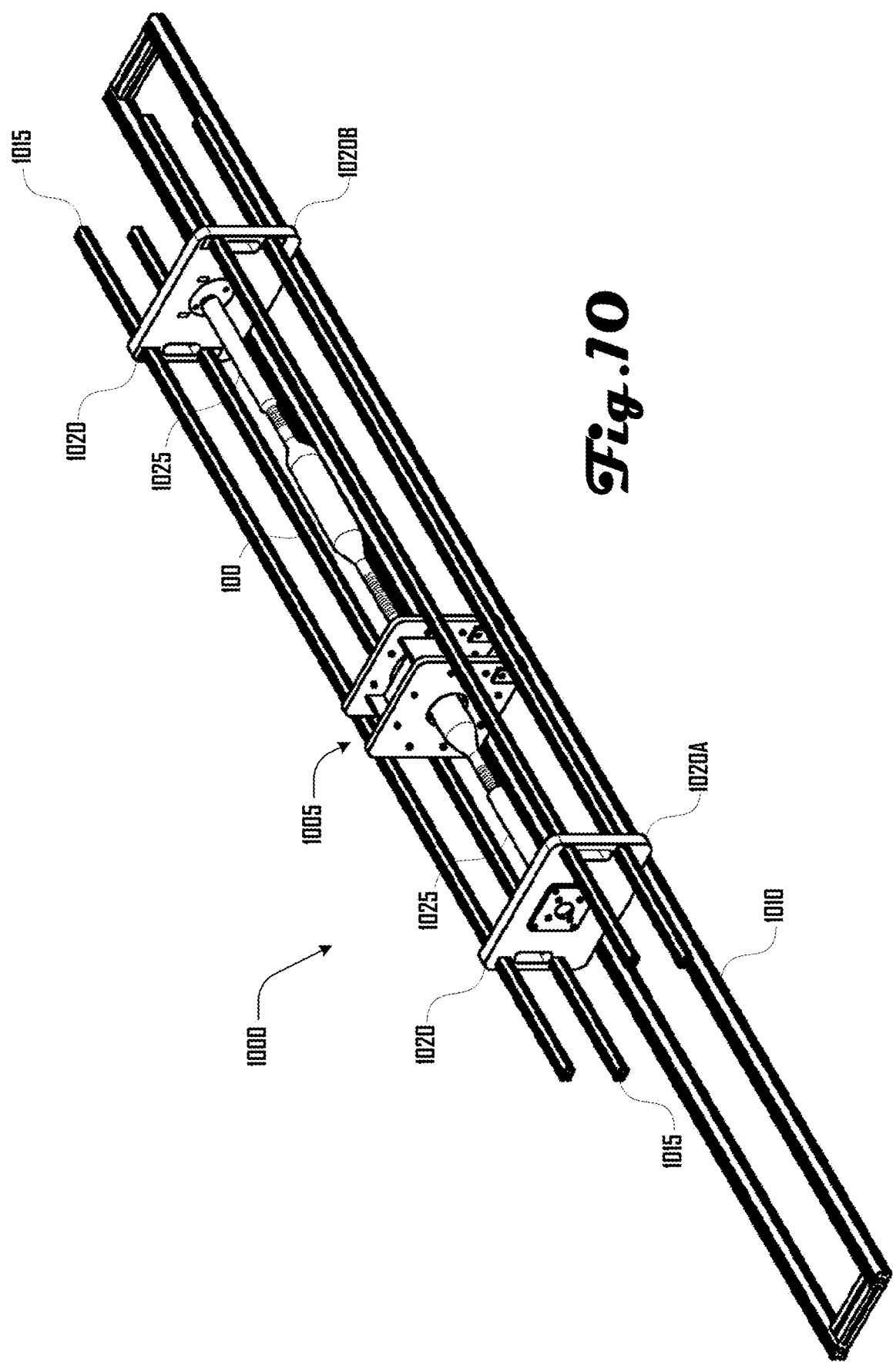

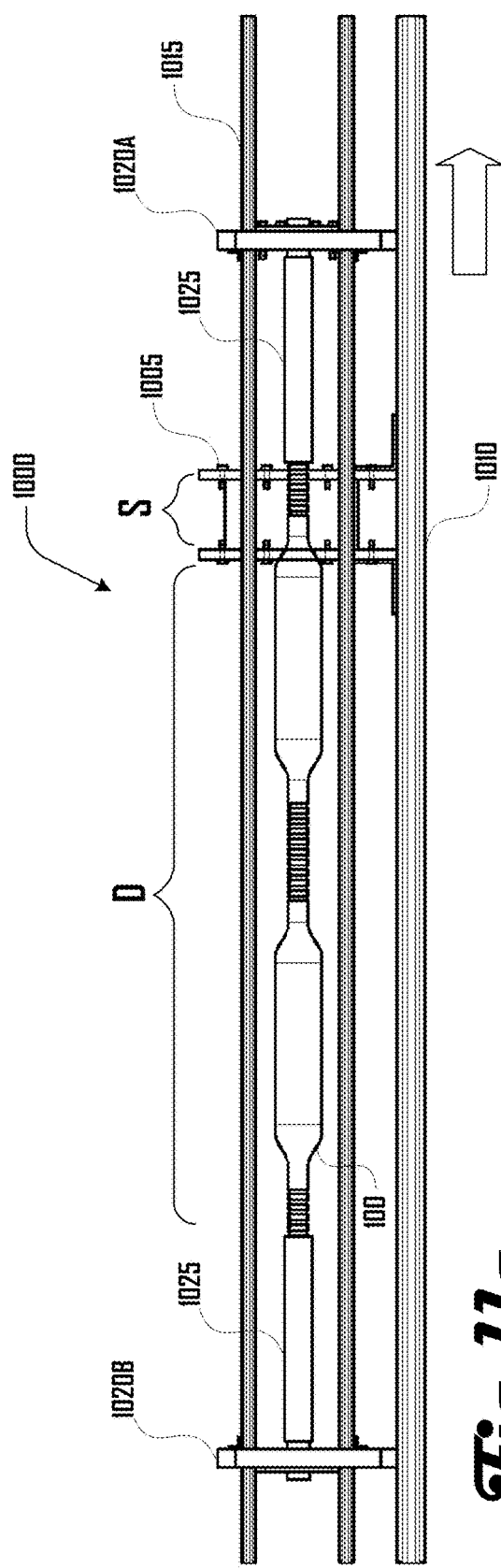
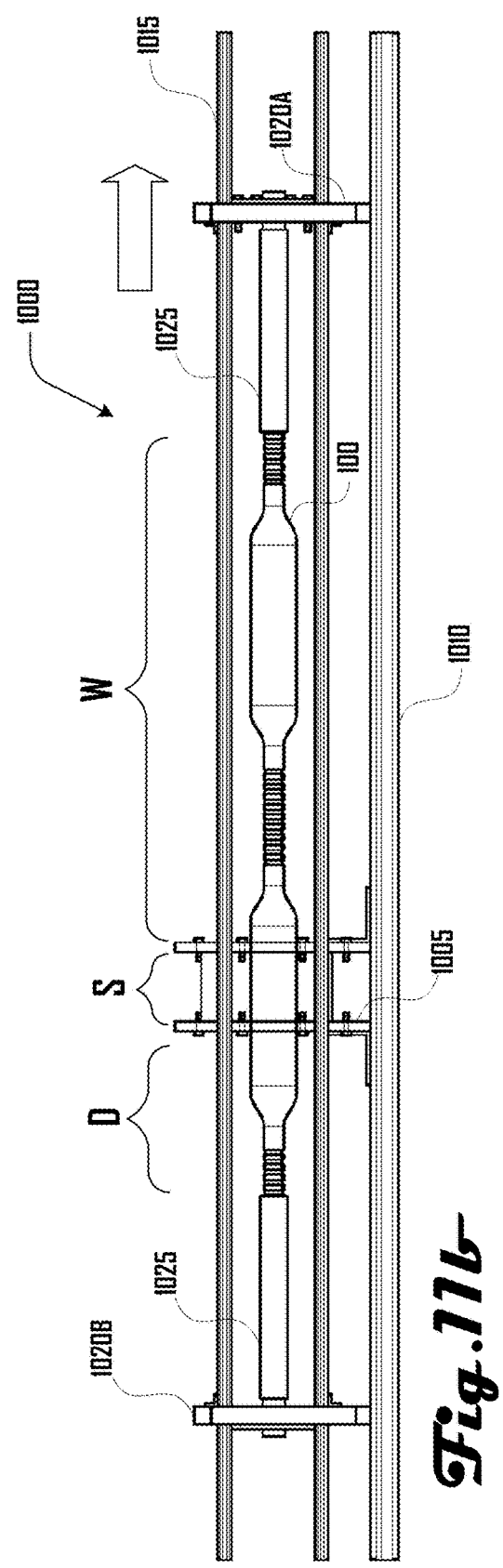

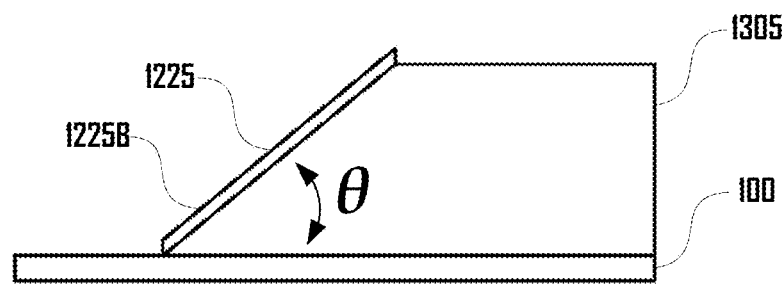
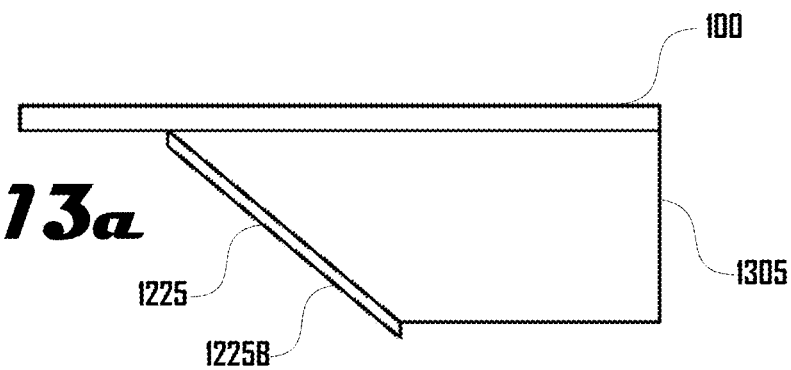
Fig.13a
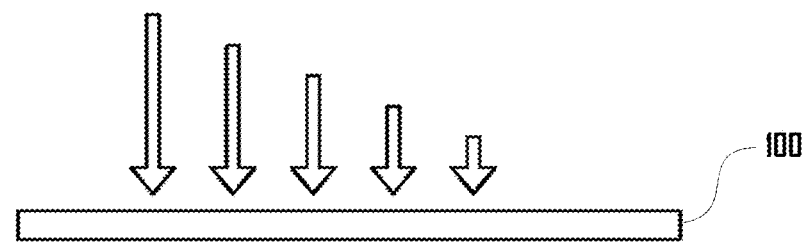
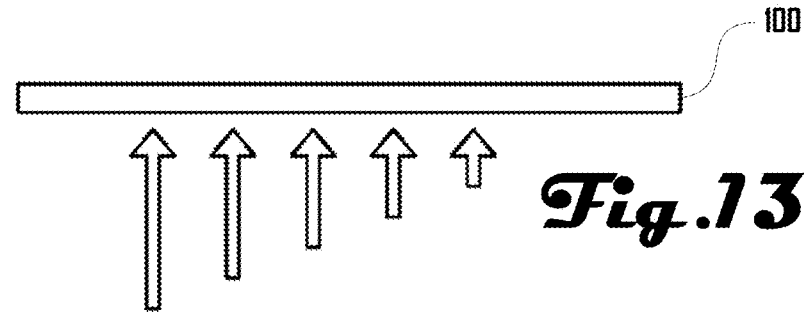
Fig.13b

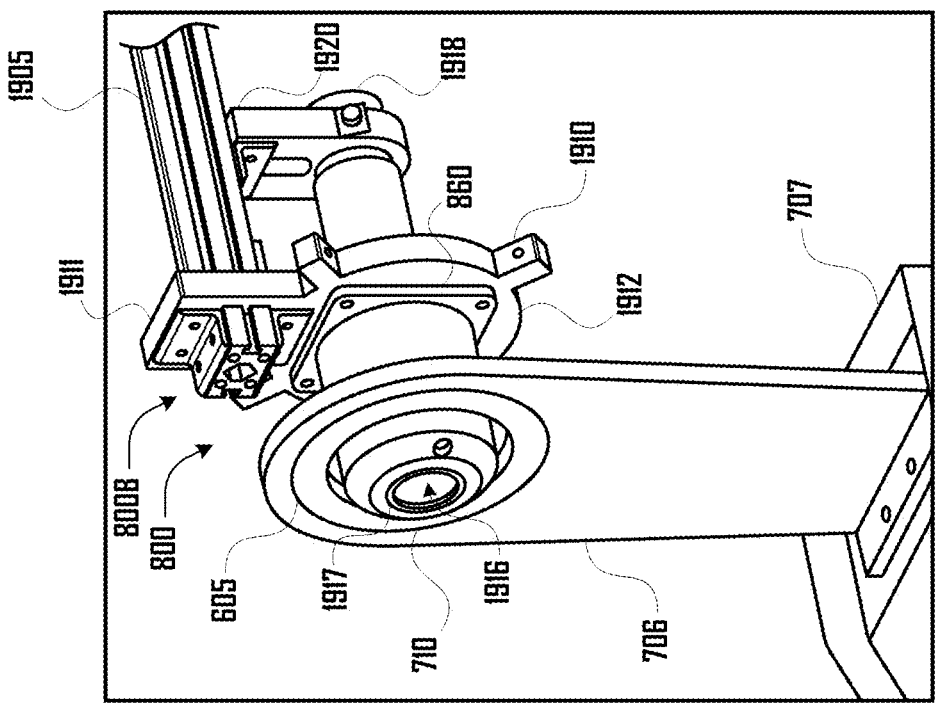
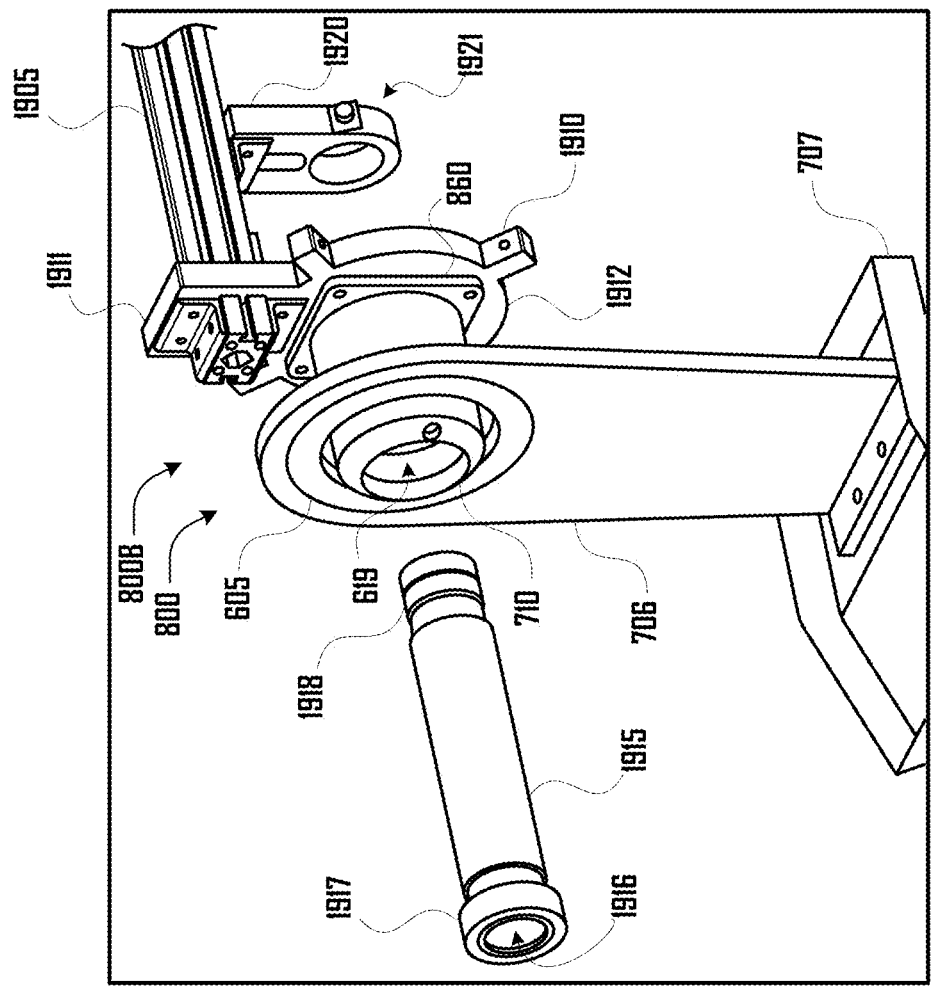

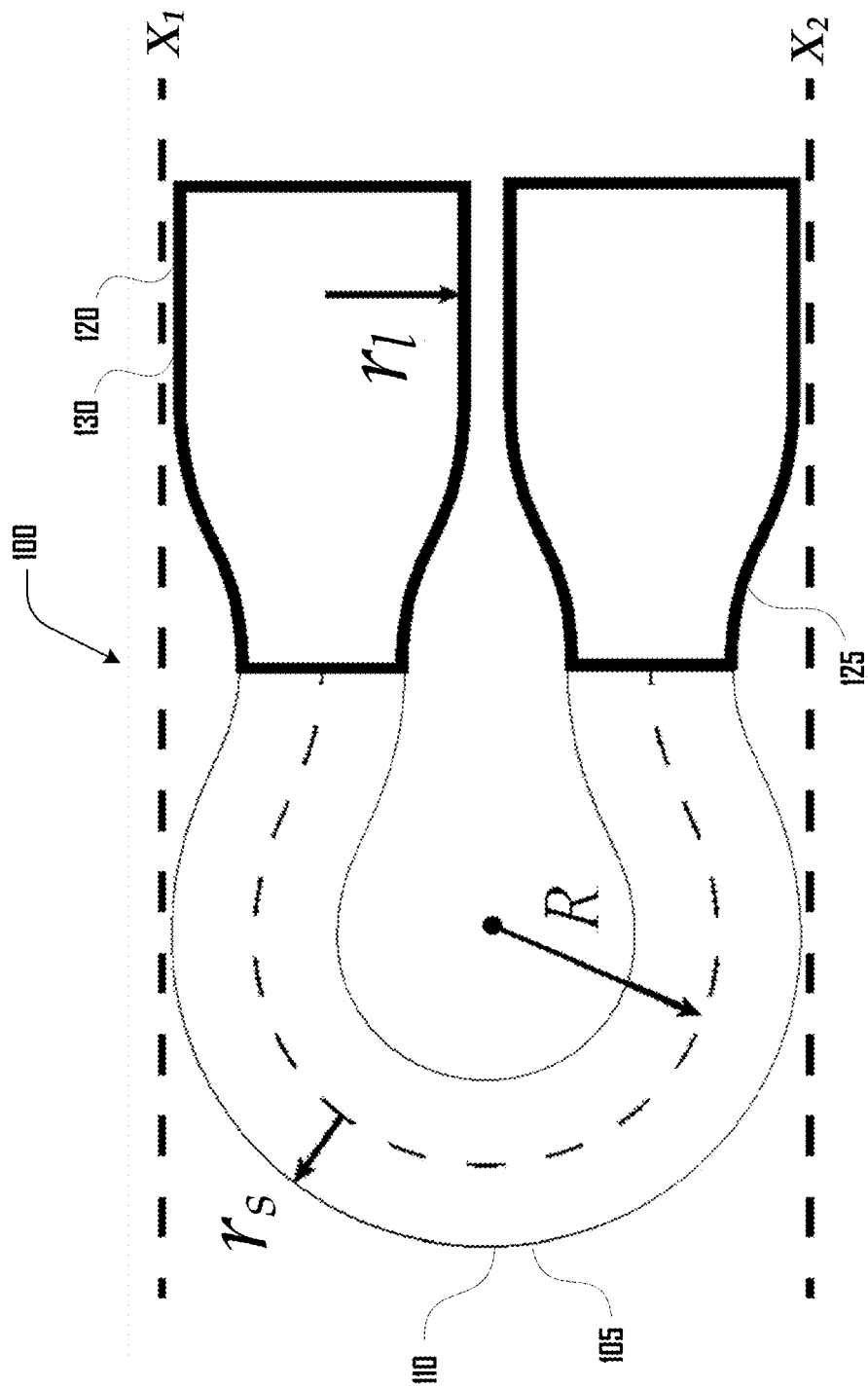

SYSTEMS AND METHODS FOR LINER BRAIDING AND RESIN APPLICATION

CROSS-REFERENCE TO RELATED APPLICATIONS

This application is a continuation of, and claims priority to, U.S. non-provisional application Ser. No. 15/368,182 entitled SYSTEMS AND METHODS FOR LINER BRAIDING AND RESIN APPLICATION, filed Dec. 2, 2016, which claims priority to U.S. Provisional Patent Application No. 62/262,101 entitled SYSTEMS AND METHODS FOR LINER BRAIDING AND RESIN APPLICATION, filed Dec. 2, 2015, which applications are incorporated herein by reference in their entirety and for all purposes.

This invention was made with Government support under DE-AR0000255 awarded by the US DOE. The Government has certain rights in this invention.

This application is related to U.S. Provisional Patent Application No. 62/412,044 entitled FITTINGS FOR COMPRESSED GAS STORAGE VESSELS, filed Oct. 24, 2016, which is incorporated herein by reference in its entirety and for all purposes.

This application is related to U.S. Non-Provisional patent application Ser. No. 14/624,370 entitled COILED NATURAL GAS STORAGE SYSTEM AND METHOD, filed Feb. 17, 2015, now abandoned, which is incorporated herein by reference in its entirety and for all purposes.

This application is related to U.S. Non-Provisional patent application Ser. No. 14/172,831 entitled NATURAL GAS INTESTINE PACKED STORAGE TANK, filed Feb. 4, 2014, now U.S. Pat. No. 10,088,101, which is incorporated herein by reference in its entirety and for all purposes.

This application is related to U.S. Non-Provisional patent application Ser. No. 13/887,201 entitled CONFORMABLE NATURAL GAS STORAGE, filed May 3, 2013, now U.S. Pat. No. 9,217,538, which is incorporated herein by reference in its entirety and for all purposes.

This application is related to U.S. Provisional Patent Application No. 61/642,388 entitled CONFORMING ENERGY STORAGE, filed May 3, 2012, which is incorporated herein by reference in its entirety and for all purposes.

This application is related to U.S. Provisional Patent Application No. 61/766,394 entitled NATURAL GAS INTESTINE PACKED STORAGE TANK, filed Feb. 19, 2013, which is incorporated herein by reference in its entirety and for all purposes.

This application is related to U.S. Provisional Patent Application No. 62/175,914 entitled SYSTEM AND METHOD FOR A CONFORMABLE PRESSURE VESSEL, filed Jun. 15, 2015, which is incorporated herein by reference in its entirety and for all purposes.

BRIEF DESCRIPTION OF THE DRAWINGS

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

FIGS. 1a, 1b, 1c and 1d illustrate a bare liner comprising a body having connector portions, taper portions and tubing portions in accordance with some example embodiments.

FIG. 6 illustrates an example embodiment of a tank being over-braided by a braiding machine and resin being applied to fibers that form the braid via grooves of a resin cone.

FIG. 8a illustrates a side view of a resin applicator in accordance with an embodiment.

FIG. 8b illustrates a resin applicator and an associated support architecture in accordance with an embodiment.

FIG. 10 illustrates an example embodiment of a resin application system configured to apply resin to a tank.

FIGS. 11a and 11b illustrate example configurations of a resin application system where a tank is being drawn through a resin chamber.

FIG. 12a illustrates a close-up perspective view of a resin chamber in accordance with one embodiment and FIG. 12b illustrates an exploded perspective view of the resin chamber of FIG. 12a.

FIG. 13a illustrates a cross-sectional side view of a tank passing through a squeegee sheet with resin on one side of the squeegee sheet in accordance with an embodiment.

FIG. 13b illustrates one example resin impregnation gradient that can be generated by a squeegee sheet, which can be variable based on an angle of the squeegee sheet.

FIGS. 19a and 19b illustrate an example embodiment of a support architecture and resin applicator of a braiding machine configured to hold a constraint tube.

FIG. 23 illustrates an example bend geometry of a tank in accordance with some embodiments.

DETAILED DESCRIPTION OF THE PREFERRED EMBODIMENTS

Figure 5A:
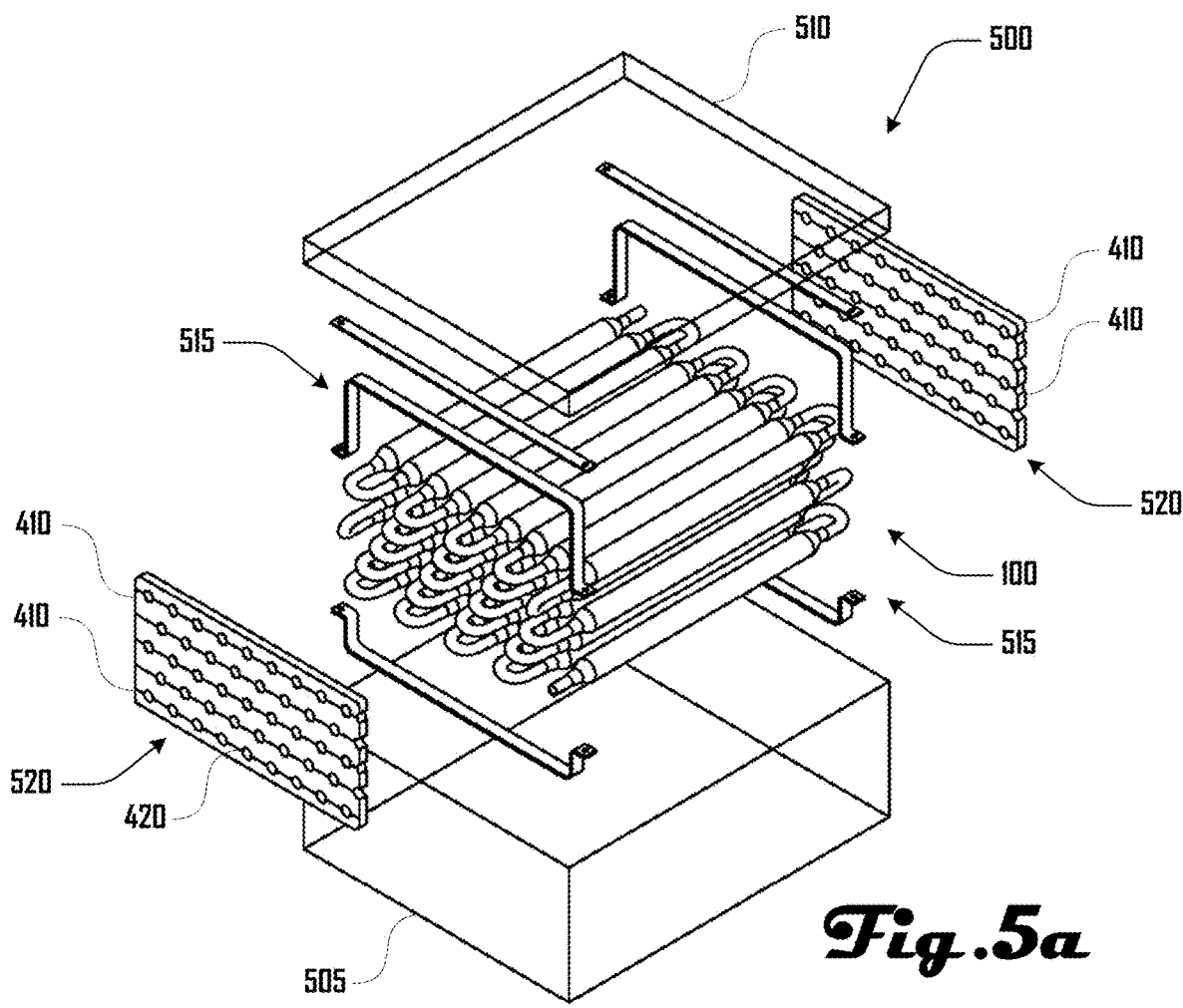
FIGS. 5a and 5b, illustrate a folded tank disposed in a housing in accordance with various embodiments.
Figure 5B:
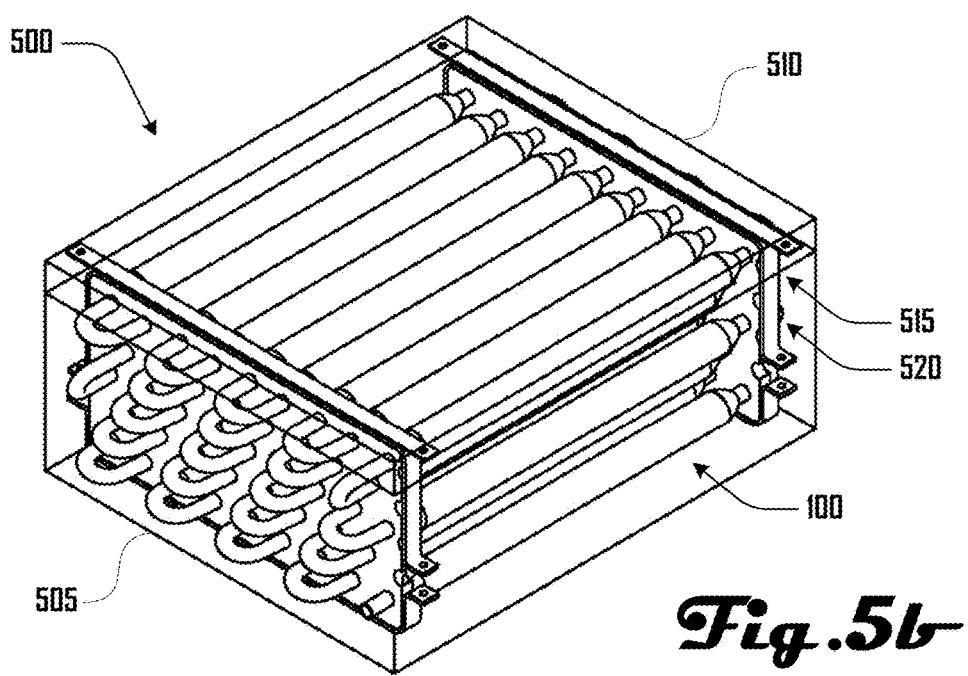

Turning to FIGS. 1a-d, a bare liner 100A is shown as comprising a hollow body 105 having connector portions 110, taper portions 125 and tubing portions 130. The connector portion 110 can be corrugated, which can allow the connector portion 110 to be flexible such that the tank 100 can be folded into a housing 500 as illustrated in FIGS. 5a and 5b. Non-corrugated portions 120 can be rigid in various embodiments. Additionally, as illustrated in FIGS. 1a, 1b and 1d the connector portion 110 can comprise a cuff portion 115 defined by a non-corrugated portion 120 or rigid portion of the connector portion 110 between the corrugations 111 of the connector portion 110 and the taper portion 125.

In various embodiments, the connector portion 110 can have a diameter that is smaller than the tubing portions 130, with the taper portion 125 providing a transition between the diameter of the connector portion 110 and the tubing portion 130. However, further embodiments can comprise a tank 100 with portions having one or more suitable diameter, and in further embodiments, a tank 100 can have portions that are non-cylindrical, which can include various suitable shapes.

In one embodiment, the liner 100A can be generated via extrusion molding systems, or the like, which can comprise rotating dies that are configured to rotate in concert such that corresponding dies mate about an extruded tube generated by an extruder. Corresponding mated dies can thereby define one or more of the connector portion 110, taper portion 125 and/or the tubing portion 130.

In various embodiments, a vacuum can pull the material of an extruded tube to conform to negative contours defined by the mated die. In some embodiments, positive pressure can be introduced within the tube to conform to negative contours defined by the mated die. In various embodiments, such a manufacturing process can be beneficial because liners tanks 100 can be made seamlessly, with no welds, and using a single material.

In some embodiments, liners tanks 100 having varying lengths of the connector portion 110, taper portion 125 and/or the tubing portion 130, can be made by selectively choosing the order of dies such that desired portions are made longer or shorter. For example, in some embodiments, a tank 100 can be produced that fits into an irregular or non-rectangular cavity, which can require a tank 100 to have tubing portions 130 of variable lengths.

Figure 2A:
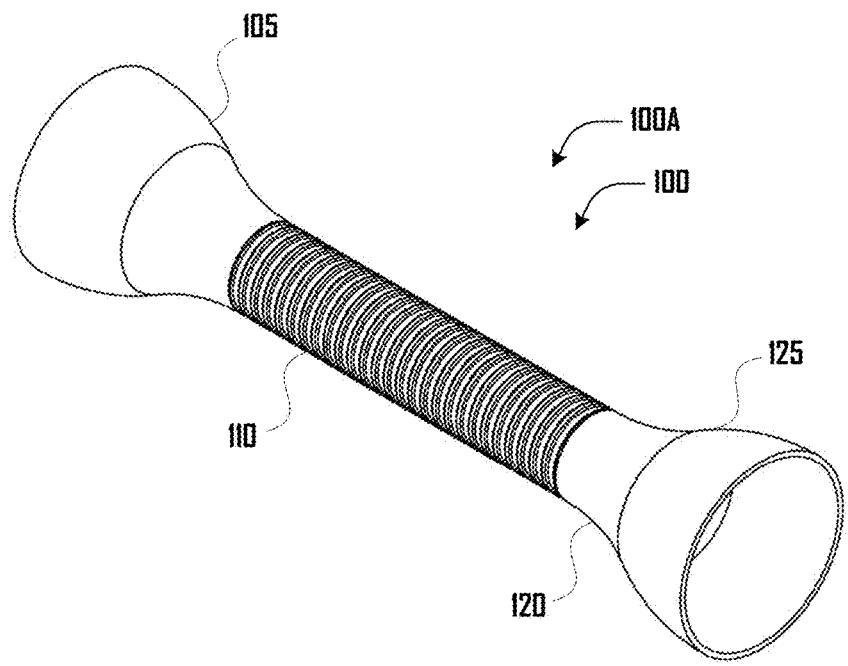
FIGS. 2a and 2b illustrate a connector portion in accordance with a further example embodiment.
Figure 2B:
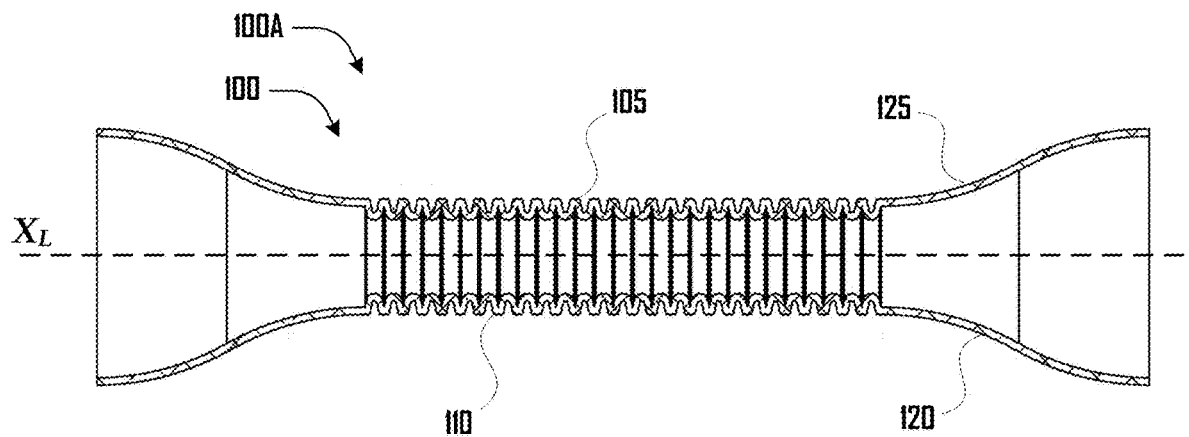

In some embodiments, a tank 100 can be made by forming various pieces of the tank 100 and then coupling the pieces together. For example, as illustrated in FIGS. 2a and 2b, connector portion 110 can be manufactured separately from the taper portion 125 and/or the tubing portion 130, and/or the cuff portion 115. Such separate portions can be subsequently coupled together to form the tank 100.

Accordingly, the embodiments of a tank 100 shown and described herein should not be construed to be limiting on the wide variety of tanks 100 that are within the scope and spirit of the present invention. For example, tanks 100 as described in U.S. Provisional Patent Application No. 62/175,914, which is incorporated herein by reference, illustrates some example embodiments of tanks 100.

In some embodiments, a tank 100 can comprise a naked liner 100A as illustrated in FIGS. 1a-d, 2a, 2b and 3a. However, as illustrated in FIG. 3b, in some embodiments a tank 100 can comprise an over-braided liner 100B, which can include a braiding 300, or other suitable covering. An over-braided liner 110B can be desirable because the braiding 300 can increase the strength of the liner and thereby increase the duty pressure under which the tank 100 may safely operate.

As discussed in detail herein, the material(s), shape, size, configuration and other variables related to a braid 300 can be chosen to increase the strength provided by the braiding 300, increase the flexibility of the braiding 300, increase the strength to weight ratio of the braiding 300 and the like.

Figure 4:
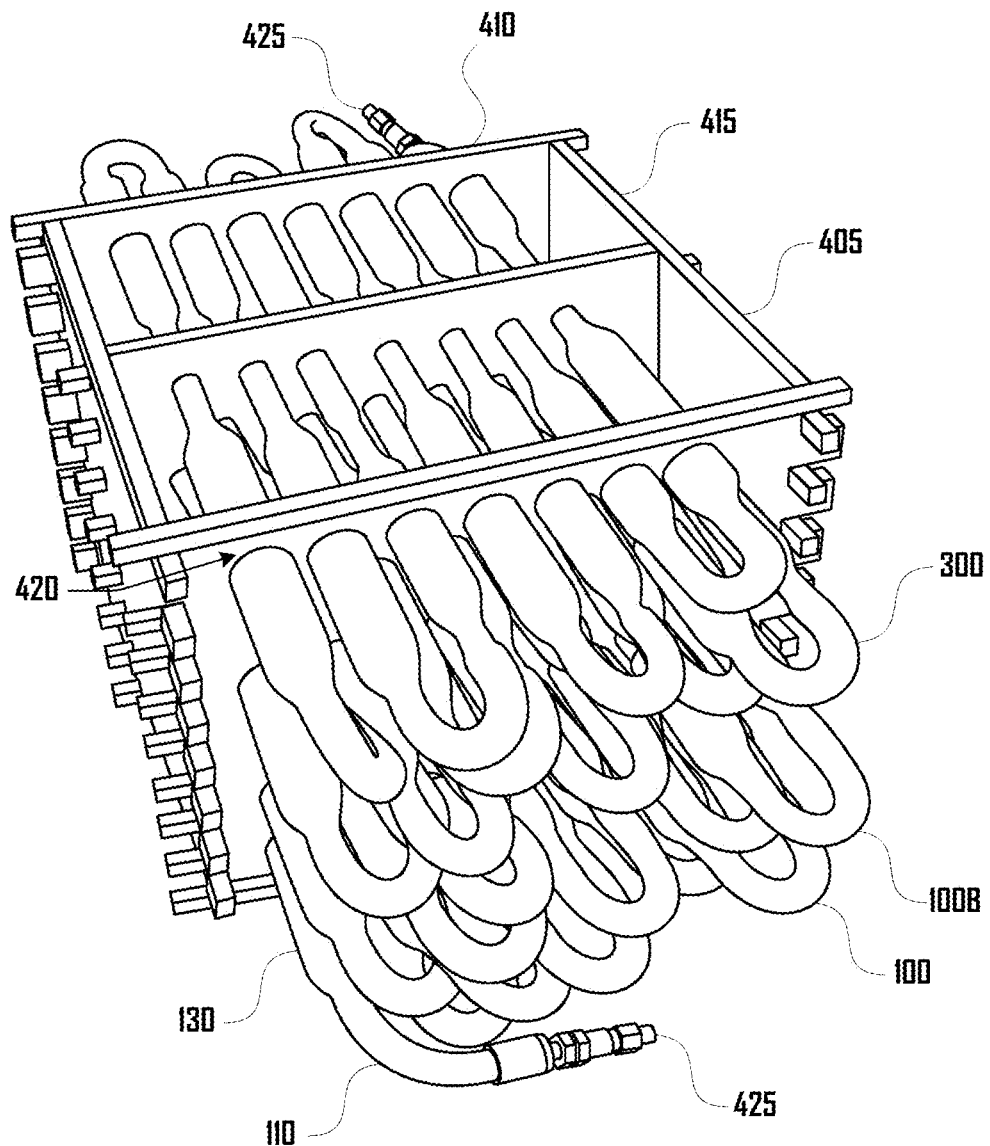
FIG. 4 illustrates one embodiment of a tank that is folded and held in a stacking architecture defined by a plurality of transverse planks that engage with a plurality of lateral planks.

In various embodiments, the tank 100 can be folded into a three-dimensional structure. For example, FIG. 4 illustrates one embodiment where an over-braided liner 100B is folded and held in a stacking architecture 405 defined by a plurality of transverse planks 410 that engage with a plurality of lateral planks 415. The transverse planks 410 can comprise concave slots 420 configured to hold a portion of the tank 100.

The tank 100 can also include fittings 425. Although FIG. 4 illustrates fittings 425 coupled to the connector portion 110 of the tank 100, in further embodiments, fittings can be coupled at any suitable portion of the tank 100, including the cuff portions 115, taper portions 125 and/or tubing portions 130. Such fittings 425 can include crimp fittings, bolt fittings, or any other suitable type of fitting. Examples of fittings in accordance with some embodiments are shown and described in U.S. Provisional Patent Application No. 62/412,044 entitled FITTINGS FOR COMPRESSED GAS STORAGE VESSELS, filed Oct. 24, 2016, which as discussed above is incorporated herein by reference in its entirety for all purposes.

In various embodiments, such fittings 425 can be configured to interface with a tank valve and have a hollow center bore that is not only large enough to allow the passage of a fluid but also large enough to allow the pass-through of valve instrumentation, or the like. For example, in various embodiments, such tank valves can be instrumented to detect tank conditions within the tank 100.

Figure 3A:
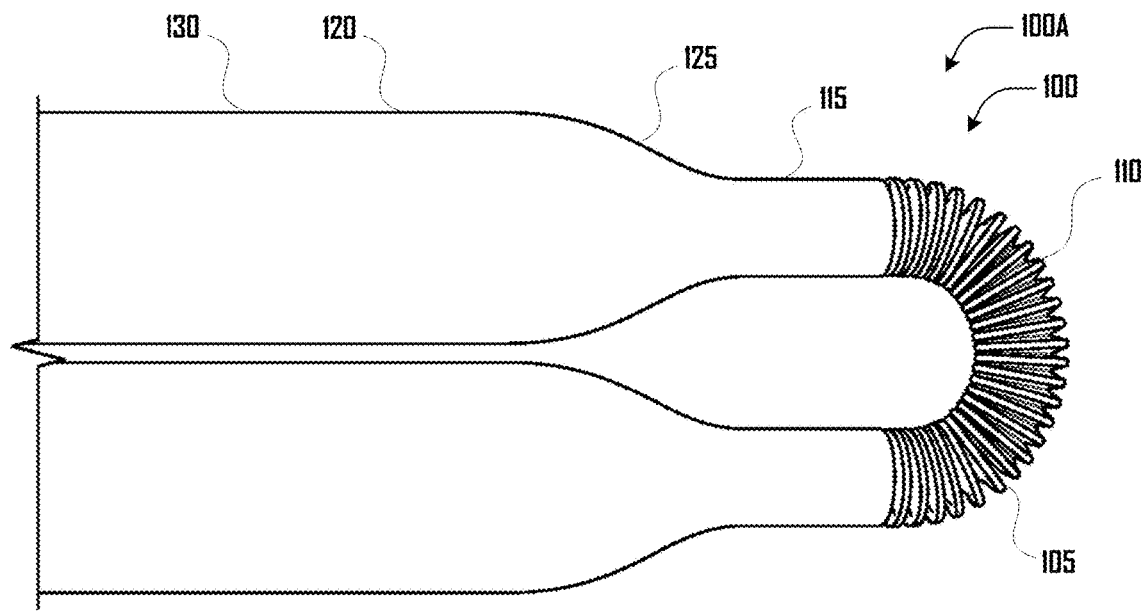
FIG. 3a illustrates a tank of one embodiment comprising a naked liner in a bent configuration.
Figure 3B:
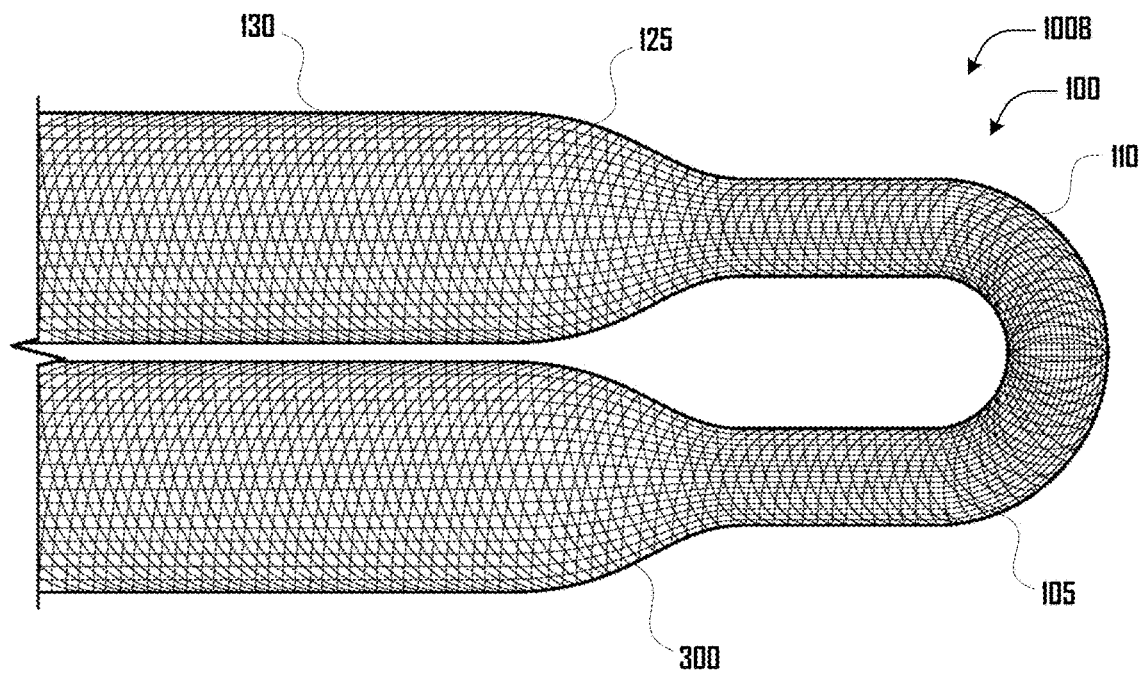
FIG. 3b illustrates a tank of another embodiment comprising an over-braided liner in a bent configuration.

In some embodiments, a tank 100 can comprise smooth cuffs 115 at one or both ends of the tank 100 for fitting attachment (e.g., as illustrated in FIG. 3a, but with the corrugated portion 105 removed). In some examples, connector portions 110 can comprise cuff sections 115 and corrugation sections 105 to allow for a smooth attachment surface for crimp fittings 425. However, in further embodiments, with modification to tooling mold blocks, as discussed herein, it is possible to incorporate cuff sections 115 to the end sections of the tank 100, leaving internal connector portions 110 completely corrugated. Such cuffs 115 at ends of the tank 100 can be various suitable diameters, which can be the same size, large than, or smaller than internal connector portions 110, and such connector portions 110 can be completely or partially corrugated. In other words, some embodiments can include repeating tank geometries for internal portions of the tank 100 between the ends, with a different tank geometry on the ends of the tank 100. Non-periodic tank geometries can be generated in various suitable ways including a liner forming machine with swappable mold blocks as discussed herein, or the like.

As discussed in more detail herein, in some embodiments, a tank 100 can be initially flexible and then configured to be substantially rigid. For example, in various embodiments discussed in detail herein, a braided liner 100B can be infused and/or coated with a resin, and when the resin dries, the resin can make the tank 100 substantially rigid. In some embodiments, a resin-infused tank 100 can be dried in a stacking architecture 405 so that the tank 100 is held in a desired configuration while the resin dries, so that the tank 100 maintains this desired configuration when the resin has dried and the stacking architecture 405 is removed from about the dried tank 100.

In some embodiments, the resin can cure over time, can be cured via heat, can be cured by drying, can be cured via light (e.g., ultra violet light), or the like. In various embodiments, it can be desirable to have the hardened folded tank 100 in the stacking architecture 405 so that the tank 100 becomes rigid and more resistant to failure due to movement and to increase the strength and durability of the tank 100. In further embodiments, a resin can cure or dry and remain flexible. Accordingly, in such embodiments, the tank 100 can be folded before or after curing or drying of such a flexible resin. Various suitable types of resins, or the like, can be used in various embodiments. For example, a resin can comprise one or more of an epoxy resin, a thermoplastic resin, a vinylester resin, a polyester resin, urethane, or the like.

In further embodiments, an elongated or folded resinated tank 100 can be rotated while drying or curing the resin. For example, to prevent resin from being unevenly distributed on the tank 100 while drying, to generate a uniform drying temperature about the tank 100, and to prevent sagging, a resinated elongated tank 100 can be rotated about a central axis during drying. Similarly, a folded tank 100 (e.g. as shown in FIG. 4) can also be rotated while drying to prevent uneven distribution of the resin. In such an example, the architecture 405 can be rotated in one or more axis.

As illustrated in FIGS. 5a and 5b, a folded tank 100 can be disposed in a housing 500 in accordance with various embodiments. In the example of FIGS. 5a and 5b, the housing 500 can comprise a base enclosure 505 and a lid 510 that resides over the base enclosure 505 as illustrated in FIG. 5b. Various elements of hardware 515 can be configured to surround portions of the tank 100 and secure the tank 100 within the base and lid 510 and/or also surround end-caps 520 that are configured to surround and/or support the connector portions 110 of the tank 100.

As discussed above and illustrated in FIG. 4, in some embodiments, the end-caps 520 can comprise and be defined by a plurality of elongated transverse planks 410 that define slots 420 on one or more side of the transverse planks 410. The slots 420 can engage and/or support portions of the tank 100, which can be desirable for preventing or limiting excessive movement of the tank 100, which may be undesirable because such movement may result in damage or weakening of the tank 100. For example, in embodiments where the housing 500 that includes the tank 100 is disposed on a vehicle, elements such as the end-caps 520, hardware 515, base and lid 505, 510 can be configured to prevent or limit excessive movement of the tank 100, which may otherwise be caused by operation of the vehicle.

A tank 100 can be configured or rated for use with pressurized fluids including being rated for use at at least 10 MPa, 25 MPa, 50 MPa, 70 MPa, 90 MPa, 110 MPa, 130 MPa, 150 MPa, or the like. In one preferred embodiment, a tank 100 as described herein can be rated for use with pressurized hydrogen at 70 MPa nominal working pressure. In another preferred embodiment, a tank 100 can be rated for use with compressed natural gas (CNG) at 25 MPa nominal working pressure. Although various embodiments of a tank 100 discussed herein can be configured for use with fuel fluids such as hydrogen or compressed natural gas, further embodiments can be configured for use with any suitable fluid at various suitable pressures. Additionally, some embodiments can be configured for use with cryogenic fluids, room-temperature fluids, or heated fluids.

As discussed herein, in some embodiments, a tank 100 can comprise a naked liner 100A (e.g., as shown in FIG. 3a) or can comprise an over-braided liner 100B (e.g., as shown in FIG. 3a). Additionally, in some embodiments, the tank 100 can be treated with a resin. FIGS. 6-13b illustrate example systems and method for applying a resin to a tank 100, applying resin to a braid 300, generating a braid 300 comprising resin, and/or applying resin to an over-braided liner 100B. Although specific embodiments are shown and described herein, further embodiments can include or specifically exclude various elements of the embodiments shown and described herein.

Turning to FIG. 6, an example braiding machine 600 is shown that comprises a braiding ring 605 from which a plurality of fibers 610 extend to a resin cone 615. In various embodiments, the resin cone 615 can comprise a hollow truncated cone with a narrow front end 616 and a broader rear end 617 that defines a cavity 619 that extends from the front end 616 to the rear end 617. The resin cone 615 can further comprise a plurality of grooves 620 defined by a face 618 of the cone 615, with the grooves 620 extending from the front end 616 to the rear end 617.

In various embodiments, the grooves 620 can be curved as shown in FIG. 6, but can also be linear, irregularly shaped, or the like. In some embodiments, the grooves 620 can be substantially parallel to a radial plane of the cone 615; however, as illustrated in FIG. 6, the grooves can curve or coil about the face 618 of the cone 615.

In various embodiments, the braiding machine 600 can be configured such that the fibers 610 run along the face 618 of the cone 615, whereby resin disposed in the grooves 620 coats and/or impregnates the fibers 610 before the fibers 610 are woven into a braid 300 over the tank 100. In the example braiding machine 600 of FIG. 6, the tank 100 moves from left to right through the braiding ring 605 and through the cavity 619 of the cone 615, where a braid 300 comprising resin is applied to the naked liner 100A to generate a resinated and over-braided liner 100B at the front end 616 of the cone 615.

Figure 7A:
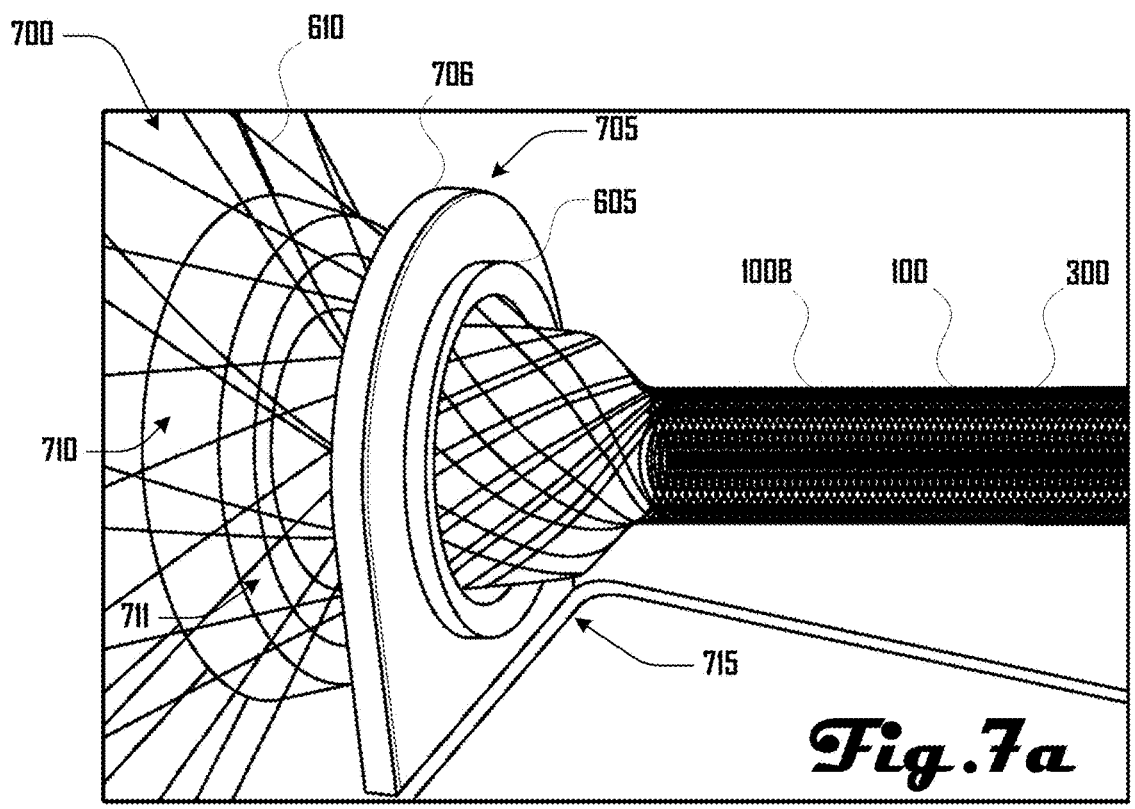
FIGS. 7a and 7b illustrate another embodiment of a braiding system that comprises a braiding head where a plurality of fibers meet to form a braid on a tank.
Figure 7B:
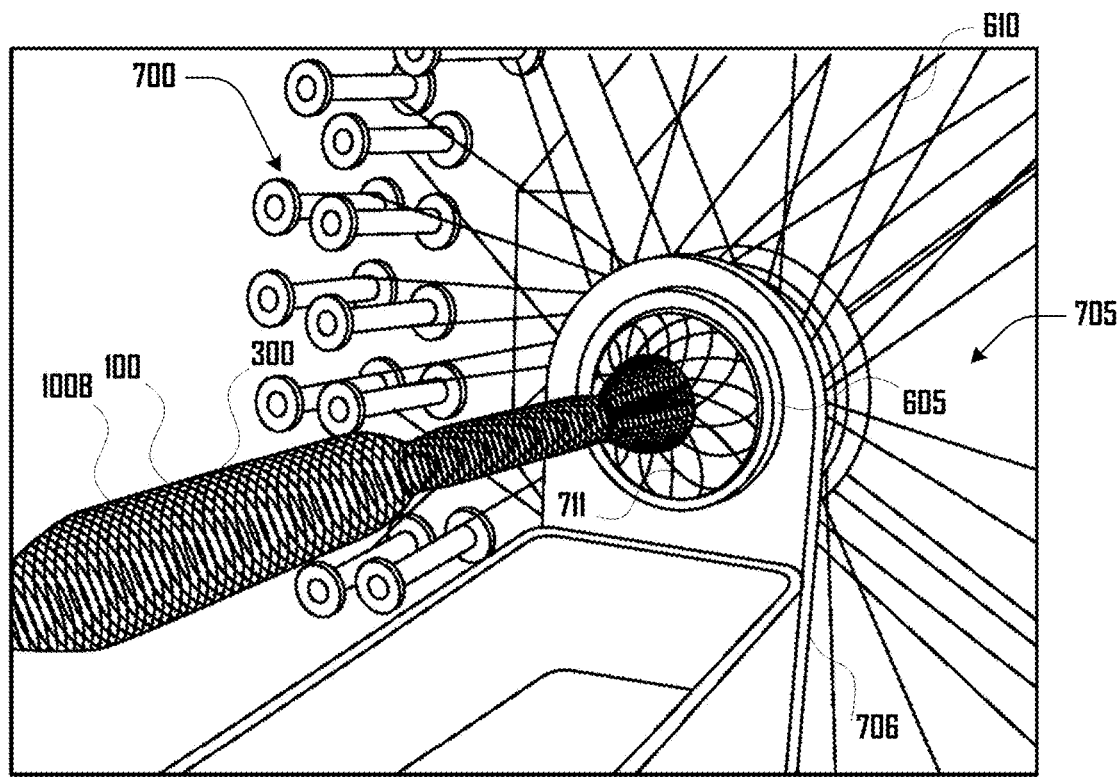

FIGS. 7a and 7b illustrate another embodiment of a braiding machine 700 that comprises a braiding head 705 where a plurality of fibers 610 meet to form a braid 300 on a tank 100. The braiding head 705 comprises a resin applicator 710 that defines a face 711 over which the fibers 610 travel before forming a braid 300 on the tank 100. The resin applicator 710 is configured to present resin of the face 711, which introduces resin to the fibers 610 before the fibers 610 are deposited onto the tank 100 as a braid 300. As illustrated in FIGS. 7a and 7b, the braiding head 705 and resin applicator 710 define an orifice 715 through which the tank 100 travels, which allows a braid 300 to be applied continuously to the tank 100 as the tank 100 passes through the braiding head 705.

FIG. 8a illustrates a cross-sectional side view of the resin applicator 710 in accordance with an embodiment. FIG. 8b illustrates the resin applicator 710 and associated support architecture 800 in accordance with an embodiment. The resin applicator 710 comprises an entry tube 805, a reservoir body 810, an exit tip 815, and a tip washer 820. The entry tube 805, reservoir body 810, and exit tip 815 define a cavity 619 that extends therethrough. The reservoir body 810 is coupled to an end of the entry tube 805 and defines a reservoir 830 that is fed by a resin tube 835 that extends within the cavity 619 and out of the entry tube 805. The exit tip 815 defines a distal end of the resin applicator 710 and is coupled to resin tube 835 and an end of the entry tube 805. The tip washer 820 rotatably surrounds the exit tip 815 via a set of threads 840 and defines a resin port 845 along with the reservoir body 810. As discussed herein, a naked liner 100A or over-braided liner 110B can travel through the cavity 619 and exit the exit tip 815, where resin can be applied to fibers 610 forming a braid 300 over the naked liner 100A or over-braided liner 110B.

In various embodiments, resin can be introduced to the resin tube 835 via a fitting 850 on the end of the resin tube 835. The positive flow of the resin can reach and fill the reservoir 830 and the positive flow causes the resin to be extruded from the resin port 845 defined by the tip washer 820 and reservoir body 810.

In various embodiments, the flow characteristics of the resin port 845 can be changed by changing the distance between the reservoir body 810 and the tip washer 820 to widen or narrow the resin port 845. Additionally, variables such as the pressure and/or flow rate can also be selectively changed to modify the flow characteristics of resin being extruded from the resin port 845.

As discussed herein, fibers 610 (see FIGS. 7a and 7b) are configured to pass over the resin applicator 710 and as the fibers 610 pass over the resin port 845, these fibers 610 are impregnated and/or coated with resin being extruded from the resin port 845. In various embodiments, a desired saturation and/or coating of the fibers 610 can be generated without producing an undesirable excess of resin by widening or closing the resin port 845 and/or changing the flow rate or pressure of resin being introduced to the reservoir 830 via the resin tube 835. Variables such as the viscosity of the resin, permeability of the fibers 610, absorbance of the fibers 610, surface area of the fibers 610, diameter(s) of the tank 100, and the like, can affect the desired configuration of the resin port 845, resin flow rate and resin pressure.

In some embodiments, a portion of the resin applicator 710 can be heated and connected to a resin melting and extrusion assembly. Additionally, in some embodiments, resin can wick into fibers 610. In embodiments having thermoplastic resin, or the like, a resinated tank 100 can be heated to make the resin flexible enough such that the tank 100 can be bent or otherwise suitably configured. Additionally, in some embodiments, an over-braided liner 100B and/or bent tank 100 can be heated after bending or braiding so that adjacent braid layers can be bonded together via the resin. In further embodiments, braiding fibers 610 can comprise thermoplastic fibers, or the like.

In various embodiments, the face 711 can define a taper angle $\theta_T$. For example, FIG. 8a illustrates the face 711 of the tip washer 820 defining a taper angle $\theta_T$ that tapers toward the front of the resin applicator 710. The taper angle $\theta_T$ can be any suitable angle, including 10° as illustrated in FIG. 8a. However, in some preferred embodiments, the taper angle $\theta_T$ can be 54.7°. For example, in embodiments where a braid exits a forming ring 605 of a braiding machine 600 at 54.7° as discussed herein, it can be desirable to have the taper angle $\theta_T$ configured to match such a braid angle. Having a taper angle $\theta_T$ that matches the exit braid angle of a braiding machine 600 can be desirable because having taper angle $\theta_T$ that is more acute than the exit braid angle of the braiding machine 600 can interrupt the braid angle on the resin applicator 710, which can increase the likelihood of undesirable formation of the braid on the resin applicator 710. In addition, in some embodiments the braid angle may not be exactly 54.7°. For example, as discussed herein, some example braiding schemes can comprise different angles braided on each layer. In these cases and others it may be sufficient to have a taper angle $\theta_T$ that is close to but not exactly the same as the braid angle. Although FIG. 8a illustrates the taper angle $\theta_T$ being defined by the tip washer 820, in further embodiments, any suitable portion of the resin applicator 710 can define a portion of a taper angle $\theta_T$, including portions of the resin applicator 710 forward or rear of the resin port 845.

Figure 18A:
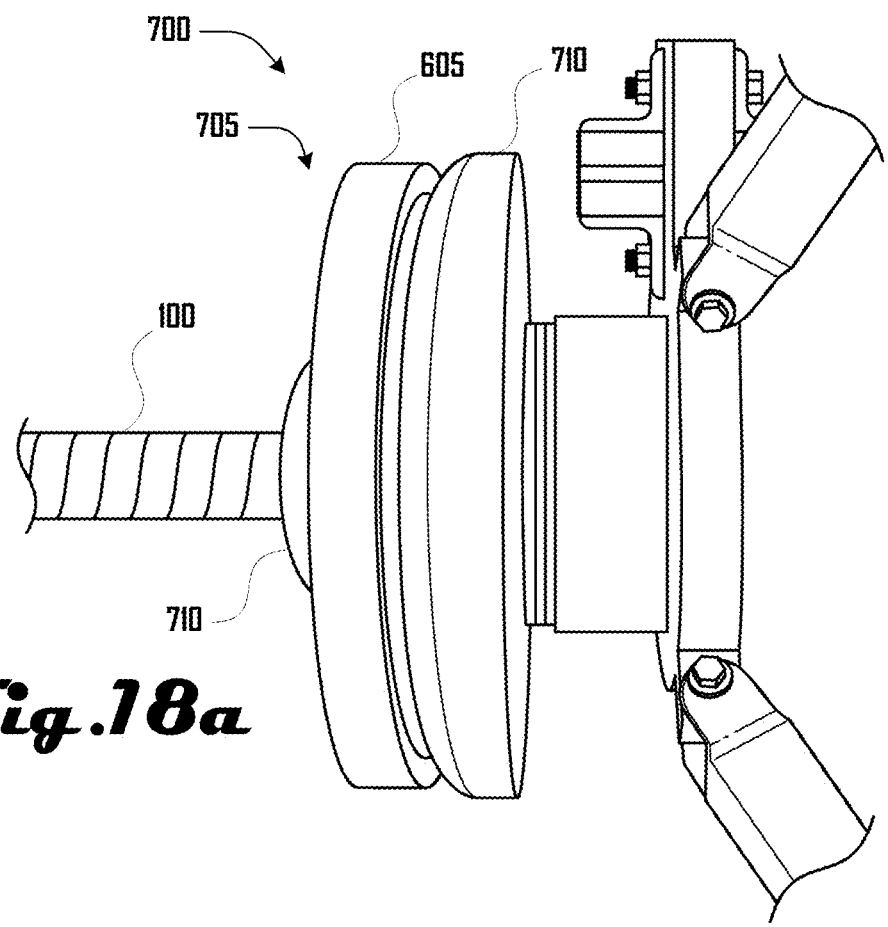
FIGS. 18a and 18b illustrate an example embodiment of a braiding machine where the largest outer diameter of a resin applicator is greater than the internal diameter of a forming ring where fibers engage the forming ring.
Figure 18B:
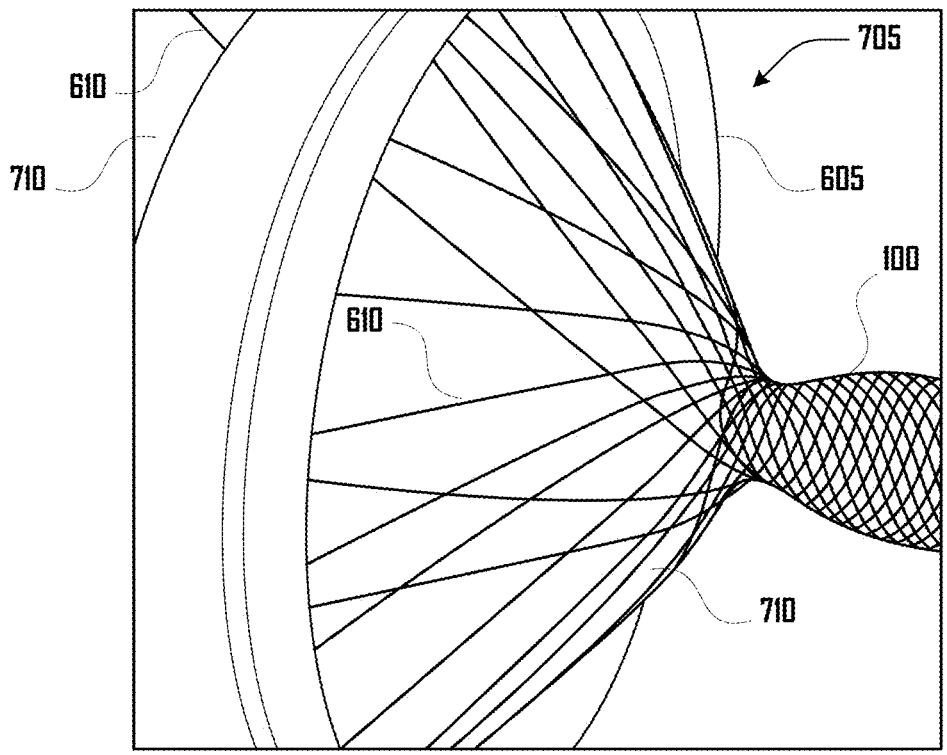

Additionally, where formation of the braid 300 on the resin applicator 710 is undesirable, it can be beneficial to configure the braiding head 705 such that an internal diameter of the forming ring 605 that defines the orifice 715 of the forming ring 605 is smaller than the largest outer diameter of the resin applicator 710. For example, FIGS. 18a and 18b illustrate an example embodiment where the largest outer diameter of the resin applicator 710 is greater than the internal diameter of the forming ring 605 where the fibers 610 engage the forming ring 605. Such a configuration can be desirable for reducing the likelihood of undesirable formation of the braid 300 on the resin applicator 710. For example, in some embodiments, if the forming ring 605 is sized properly it will be impossible for the braid diameter to exceed the diameter of the forming ring 605, thus reducing the likelihood of the braid 300 forming on the resin applicator 710.

As illustrated in FIG. 8a, a liner trough 855 can be coupled to the entry tube 805, which can provide a support for the resin applicator 710 within a braiding machine 700 (see FIGS. 7a and 7b) and can provide a basin for dripping resin from the tank 100. Additionally, the resin applicator 710 can be further supported and/or coupled within a braiding machine 700 by one or more mounting plates 860 that surround the resin applicator 710. As illustrated in FIG. 8b, the support architecture 800 can further comprise a transverse bar 865 coupled to a tray 870 and a plurality of legs 875 coupled to and extending downward from the tray 870.

In various embodiments, maintaining the cross section of the tank 100 in a fixed position that is concentric with the central axis $X_B$ of the braiding machine 600, 700 (see FIGS. 6 and 7) while the tank 100 is moving through the cavity 619 and having a braid 300 applied at the tip of the resin applicator 710 can be desirable. Such a configuration can improve braid consistency and improve braid performance. In one example where optimal braid performance occurs at a braid angle of 54.7°, maintaining the cross section of the tank 100 in a fixed position that is concentric with the central axis $X_B$ of the braiding machine 600, 700 while the tank 100 is moving through the cavity 619 can allow for minimal deviation of the braid angle from 54.7° and thereby provide for optimal braid performance consistently along the length of an over-braided liner 100B.

As illustrated in FIGS. 8*a* and 8*b*, the cavity 619 can be defined by a cylindrical inner wall of the resin applicator 710 that can be sized to correspond to a maximum diameter of a tank 100 (e.g., the tubing portions 130 as illustrated in FIGS. 1*c*, 1*d*, 3*a* and 3*b*). In other words, the diameter of the cavity 619 can be sized such that it is equal to or slightly larger than (e.g., 0.045 (+/−0.005)") the maximum diameter of the tubing portions 130 so that the central axis $X_L$ of the tank 100 proximate to where the braid 300 is being applied is held substantially coincident with the central axis $X_B$ of the braiding machine 600, 700.

In embodiments where a plurality of layers of braiding 300 are applied to a tank 100 such layers can add additional diameter to the tubing portions 130 such that the tubing portions 130 increase in diameter as successive layers of braiding 300 are added. In some embodiments, the size of the cavity 619 can correspond to the anticipated diameter of N−1 braiding layers, where N is the maximum number of layers of braiding 300 being applied to the tank 100.

Alternatively, in further embodiments, the diameter of the cavity 619 can be changed as successive layers of braiding 300 are added to the tank 100. In other words, as successive layers of braiding 300 are added to the tank 100, the diameter of the cavity 619 can be increased to correspond to the increasing diameter of the tank 100 so that the tank 100 passing through the cavity 619 can held substantially coincident with the central axis $X_B$ of the braiding machine 600, 700.

Various suitable systems for changing the diameter of the cavity 619 can be employed. For example, FIGS. 19*a* and 19*b* illustrate an example embodiment 800B of a support architecture 800 configured to hold a constraint tube 1915. As illustrated in FIGS. 19*a* and 19*b*, the support architecture 800 can comprise an elongated support beam 1905 with a support plate 1910 coupled along the length of the support beam 1905. The support plate 1910 can comprise a first end 1911 that couples with the support beam 1905 and a second end 1912 that couples with a mounting plate 860 of the resin applicator 710. Accordingly, the resin applicator 710 can be held by the support architecture 800 to extend through the forming ring 605, which is supported by a ring plate 706 that extends from a base 707.

As discussed herein, the resin applicator 710 can define a cavity 619. As shown in FIGS. 19*a* and 19*b*, a constraint tube 1915 can be inserted into the cavity 619 with the constraint tube 1915 defining an elongated cylindrical constraint cavity 1916 that extends between a first and second end 1917, 1918 of the constraint tube 1915. To load the constraint tube 1915, the second end 1918 can be inserted into and extended through the cavity 619. The second end 1918 can be coupled with and held by a retainer 1920 within a retainer slot 1921 defined by the retainer 1920. Accordingly, by loading the constraint tube 1915 into the cavity 619, the smaller inner diameter of the constraint tube 1915 can replace the larger inner diameter of the cavity 619.

For example, one or more layer of braiding 300 can first be applied to a naked liner 100A or to an over-braided liner 100B while passing through the constraint cavity 1916 of the constraint tube 1915 present in the cavity 619 of the resin applicator 710 as illustrated in FIG. 19*b*. The constraint tube 1915 can then be removed from the cavity 619 as illustrated in FIG. 19*a* so that the generated over-braided liner 100B can be further braided after passing through the larger diameter of the cavity 619 that is exposed when the constraint tube 1915 is removed. In other words, a tank 100 can first receive one or more layers of braiding 300 using a smaller diameter of the constraint cavity 1916 and as such one or more layers increase the diameter of the generated over-braided liner 100B, the constraint tube 1915 can then be removed to accommodate the generated over-braided liner 100B via the larger-diameter cavity 619 of the resin applicator 710.

In further embodiments, any suitable plurality of constraint tubes 1915 of different diameters can be used while applying a plurality of layers of braiding to a tank 100. For example, in some embodiments, a larger-diameter constraint tube 1915 can be swapped in after each layer of braiding is applied. In further embodiments, a larger-diameter constraint tube 1915 can be swapped in after every other layer of braiding is applied. Additionally, some braiding methods can rely solely on constraint tubes 1915, whereas some braiding methods can employ both constraint tubes 1915 and a cavity 619 of the resin applicator 710.

Figure 9A:
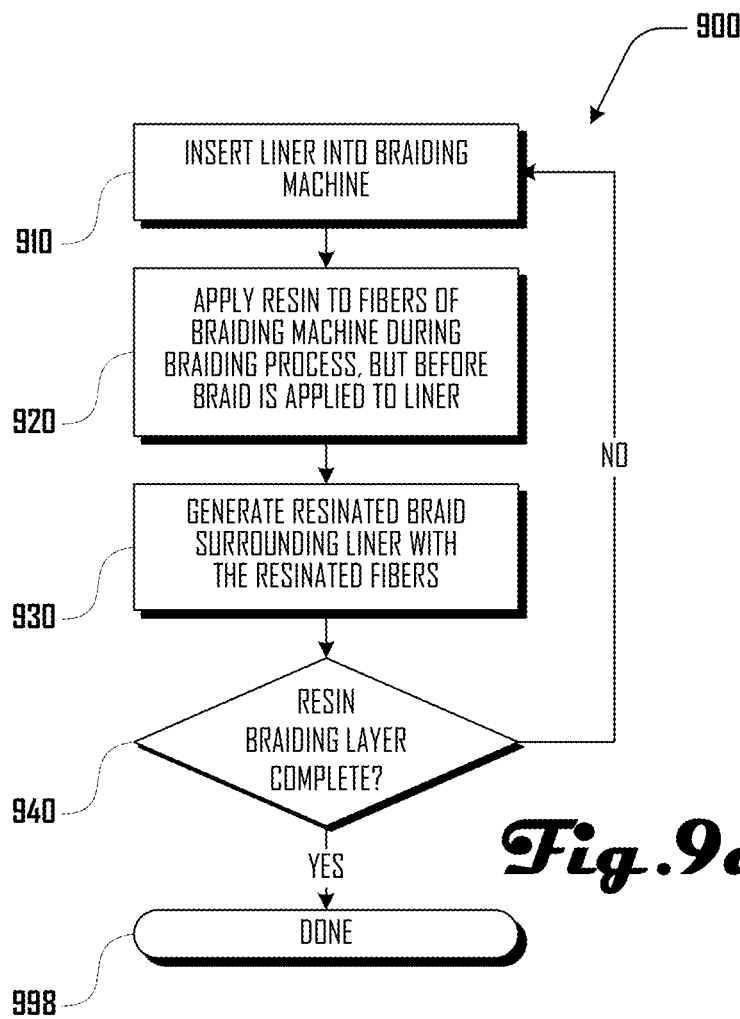
FIG. 9a illustrates a method of generating a resinated braid in accordance with an example embodiment.

FIG. 9*a* illustrates a method 900 of generating a resinated braid 300 (see FIGS. 6, 7*a*, 7*b*) over a tank 100 (e.g., FIGS. 1*a*-*d*). The method 900 begins at 910, where a tank 100 is inserted or fed into a braiding machine 600, 700 (see FIGS. 6, 7*a*, 7*b*), and at 920, resin is applied to fibers 610 (see FIGS. 6, 7*a*, 7*b*) of the braiding machine 600, 700 during the braiding process, but before the braid 300 is applied to the tank 100.

For example, as illustrated in FIG. 6 and discussed above, resin can be applied to fibers 610 via grooves 620 and a resin cone 615. In this example, resin is applied before the fibers 610 come together to form a braid 300 over the tank 100. As illustrated in FIGS. 7*a*, 7*b* and 8*a*, resin can be applied to fibers 610 via a resin applicator 710 from which resin is extruded via a resin port 845. In this example, resin is applied before the fibers 610 come together to form a braid 300 over the tank 100.

Returning to the method 900 of FIG. 9*a*, at 930 a resinated braid 300 is generated that surrounds the tank 100 using the resinated fibers 610. In other words, the fibers 610 that were exposed to, impregnated, covered, and/or soaked in resin during the braiding process are then brought together as a braid 300 that surrounds the tank 100 such that an over-braided liner 100B is generated that comprises resin.

At 940, if the braiding process is complete the method 900 ends at 998. However, if the braiding process is not complete, the method 900 cycles back to 910, where the tank 100 is further fed into the braiding machine 600, 700. Accordingly, as discussed in relation to the examples of FIGS. 6, 7*a* and 7*b*, the liner can be continuously fed through the braiding machine 600, 700, and fibers 610 of the braiding machine can be continuously resinated prior to forming a braid 300 on the liner, such that the braid 300 that is subsequently formed on the liner comprises resin. Accordingly, a continuous resinated braid 300 can be generated on effectively any length of tank 100 that is fed through the braiding machine 600, 700 via such a method 900.

The example systems and methods of generating a resinated braid 300 should not be construed to be limiting on the many variations and alternatives that are within the scope and spirit of the preset invention. For example, although a resin applicator 710 or resin cone 615 are two examples shown in FIGS. 6, 7a and 7b various other suitable systems and methods of applying resin to a fiber 610 are contemplated. For example, resin can be applied to spools of fiber 610 of a braiding machine before the fibers 610 are braided, or resin can be applied to individual fibers 610 at any time after leaving a spool and before being applied to a tank 100.

Additionally, although some embodiments discuss a resinated braid being applied to a naked liner 100A to generate a resinated over-braided liner 100B, a resinated or non-resinated braid can be applied to a tank 100 having any suitable covering or wrapping. For example, in some embodiments, resin can be applied to a tank 100 and a resinated or non-resinated braid 300 can be applied to the tank 100. In further embodiments, one or more layers of non-resinated braiding 300 can be applied to a tank 100 and such non-resinated braiding 300 can remain non-resinated. Accordingly, the systems and methods described herein can apply to tanks 100 without resin and/or tanks without resinated braiding 300.

In another embodiment, a resinated or non-resinated braid 300 can be applied to a tank 100 that comprises a resinated or non-resinated braid 300. In other words, some embodiments can comprise two or more layers of braiding 300, which can be applied concurrently or applied successively. For example, in some embodiments, two, three, four, five, six, seven, eight, nine or more layers of braiding 300 can be applied. In some examples, a three-layer braid 300 on a tank 100 can be desirable for CNG tanks and a seven-layer braid 300 on a tank 100 can be desirable for hydrogen tanks.

Additionally, although some examples include applying a resinated or non-resinated braid 300 to a naked liner 100A or a braided liner 100B, further embodiments can include application of a resinated or non-resinated braid 300 over a liner having one or more layers of wrapping, covering, or other suitable layer that covers or surrounds at least a portion of a naked liner 100A. Additionally, such wrapping or covering layers can be applied between and/or over one or more layer of braiding 300.

A layer of braiding 300 can be configured to provide various suitable amount of coverage. For example, in some embodiments, a layer of braiding 300 can completely cover an underlying surface (e.g., a naked liner 100A or braided liner 100B). However, in some embodiments, a layer of braiding may not completely cover an underlying surface. In embodiments having a plurality of layers of braiding 300 the amount of coverage can be the same for all layers, can be different, or can be alternating in a desired pattern, increasing or decreasing for additional layers, or the like.

Figure 9B:
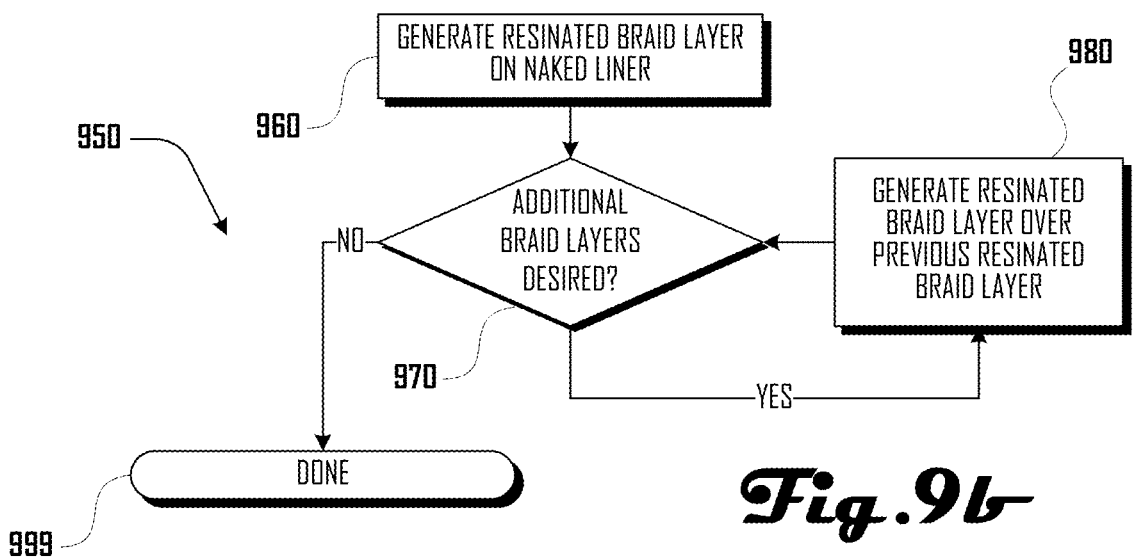
FIG. 9b illustrates a method of generating one or more resinated braid layers over a liner in accordance with an example embodiment.

FIG. 9b illustrates an example method 950 of generating a tank having one or more layers of resinated braiding 300. The method 950 begins, at 960, where a resinated braid layer is generated on a naked liner 100A. As discussed herein, generating a braid layer can be done in various suitable ways. For example, the method 900 of FIG. 9a illustrates one process for generating a braid layer, although any other suitable method can be employed.

At block 970, a determination is made whether additional braid layers are desired, and if so, in block 980, a resinated braid layer is generated over the previous braid layer. The method 950 cycles back to block 970, where a determination is made whether additional braid layers are desired. If not, the method 950 continues to block 999 where the method 950 is done.

Additionally, although braids 300 are discussed herein in relation to various embodiments, other embodiments can comprise application of a wrap or other suitable coating to a tank 100. For example, in one embodiment, a sleeve can be applied to a tank 100 and shrink-wrapped about the tank 100 and a braid 300 may or may not be applied over the sleeve. A sleeve can comprise various suitable articles including a cylindrical sheet or tube of plastic that is configured to surround the tank 100.

Additionally, although resin is discussed herein in relation to various embodiments, any suitable liquid, amorphous solid, solid, gas, or the like, can be used in accordance with further embodiments. For example, further embodiments can employ an adhesive, glass, fiberglass, metal, epoxy, or any other suitable material. Accordingly, the present invention should not be construed to be limited to only resin.

FIGS. 6, 7a and 7b illustrate embodiments where resin can be applied to fibers 610 before and/or during the braiding process. However, in further embodiments, resin can be applied to an over-braided liner 100B after the braid 300 has been applied to a naked liner 100A. For example, FIG. 10 illustrates a resin application system 1000 configured to apply resin to a tank 100. The resin application system 1000 is shown as comprising a resin chamber 1005 disposed on an elongated base 1010. A tank 100 is shown extending between and coupled to a pair of traveler plates 1020 via coupling rods 1025. The traveler plates 1020 are configured to slide along the base 1010 and along a set of rails 1015. Accordingly, by pulling on one of the plates 1020, the tank 100 can translate through the resin chamber 1005, with the opposing plate 1020 allowing the tank 100 to maintain tension, maintain a substantially elongated configuration, and maintain an axis perpendicular to the resin chamber 1005.

Although the example of using traveler plates 1020 to move a tank 100 is shown herein, it should not limit the wide variety of systems and structures that can be used to convey a tank 100 through a resin chamber 1005 and/or braiding machine 700. For example, in some embodiments, a caterpillar system, capstan system, or the like, can be used to convey a tank 100 through a resin chamber 1005 and/or braiding machine 700.

In various embodiments, a caterpillar system can comprise a pair of parallel rotating tracks. The opposing tracks can exert a force normal to the tank 100 which allows the tracks to grip the tank 100 between the tracks. The rotation of the tracks can be used to advance the tank 100. A caterpillar system can be positioned in series before a braiding machine 700, after a braiding machine 700, before a resin chamber 1005, after a resin chamber 1005, and the like. In some embodiments, a plurality of caterpillar systems can be positioned in suitable positions in a manufacturing line.

In some embodiments where the tank 100 is compressed by the tracks of a caterpillar system, it can be desirable to counteract such compression by pressurization of the tank 100. Additionally, to prevent deformation of the tank 100, of the braid 300 or of resin present on the tank 100, it can be desirable to have a caterpillar with 3D contoured jaws with the pattern of a tapered section of the tank 100 or other suitable portion of the tank 100. Such an embodiment may be desirable as it would apply force directly along the axis of travel, eliminating the need for the force to be translated from normal/frictional to axial.

In further embodiments, it can be desirable to apply a protective sleeving to a tank 100 at one or more stages of manufacture (e.g., after all layers of a braid 300 have been deposited onto the tank 100, or the like). Such an example can be configured to distribute the forces of the caterpillar through the tank 100 and/or braid 300 as to minimize distortion thereof. Yet another embodiment can comprise light axial yarns configured to prevent the load-bearing yarns from slipping while still allowing the tank 100 to bend. These axial yarns may also help with minimizing braid distortion during other steps of the tank fabrication, such as during the folding process.

In further embodiments, a capstan can be used in any suitable position during the manufacture of the tank 100. A capstan can comprise a motor-driven reel that pulls on the tank 100 to traverse it through a braiding machine 700 and/or resin chamber 1005. For example, after a small section of the braid 300 has been formed, a rope can be attached to the end of the braid 300, and the other end of the line can be attached to the reel. During the braiding process the reel is engaged and the rotary motion of the reel can generate a linear traverse of the tank 100 through the braiding machine 700.

In various embodiments, it can be desirable to vary the rate at which the tank 100 moves through the braiding machine 700 and/or resin chamber 1005. For example, to maintain a suitable braiding angle on a tank 100 having small, large and tapered portions, it may be necessary to slow or speed up the tank 100 for certain portions. Similarly, it may be desirable to vary the rate at which the tank 100 moves through the resin chamber 1005 because some portions of the tank 100 may benefit from greater time soaking in resin or a slower or faster draw through a squeegee as discussed in greater detail herein.

Accordingly, in various embodiments, the distance between various elements of a liner manufacturing line and/or the length of components of a liner manufacturing line can be defined based on a pattern of varied rate of movement of a tank 100. For example, if the rate of movement of the tank 100 is slowed down during application of the braid 300 to a larger portion of tank 100, the length and position of a resin chamber 1005 in series with the braiding machine 700 can be configured such that a larger portion of a tank 100 farther down the line is moving through the resin chamber 1005 while the rate of the tank 100 is slowed.

As discussed in more detail herein, the resin chamber 1005 can be configured to hold a reservoir of resin through which the tank 100 moves. The tank 100 can thereby be exposed to resin in the resin chamber 1005 without substantial loss of resin from the chamber 1005 as the tank 100 travels through the resin chamber 1005.

For example, FIGS. 11a and 11b illustrate a resin application system 1000 where a tank 100 is being drawn through a resin chamber 1005. FIG. 11a illustrates a first configuration of the resin application system 1000 where a portion S of the tank 100 is soaking in the resin chamber 1005 and a second portion D is dry because it is yet to enter the resin chamber 1005.

FIG. 11b illustrates a second configuration of the resin application system 1000, where the resin chamber 1005 has remained stationary and a portion of the tank 100 has been drawn through the resin chamber 1005. For example, a leading traveler plate 1020A can be pulled, which draws the tank 100 through the resin chamber 1005 and also pulls the following traveler plate 1020B. Accordingly, as shown in FIG. 11b, a wet portion W of the tank 100 has been generated after being pulled through the resin chamber 1005, a soaking portion S is present in the resin chamber 1005 and a dry portion D of the tank 100 remains that has not yet entered the resin chamber 1005.

Figure 12A:
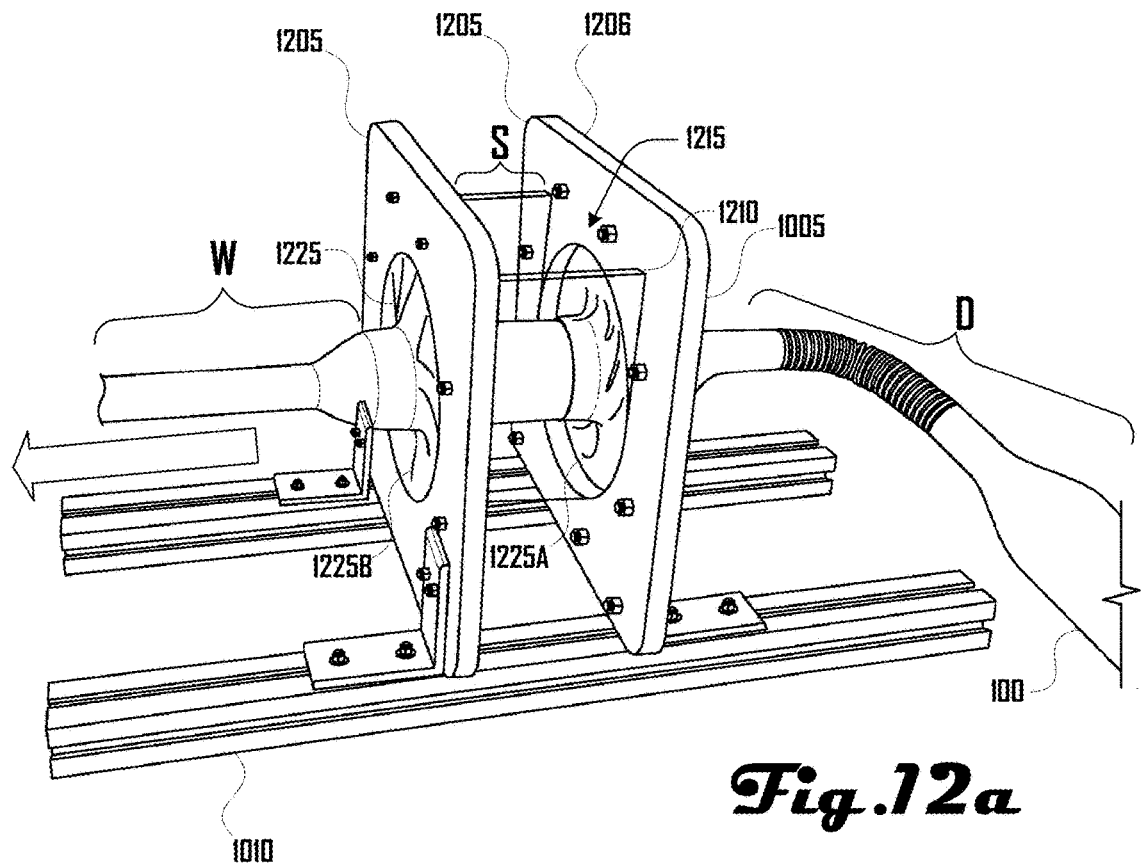
Figure 12B:
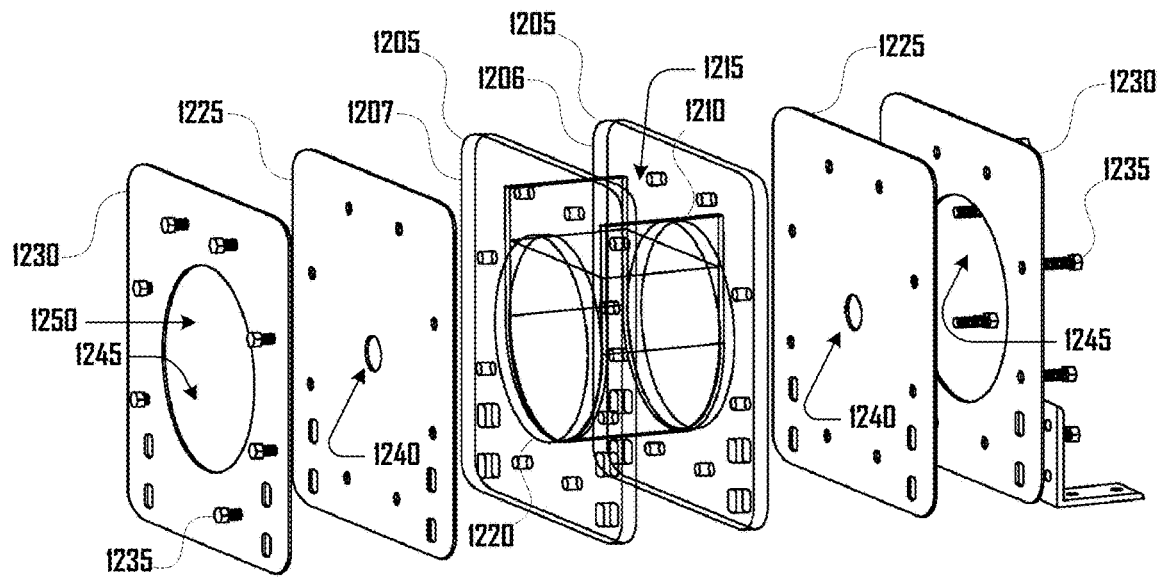

FIG. 12a illustrates a close-up perspective view of the resin chamber 1005 and FIG. 12b illustrates an exploded perspective view of the resin chamber 1005. As illustrated in FIGS. 12a and 12b, the resin chamber 1005 comprises a pair of chamber plates 1205 having a tub 1210 disposed between and coupled to the plates 1205 at respective inner faces 1206 to define a resin reservoir 1215. Both of the plates 1205 define a central opening 1220. A squeegee sheet 1225 is positioned on an outer face 1207 of each of the plates 1205 and is sandwiched between a mounting plate 1230, that couples the squeegee sheets 1225 to the respective outer faces 1207 of the plates 1205. In this example embodiment, a plurality of bolts 1235 are used to couple the mounting plates 1230 and squeegee sheets 1225 to the chamber plates 1205.

Each of the squeegee sheets 1225 defines a squeegee orifice 1240. Each of the mounting plates 1230 defines a mounting port 1245. In various embodiments, the central opening 1220, squeegee orifice 1240, and mounting port 1245 can be substantially circular and aligned along a common axis to define a liner channel that extends through the mounting plates 1230, squeegee sheets 1225, chamber plates 1205 and tub 1210.

In various embodiments, and as illustrated in FIG. 12a, the central openings 1220, and mounting ports 1245 can have a diameter that is larger than the tank 100 that is being drawn through the resin chamber 1005. Additionally, in various embodiments, the squeegee orifice 1240 can have a diameter that is smaller than the smallest diameter of the tank 100 that is being drawn through the resin chamber 1005.

Accordingly, for the tank 100 to pass through the squeegee orifice 1240 defined by the squeegee sheets 1225, the squeegee orifice 1240 may need to expand. To provide for such expansion, the squeegee sheets 1225 can comprise an elastic material, which in some embodiments can comprise silicone, latex, or other suitable material. Having an elastic material defining the squeegee sheets 1225 is desirable in various embodiments, because it can allow the squeegee sheets 1225 to dynamically adapt to changing diameters of the tank 100, and provide a seal for the resin reservoir 1215 such that resin disposed within the resin reservoir 1215 can be substantially contained therein as the tank 100 passes through the resin chamber 1005. Accordingly, the tank 100 can be completely surrounded by resin when passing through the resin reservoir 1215, and the dynamic seal of the squeegee sheets 1225 about the liner 100 tank 100 can prevent substantial leakage of resin out of the resin chamber 1005.

Additionally, the squeegee sheets 1225 can act as a squeegee to remove excess resin as the tank 100 leaves the resin chamber 1005. For example, as illustrated in FIG. 12a, the tank 100 can move in the direction indicated by the arrow such that a dry portion D of the tank 100 enters the resin chamber 1005 via a first squeegee sheet 1225A and exits via a second squeegee sheet 1225B. A soaking portion S is present within the resin chamber 1005 and a wet portion W exits the resin chamber 1005 via the second squeegee sheet 1225B. As shown in FIG. 12a, the squeegee sheets 1225 can extend in the direction that the tank 100 is moving. FIG. 13a illustrates a cross-sectional side view of a tank 100 passing through a squeegee sheet 1225 with resin 1305 on one side of the squeegee sheet 1225. As discussed herein, the force of feeding the tank 100 through the squeegee sheet 1225 causes the flexible squeegee sheet 1225 to stretch along the axis of travel of the tank 100, resulting in an angle θ relative to the tank 100. This angle θ can be variable based on factors, including flexibility of the squeegee sheet 1225, size of squeegee orifice 1240, angle of the squeegee sheet 1225 relative to the axis of travel of the tank 100, viscosity of the resin, feed rate of the tank 100, length of the resin chamber 1005, and the like. In various embodiments, it can be desirable to select or dynamically adjust any of these variables to attain a desired resin impregnation of the braid 300.

In embodiments where a tank 100 is covered in a braid 300 and passes through a resin chamber 1005, the second squeegee sheet 1225B can desirably force resin into the braid 300. For example, FIG. 13b illustrates one example resin impregnation gradient that can be generated by the squeegee sheet 1225, which can be variable based on angle θ, and the like, as discussed above.

Figure 14A:
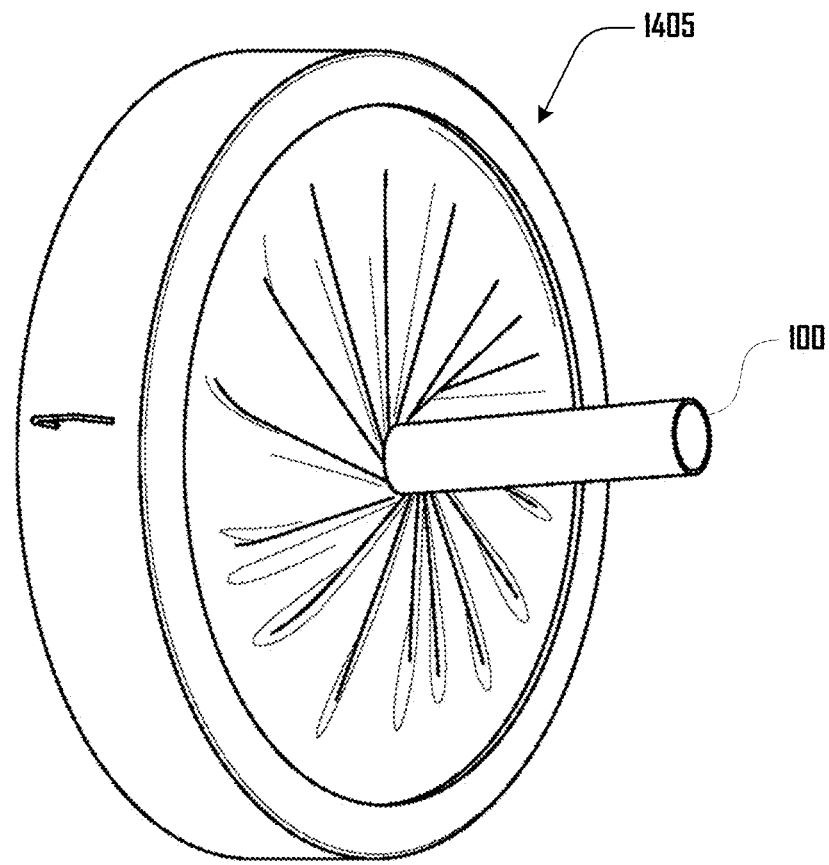
FIGS. 14a and 14b illustrate an iris diaphragm valve that can be used in place of or in addition to one or more squeegee sheet, in accordance with an embodiment.
Figure 14B:
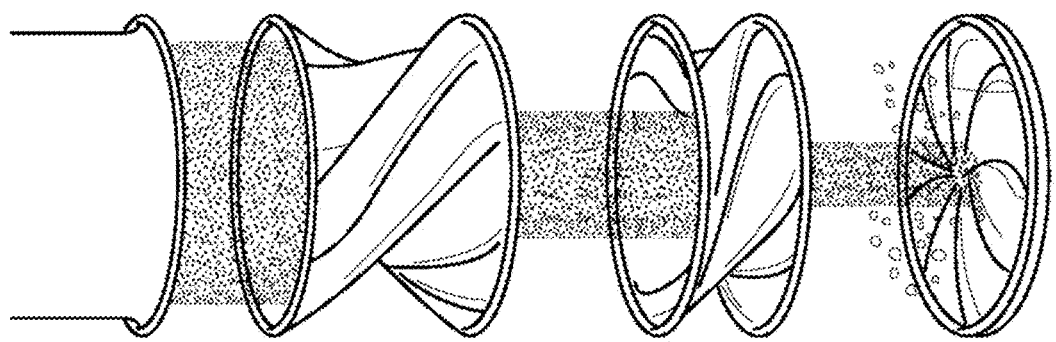

Although various embodiments of a resin chamber 1005 include one or more squeegee sheet 1225, in further embodiments any suitable sealing mechanism can be used. For example FIGS. 14a and 14b illustrate an iris diaphragm valve 1405 that can be used in place of or in addition to one or more squeegee sheet 1225.

Additionally, the example resin chamber 1005 and example resin application system 1000 shown herein should not be considered limiting on the variety of suitable resin chambers and example resin application systems that are within the scope and spirit of the present invention. For example, in some embodiments, example resin application system can comprise a plurality of chambers positioned in series such that a liner can enter and exit a plurality of chambers, which may hold the various fluids that can comprise resin or other desirable fluids. In further embodiments, the same tank 100 can be passed through a resin chamber 1005 a plurality of times.

In some embodiments a resin application system can be coupled with a braiding machine (e.g., as shown in FIGS. 6, 7a and 7b) such that an over-braided liner 100B can be coated in resin shortly after it is braided. Additionally, a tank 100 can be fed, drawn, forced, pulled or otherwise moved through one or more resin chambers 1005 in various suitable ways. Example embodiments including one or more traveler plates 1020 are shown in FIGS. 10, 11a and 11b, but any suitable system can be used in further embodiments as discussed herein.

Figure 15:
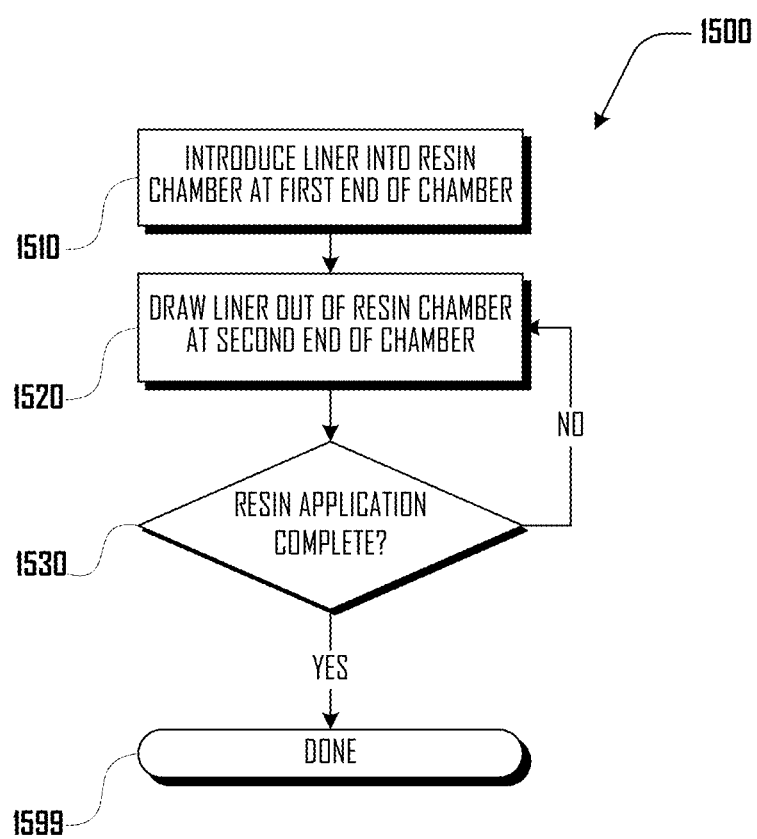
FIG. 15 illustrates a method of applying resin to a tank in accordance with one embodiment.

FIG. 15 illustrates a method 1500 of applying resin to a tank 100, which begins at 1510, where the tank 100 is introduced to a resin chamber 1005 at a first end of the resin chamber 1005. At 1520 the tank 100 is drawn out of the resin chamber 1005 at a second end of the resin chamber 1005. At 1530 a determination is made whether resin application is complete, and if not the method cycles back to 1520, where the tank 100 is further drawn out of the resin chamber 1005 at the second end of the resin chamber 1005. However, if at 1530, resin application is complete, the method 1500 is done at 1599. Accordingly, as discussed herein, in various embodiments, an elongated tank 100 can be treated with resin by passing the tank 100 through at least one resin chamber 1005 that holds resin.

Figure 16:
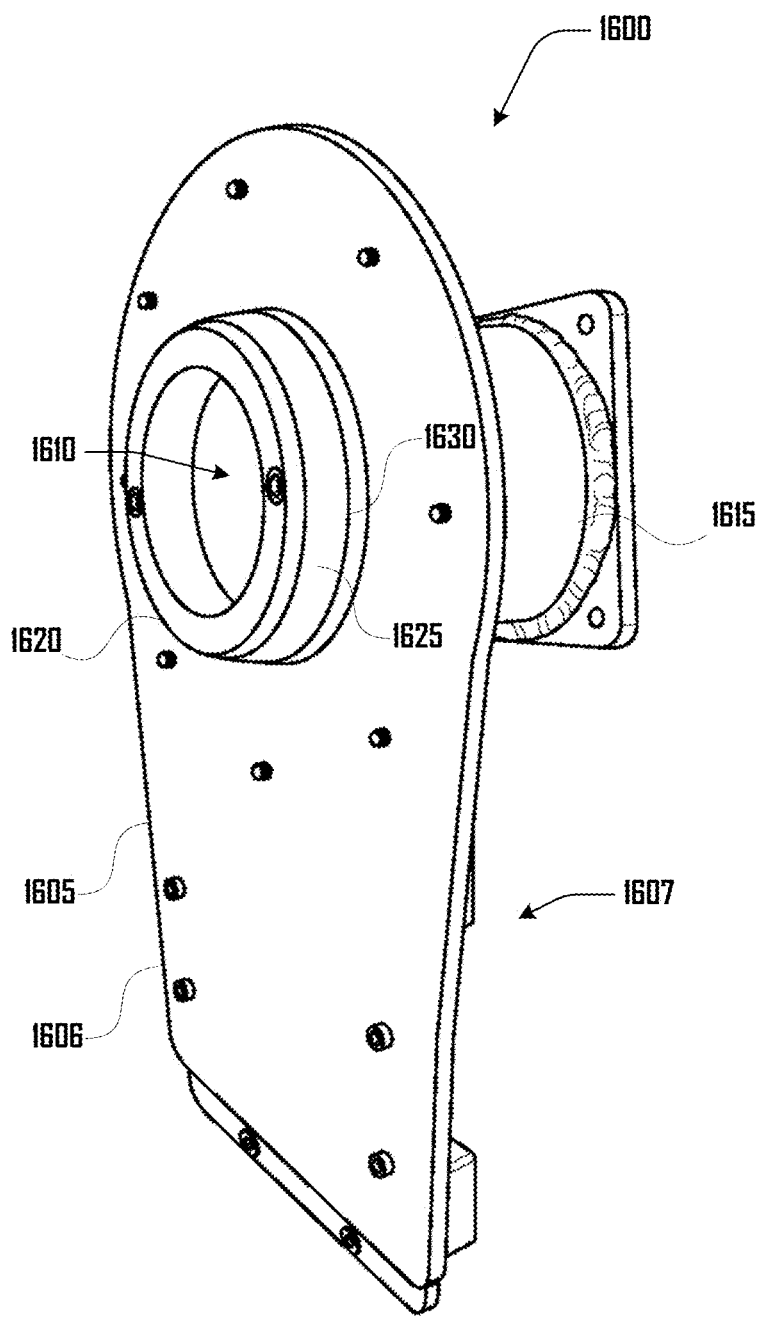
FIG. 16 illustrates an example of a braiding machine head comprising a head plate having a front and rear face, with a liner passage extending between the front and rear faces and defined by a tube.

In further embodiments, a squeegee system can be present proximate to a braiding machine 700 where resin is applied to a tank 100, before, during, or shortly after the braiding process. For example, FIG. 16 illustrates an example of a braiding machine head 1600 comprising a head plate 1605 having a front and rear face 1606, 1607, with a liner passage 1610 extending between the front and rear faces 1606, 1607 and defined by a tube 1615. The liner passage 1610 is surrounded on the front face 1606 by a cone 1620, a circular squeegee 1625 and a resin gap 1630.

In various embodiments, the braiding machine head 1600 can introduce resin at the forming point of the braid 300 on the liner. For example, the tank 100 can be fed through the liner passage 1610 and a braid 300 (FIGS. 6, 7a, 7b) can form tangentially to the surface of the cone 1620, where resin can be deposited into the fibers 610 (FIGS. 6, 7a, 7b) via the circumferential resin gap 1630.

After the resin has been deposited on the fibers 610, the fibers 610 can be laid down onto the tank 100 as a braid 300 as discussed herein. In order to achieve a desired volume fraction of fiber to resin, a controlled amount of resin can be introduced to the dry fibers 610 before it is applied to the tank 100 as a braid 300. In some embodiments discussed herein (e.g., FIGS. 6, 7a, 7b), a controlled amount of resin can be introduced to the dry fibers 610 before application to the tank 100 as a braid 300. In further embodiments, a braiding machine head 1600 can be used to over-saturate the fibers 610 via the circumferential resin gap 1630 and then excess resin can be removed via the circular squeegee 1625 before the fibers are 610 applied to the tank 100 as a braid 300. For example, the circular squeegee 1625 can provide pressure that substantially eliminates excess resin from the fibers 610 before the fibers 610 are applied to the tank 100.

Figure 17A:
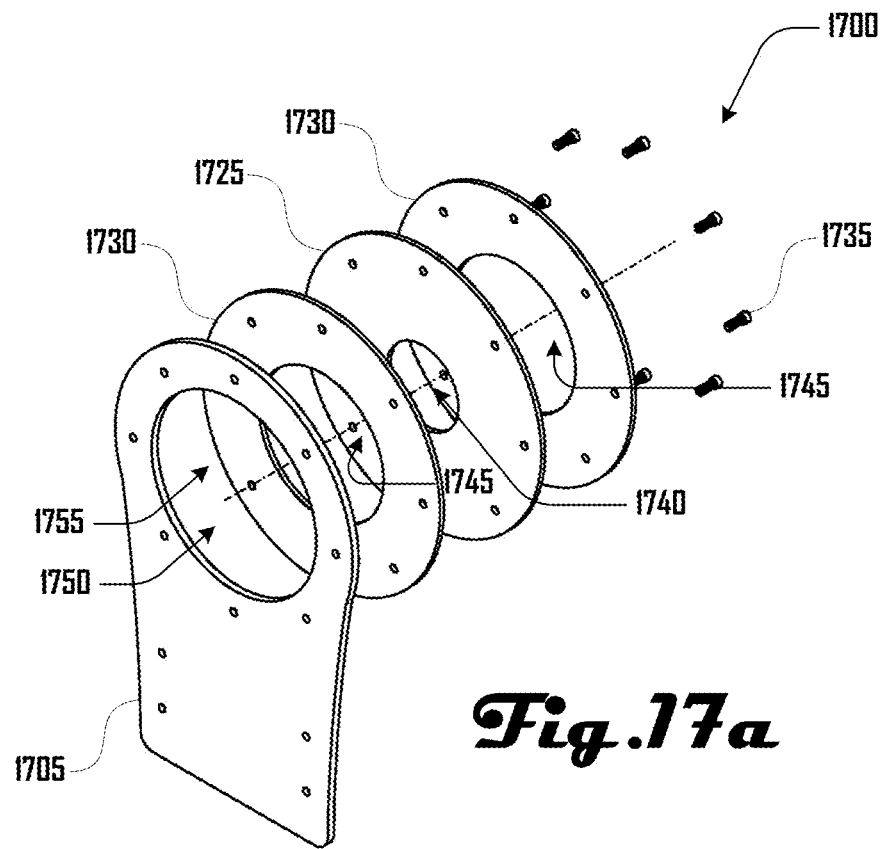
FIGS. 17a and 17b illustrate an example squeegee system that can be positioned downstream of a braiding machine after resinated fibers have been deposited onto the tank as a braid.
Figure 17B:
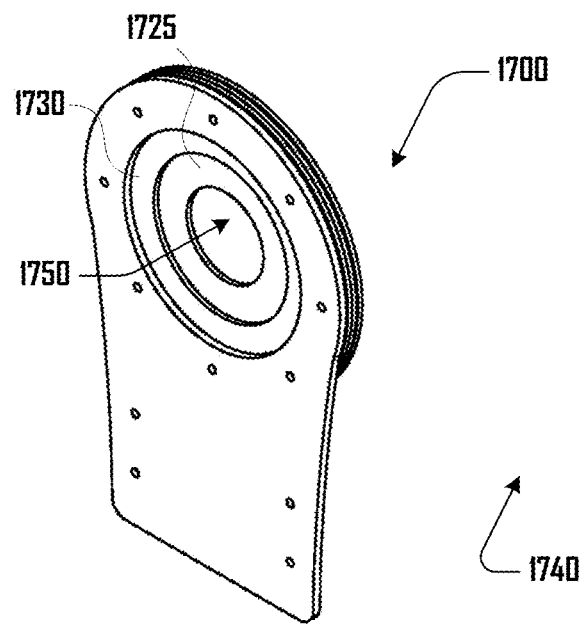

In further embodiments, a squeegee system can be positioned downstream of a braiding machine 700 after a resinated fiber 610 has been deposited onto the tank 100 as a braid 300. For example, FIGS. 17a and 17b illustrate an example squeegee system 1700 that can be positioned downstream of a braiding machine 700 after a resinated fiber 610 has been deposited onto the tank 100 as a braid. The example squeegee system 1700 comprises a mounting bracket 1705 and squeegee sheet 1725 sandwiched between first and second spacers 1730. The squeegee sheet 1725 and spacers 1730 are coupled to a face of the mounting bracket 1705 via a plurality of bolts 1735.

The squeegee sheet 1725 defines a squeegee orifice 1740 having a first diameter. The first and second spacers 1730 define a spacer orifice 1745 having a second diameter. The mounting bracket 1705 defines a bracket orifice 1755 having a third diameter. In various embodiments, the squeegee orifice 1740 has a smaller diameter than the spacer orifices 1745 and the bracket orifice 1755, and the bracket orifice 1755 has a diameter that is larger than the spacer orifices 1745 and the squeegee orifice 1740.

The orifices 1755, 1745, 1740 can be configured to be aligned along a central axis when the squeegee sheet 1725 and spacers 1730 are coupled to the mounting bracket 1705 as illustrated in FIGS. 17a and 17b. As discussed herein related to FIGS. 12a and 12b, the squeegee sheet 1725 can comprise a flexible material including silicone, rubber, or the like. The mounting bracket 1705 and spacers 1730 can comprise rigid materials, including metal, woods, plastic or the like.

As discussed herein, a braid 300 can be applied to a tank 100 in various embodiments. Although any suitable braid configuration and material can be used, in some embodiments, braid configurations and materials can be chosen such that the resulting braid has certain desirable characteristics. A non-limiting discussion of selection of desirable braid configurations and materials is presented in the following paragraphs.

Braid Calculations

Introduction

It may be desirable for the braid to satisfy certain kinematic constraints and mechanical equilibrium everywhere on the surface of the tank. For example, it may need to have a net coverage factor of unity (summed over all of the layers), it may need to be configured to not jam when bent, and it may need to retain the certain pressure within a liner that the braid surrounds.

In this analysis we focus on the straight sections and on the bend. We assume that if kinematic and mechanical equilibrium are satisfied in these areas, they will also be satisfied on the taper. However, in some embodiments, it can be desirable to redesign the taper of the liner to match a chosen braid. In the example implementation discussed herein, a liner taper design was optimized for braiding at a hose angle of 54.7°. Accordingly, where a hose angle of greater or less than 54.7° is implemented, it may be desirable to modify the liner taper design.

When selecting a braid, certain global variables can be constant or assumed to be constant throughout the tank geometry, and there can be local variables which can change as a function of the local tank geometry, as a function of the speed of the braiding machine versus the speed of the braiding mandrel, and the like. We include the tank geometry as part of the global variables.

As discussed herein and illustrated in the following figures, global variables can include:
M=number of braid layers,
N=number of carriers per layer,
v=fiber volume fraction in the braid,
y=the linear weight of the yarn,
ρ=density of the individual fibers in the yarn,
σ=tensile strength of the individual fibers in the yarn,
η=fiber strength utilization,
p=pressure inside the tank,
$r_f$=outer radius of the tank liner, large diameter section,
$r_s$=outer radius of the tank liner, small diameter section, and
R=bend radius of the small diameter section of the tank.

The local variables, at each location, i, are:
$\theta_i$=braid angle,
$t_i$=thickness of the yarn, and
$w_i$=width of the yarn.

Figure 20:
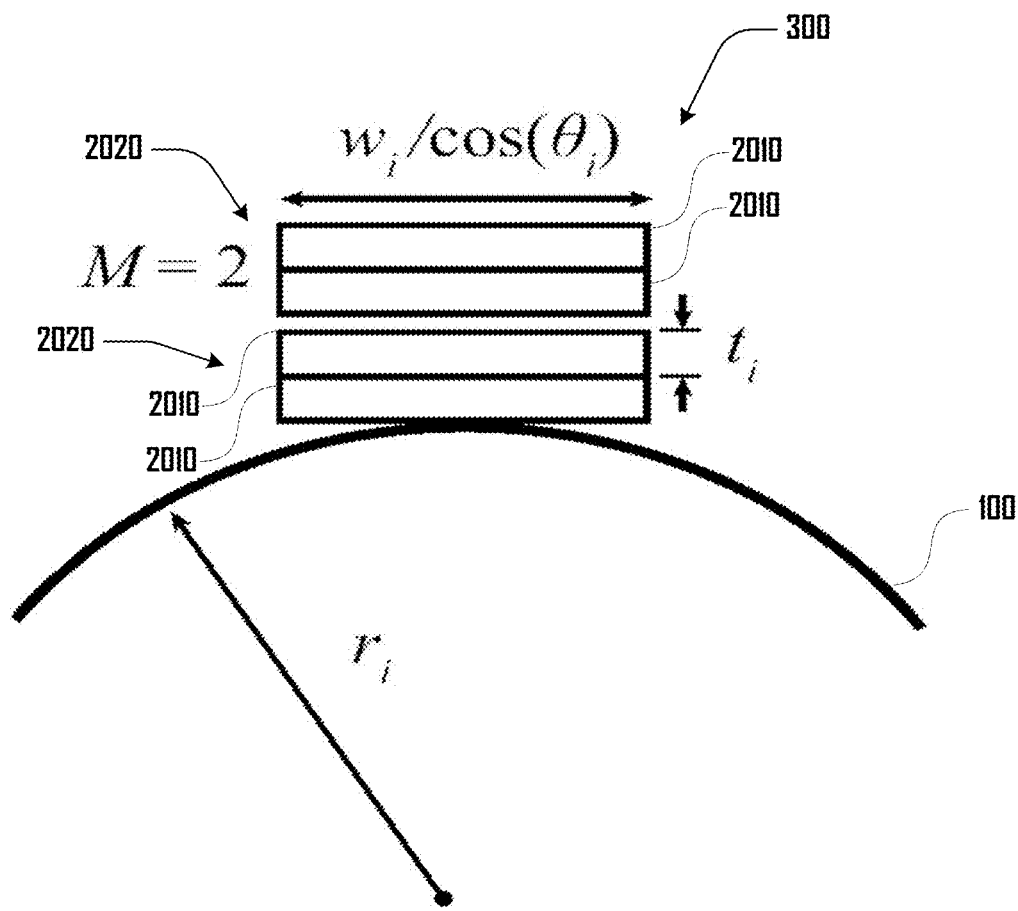
FIG. 20 illustrates a plurality of yarns resting on a tank, showing the assumed cross-sectional geometry of the yarns in accordance with one embodiment.

FIG. 20 illustrates a plurality of yarns 2010 resting on a tank 100, showing the assumed cross-sectional geometry of the yarns 2010. In various embodiments, and as illustrated in FIG. 20, a braid layer 2020 can comprise of two stacked yarns 2010, with each braid layer 2020 at $\pm\theta_i$. FIG. 20 illustrates an example of a braid 300 having four sets of yarns 2010, which corresponds to two layers 2020 (i.e., M=2). Additionally, FIG. 20 introduces variable $r_i$, which is the radius of the tank 100.

In various embodiments, braid angle ($\theta_i$) may be the only local variable that we have control over; the other local variables are dependent on the global variables and braid angle ($\theta_i$).

Kinematic Constraint Modeling
Combined Kinematics

Jamming occurs in some embodiments when the yarn aspect ratio, $\mathcal{AR}=w_i/t_i$, drops below a certain threshold. The yarns can only change shape to a certain degree, so if they are forced to change shape further, they jam and cannot obtain the desired configuration. The aspect ratio will always be lowest on the bend, so we calculate the minimum aspect ratio on the bend, $\mathcal{AR}_{min}$. This equation thus sets the threshold for jamming on the bend, as a whole, in accordance with some embodiments.

$$\mathcal{AR}_{min} = \frac{16\pi^2 \rho v r_s^2}{N^2 y} f(\theta_s, R/r_s), \quad (11)$$

where $$f(\theta_s, R/r_s) = \min\{f_2(\theta_s, R/r_s), f_3(\theta_s, R/r_s)\}$$

and $$f_2(\theta_s, R/r_s) = \left(\frac{R-r_s}{R}\right)^2 \cot^2(\theta_s)\left[1 - \left(\frac{R-r_s}{R}\right)^2 \cos^2(\theta_s)\right]$$

$$f_3(\theta_s, R/r_s) = \left(\frac{R+r_s}{R}\right)^2 \cot^2(\theta_s)\left[1 - \left(\frac{R+r_s}{R}\right)^2 \cos^2(\theta_s)\right].$$

Reduced coverage occurs when the aspect ratio, $\mathcal{AR}=w_i/t_i$, becomes too high. The yarns can only flatten a certain amount, and if they are forced to flatten past this threshold they will instead separate, opening up space between them (reduced coverage). Too much space between the yarns is undesirable, since it puts excess stress on the resin between the yarns. The yarns 2010 are flattest on the large diameter sections, so the aspect ratio here can be equal to the maximum aspect ratio on the whole tank, $\mathcal{AR}_{max}$. The aspect ratio there is equal to $$\mathcal{AR}_{max} = \mathcal{AR}_1 = \frac{16\pi^2 \rho v r_f^2}{N^2 y} f_1(\theta_f), \quad (12)$$

where $$f_1(\theta_f) = \cos^2(\theta_f). \quad (13)$$

Mechanical Equilibrium
Stresses

In various embodiments, it can be desirable to determine or model the stress in each part of the tank 100. Since some embodiments of the tank 100 comprise an anisotropic material, one approach can be to first calculate the membrane tension, which is a force per unit length. For embodiments having an isotropic material, the membrane tension can be equal to the stress in the material integrated through its thickness. The membrane tension can be divided up into two components: $\gamma_{H,i}$, in the hoop direction, and $\gamma_{A,i}$ in the axial direction. In the larger diameter section, we can have the following equations for a straight cylinder:

$$\gamma H, 1 = pr_f, \quad (14)$$

$$\gamma A, 1 = \frac{pr_f}{2}. \quad (15)$$

Here we have assumed that $t_1 \ll R$, which, in various embodiments, is a reasonable assumption for the larger diameter sections. If the tapers are properly designed, the membrane tension on the large diameter sections is the highest of the entire geometry, so the required fiber weight can be calculated by considering only the membrane tension on this portion of the geometry.

Braid Mechanics—No Resin

In embodiments where no resin is used on a tank 100, the yarns 1710 must carry substantially all of the load when the tank 100 is under pressure. Tension in a fiber for a cylindrical pressure vessel can be derived as follows to obtain the tension, $T_i$, in an individual yarn as function of $\gamma_{H,i}$ or $\gamma_{A,i}$.

$$T_i = \frac{\gamma_{A,i}\omega_i}{2\cos^2(\theta_i)M}, \quad (20)$$

$$T_i = \frac{\gamma_{H,i}\omega_i}{2\sin^2(\theta_i)M}, \tag{21}$$

Setting these tensions equal to each other, we see that, in accordance with some embodiments the ideal local fiber angle can be given by $$\theta_i = \arctan\left(\sqrt{\frac{\gamma_{H,i}}{\gamma_{A,i}}}\right). \tag{22}$$

Figure 22A:
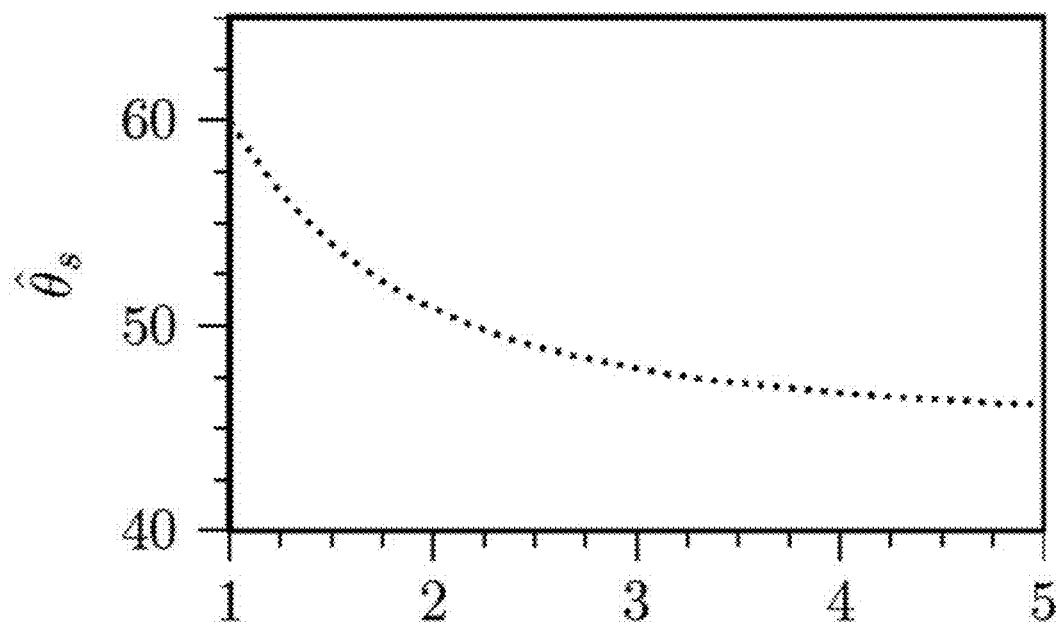
FIGS. 22a and 22b are plots of the function $g(\theta_s, r_t/r_s) = 3(r_t/r_s)^2 f(\theta_s, r_t/r_s)$ for various braid angles including a braid angle of 54.7°.

In one embodiment, on the straight larger-diameter section, $\theta_1 = 54.7°$, whereas on the curved sections the ideal local angle can be a function of $R/r_s$. These example angles are plotted in FIGS. 22a and 22b. Substituting the angle (22) into (20) or (21) and simplifying, we arrive at $$T_i = \frac{\omega_i}{2M}(\gamma_{H,i} + \gamma_{A,i}) \tag{23}$$

That tension can then be resisted by stress within the braid. As one example approximation, we can write the tension in a yarn when the tank bursts in terms of the tensile strength of the fibers that make up the yarn, $\sigma$ as $T = \sigma\, t_i w_i v$. However, fiber crimp and other factors can decrease the maximum tension that a yarn can withstand before breaking. Thus we introduce a strength utilization factor, $\eta$, and instead write that $$T_i = \sigma(\eta v t_i w_i). \tag{24}$$

This can also be written in terms of non-local variables as $$T_i = \frac{\sigma\eta y}{\rho}. \tag{25}$$

Since the membrane tension can be highest at the larger diameter sections, $i=1$, in some embodiments, the braid should be designed to restrain the pressure in that section, without worrying about mechanics in the smaller sections. In some embodiments, the resulting braid deformation in the smaller sections can be dealt with if it becomes an issue. We can calculate the tension within the yarn at section $i=1$ by combining Eqs. (2), (14), (15), (20), and (23), $$T_f = \frac{\pi\sqrt{3}\, pr_f^2}{NM}, \tag{26}$$

Equating (25) and (26), we can calculate the required linear weight of the yarn to restrain the pressure in the larger sections, $$y = \frac{\pi\sqrt{3}\, pr_f^2 \rho}{NM\eta\sigma}. \tag{27}$$

previous experimental data as $$\eta = \frac{\pi\sqrt{3}\, pr_f^2 \rho}{NMy\sigma}. \tag{28}$$

Combined Kinematics and Mechanics

The required linear weight of the yarn that was calculated in Eq. (27) can be used and combined with the kinematic results as discussed above, to determine the number of carriers that should be used in accordance with some embodiments. Substituting (27) into (12), along with the hose angle, $\theta_1 = \arctan(\sqrt{\surd\ }\, 2)$, gives the aspect ratio on the large diameter sections, $AR_{max}$, in terms of mechanical properties, $$AR_{max} = \frac{16\pi}{3\sqrt{3}}\, \frac{v\eta\sigma}{p}\, \frac{M}{N}, \tag{29}$$

or $$AR_{max} = \beta\frac{M}{N},$$

where the parameter is $\beta$ is defined by $$\beta = \frac{16\pi}{3\sqrt{3}}\, \frac{v\eta\sigma}{p}.$$

$\beta$ can be dictated by the burst pressure that is desired and the material properties of the fibers, and can be a ratio between the strength of the material and the desired strength of the vessel. We can influence this parameter through our choice of the braid material, and the like.

We substitute (27) into (11) to obtain a similar equation for, $AR_{min}$, which can dictate whether or not the braid jams on the bend, $$AR_{min} = 3\beta\left(\frac{r_s}{r_f}\right)^2 f(\theta_s, R/r_s)\frac{M}{N}.$$

In some embodiments, we can simplify this expression by replacing R with $r_l$ in f( ). For example, in embodiments where the liners 100A rested against each other so that the mandrels were directly touching, this replacement could be desirable. Since in some embodiments there can be a fiber layer and/or some space between the two cylinders, $R > r_l$, so setting $R = r_l$ in the jamming calculations is one example approximation. Making this substitution, we arrive at $$AR_{min} = g(\theta_s, r_f/r_s)\beta\frac{M}{N}. \tag{30}$$

where the function g( ) is defined as $$g(\theta_s, r_f/r_s) = 3\left(\frac{r_s}{r_f}\right)^2 f(\theta_s, r_f/r_s).$$

Combining (29) and (30) gives one equation that can show how the ratio N/M effects both jamming (through $AR_{min}$) and coverage (through $AR_{max}$), $$\frac{\beta}{\mathcal{AR}_{max}} = \frac{N}{M} = \frac{\beta g(\theta_s, r_\ell/r_s)}{\mathcal{AR}_{min}}. \quad (31)$$

Figure 21:
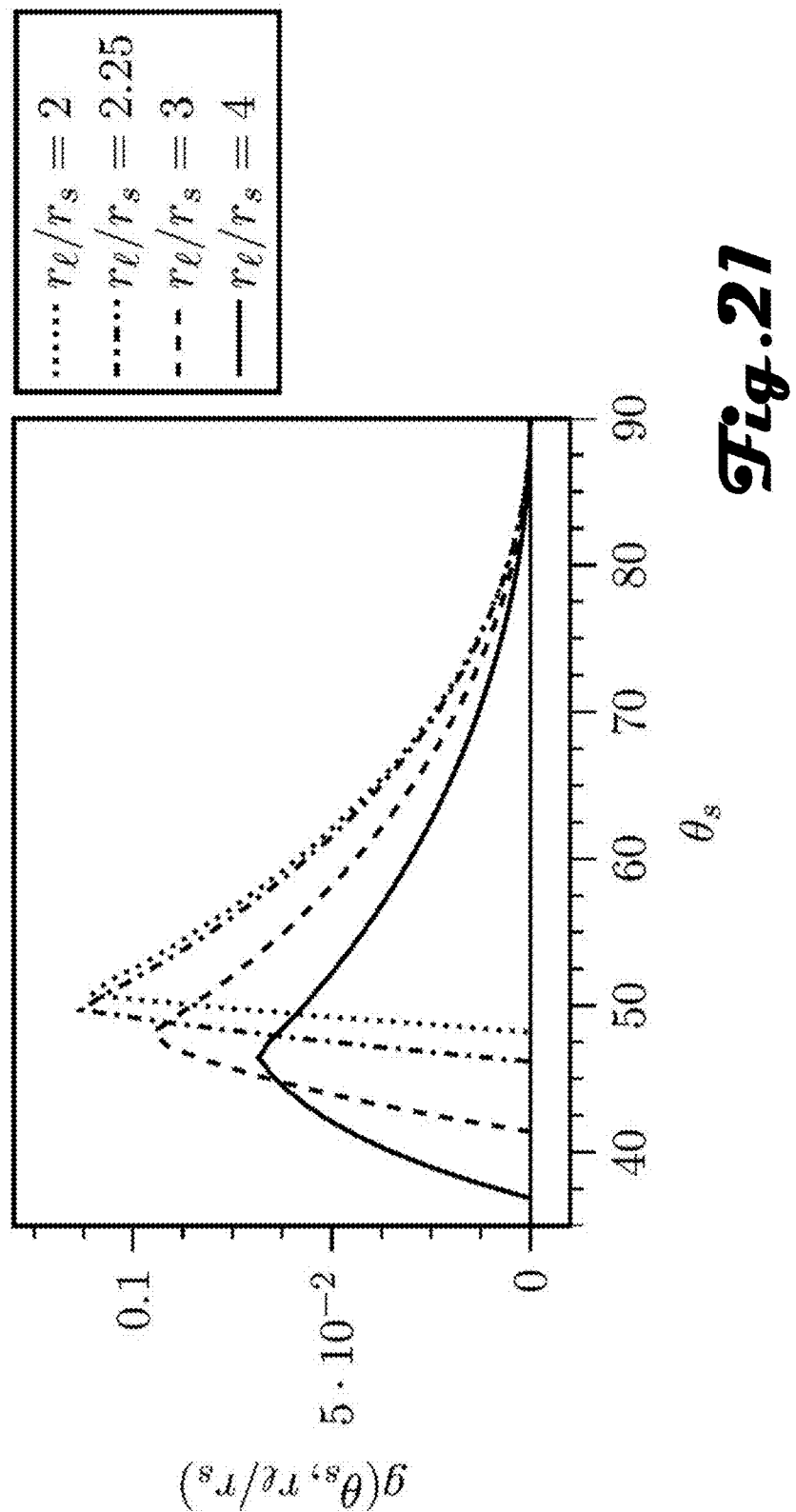
FIG. 21 is a plot of the function $g(\theta_s, r_f/r_s)$ for various values of $r_f/r_s$.

The function $g(\theta_s, r_\ell/r_s)$ is plotted in FIG. 21 for various values of $r_\ell/r_s$. Rearranging Eq. (31) shows that in various embodiment, $g(\ )$ sets the ratio of $\mathcal{AR}_{min}/\mathcal{AR}_{max}$, $$\frac{\mathcal{AR}_{min}}{\mathcal{AR}_{max}} = g(\theta_s, r_\ell/r_s), \quad (32)$$

so that higher values of $g(\ )$ allow the yarn to deform less. This is discussed in more detail herein.

One aspect of $g(\ )$, in various embodiments, is that the peak value of $g(\ )$ is a non-monotonic function of $r_\ell/r_s$. The peak value of $g(\ )$ can be greater for $r_\ell/r_s$, =2.25 than it is for $r_\ell/r_s$, =2 or 3. Thus, there is an optimal value of $r_\ell/r_s$ for various embodiments, which we can compute numerically to be at $r_\ell/r_s$=2.18 as discussed in more detail herein. Note that this is close to the chosen value for the corrugated liner of 2.25 discussed in the examples above.

We can also now express the required yarn weight from Eq. (27) in terms of $\beta$ as $$y = \frac{16\pi^2}{3NM} \cdot \frac{\upsilon}{\beta} \cdot r_\ell^2 \rho. \quad (33)$$

Tank Geometry

In various embodiments, determining the optimal ratio of $r_\ell/r_s$, can be instructive to examine the purpose of tapering to a smaller diameter. As discussed herein, in some embodiments, the yarns can have a tendency to adopt a lower aspect ratio on the inside and outside of the bend.

The degree of change of the aspect ratio, can be a function of $R/r_s$, the ratio of the bend radius to the tube radius, so this effect can be mitigated in some embodiments by decreasing the small tube radius, $r_s$, since the bend radius can be fixed at roughly the large tube radius, $r_l$, in order to allow adjacent large tubes to nest closely together. However, the yarns may also be compressed when the tube radius decreases from $r_l$ to $r_s$, in some embodiments it may be desirable for this change in ratio to not be dramatic. Hence, in some embodiments, there can be a balance between two competing effects: a smaller $r_s$ can allow for an easier bend, while a larger $r_s$ can allow for less compression during the change of diameters. These tradeoffs suggest that in some embodiments there can be an optimal ratio $r_l/r_s$ that would result in the least dramatic change in aspect ratio of the yarns.

In various embodiments, an optimal ratio $r_l/r_s$ can occur when the yarns have the least change in aspect ratio. This allows the yarns to avoid jamming while having desirable coverage on the large diameter sections. Thus, in one example, we can calculate the ratio of the aspect ratios, $\mathcal{AR}_{min}/\mathcal{AR}_{max}$, by dividing equations (11) by (12), and substituting in $\theta_l$=54:7, the hose angle, $$\frac{\mathcal{AR}_{min}}{\mathcal{AR}_{max}} = \left(\frac{r_s}{r_\ell}\right)^2 \frac{f(\theta_s, r_\ell/r_s)}{f_1(\theta_\ell)} = 3\left(\frac{r_s}{|r_\ell|}\right)^2 f(\theta_s, R/r_s)$$

In various embodiments, we can simplify this expression by replacing R with $r_l$ in $f(\ )$. If the tanks rested against each other so that the liners 100A were directly touching, this replacement would be valid in accordance with some embodiments. Since there can be a fiber layer and there can be some space between the two cylinders, however, $R>r_l$, so setting $R=r_l$ in the jamming calculations is a conservative approximation in some embodiments. Making this substitution, we define $g(r_s/r_l, \theta_s)=\mathcal{AR}_{min}/\mathcal{AR}_{max}$, and arrive at $$g(\theta_s, r_\ell/r_s) = \frac{\mathcal{AR}_{min}}{\mathcal{AR}_{max}} = 3\left(\frac{r_s}{r_\ell}\right)^2 f(\theta_s, r_\ell/r_s).$$

The function $g(\theta_s, r_\ell/r_s)$ is plotted in FIG. 21, for various values of $r_\ell/r_s$. The curve for each value of $r_\ell/r_s$ has a peak just like $f(\theta_s, r_\ell/r_s)$, meaning that in some embodiments for a given value of $r_\ell/r_s$ there can be a braid angle $\theta_s$ that best resists jamming. Furthermore, the peak values for $g(\ )$ themselves are a non-monotonic as a function of $r_\ell/r_s$, since the peak value of $g(\ )$ is greater for $r_\ell/r_s$=2:25 than it is for $r_\ell/r_s$=2 or 3. Thus, there can be an optimal value of $r_\ell/r_s$ that best resists jamming in some embodiments. This ratio depends on the braid angle that is chosen for the small diameter sections, and is discussed herein.

Accordingly, in various embodiments, the optimal ratio $r_\ell/r_s$ can be a purely geometric consideration, and may not depend on the specifics of the braid itself, or even the burst pressure. Thus, in various embodiments, the optimal diameter reduction can be selected without limiting the braid choices.

Optimal Braid Angle on Smaller Diameter Sections
Fewest Number of Layers (M)

In various embodiments, it can be desirable to have a braid configuration having the fewest number of layers M. To use the fewest number of braid layers, M, in some embodiments, the small section of a tank 100 can be braided at the angle corresponding to the peak in $g(\ )$ for a given value of $R/r_s$ since this point can correspond to the maximum ratio of $\mathcal{AR}_{min}/\mathcal{AR}_{max}$ through Eq. (32). In other words, this braid angle can give the best coverage on the large sections while still resisting jamming on the small sections.

The peak can occur at the intersection point between $f_2(\theta_s, R/r_s)$ and $f_3(\theta_s, R/r_s)$, which can be defined as $(\hat{\theta}_s, \hat{R}/r_s)$. Solving for $(\hat{\theta}_s, \hat{R}/r_s)$, we arrive at $$\frac{\hat{R}}{r_s} = \sqrt{\frac{2\cos^2\theta_s}{1-2\cos^2\theta_s}} \text{ or } \hat{\theta}_s = \cos^{-1}\left(\sqrt{\frac{\left(\frac{R}{r_s}\right)^2}{2\left(\frac{R}{r_s}\right)^2+2}}\right), \quad (34)$$

Figure 24A:
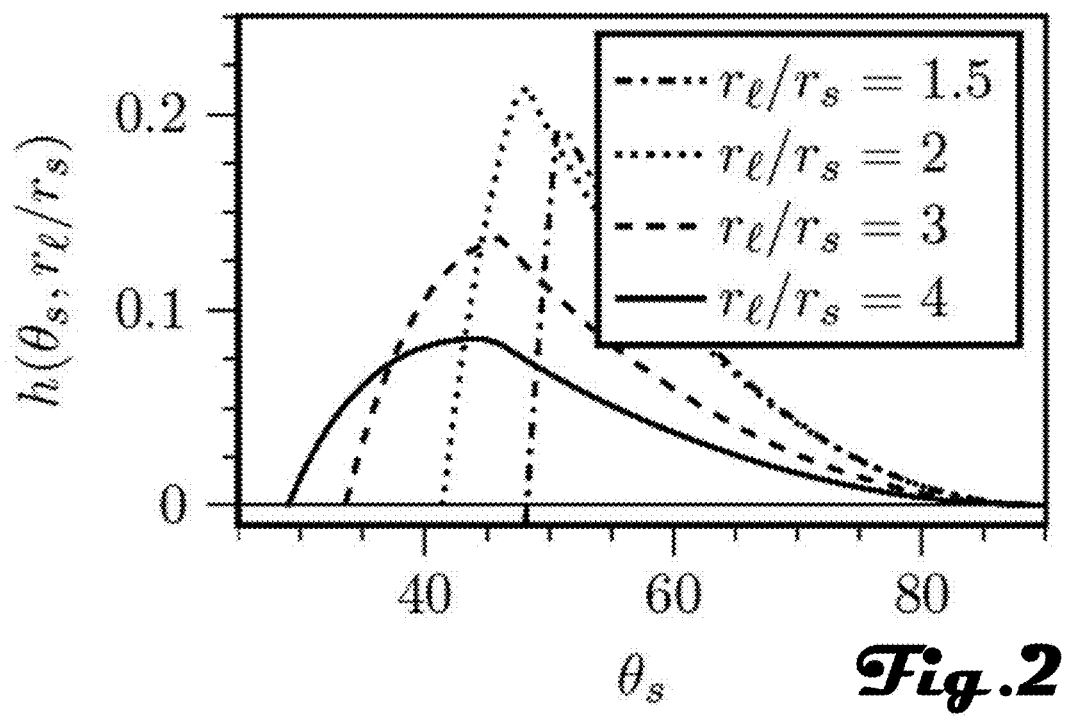
FIG. 24a is a plot of the function $h(\theta_s, r_t/r_s)$ for various values of $r_t/r_s$

The angle $\theta_s$ is plotted as a function of $R/r_s$ in FIG. 24a, which illustrates an example angle $\theta_s$ for maximizing $f(\ )$, or equivalently $g(\ )$, as a function of $R/r_s$.

Substituting into Eq. (11), the peak value off $(\theta_s, R/r_s)$ as a function of $\theta_s$ or $R/r_s$ can be $$f(\hat{\theta}_s, \hat{R}/r_s) = \left(\frac{3}{2}\csc\hat{\theta}_s - 2\sin\hat{\theta}_s\right)^2 \quad (35)$$

$$= \frac{\left(\left(\frac{\hat{R}}{r_s}\right)^2 - 1\right)^2}{2\left(\left(\frac{\hat{R}}{r_s}\right)^4 + 3\left(\frac{\hat{R}}{r_s}\right)^2 + 2\right)}.$$

Figure 22B:
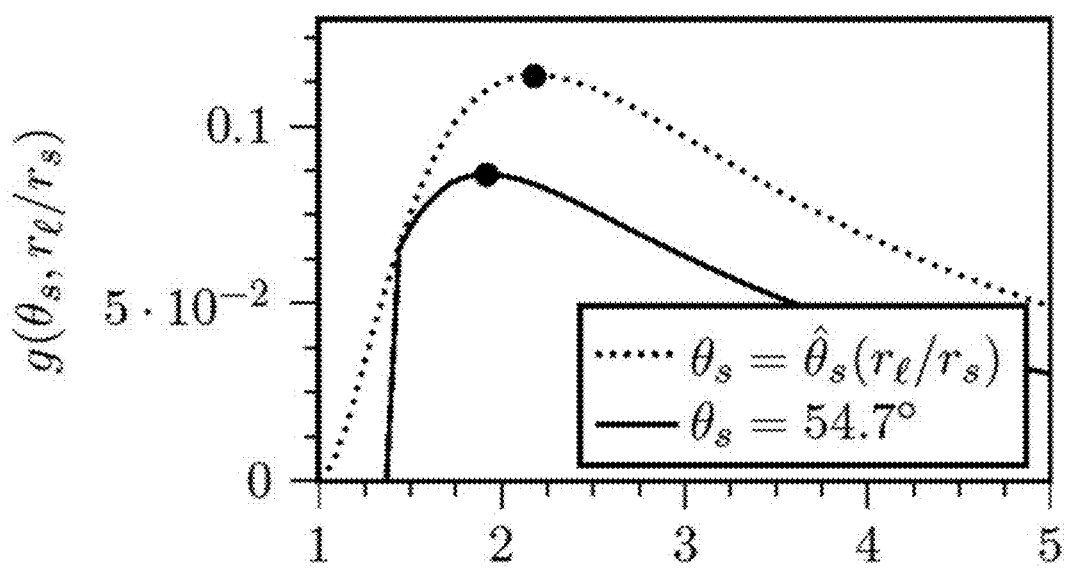

The peak value of g ($\theta_s$, $R_l/r_s$) as a function of $\hat{\theta}_s$ or $\hat{r}_l/r_s$ can be $$g(\hat{\theta}_s, \hat{r}_l/r_s) = \frac{3}{8}(16 + 16\cos(2\hat{\theta}_s) - 9\csc^2\hat{\theta}_s + 3\sec^2\hat{\theta}_s) \quad (36)$$

$$= \frac{3\left(\left(\frac{\hat{r}_l}{r_s}\right)^2 - 1\right)^2}{2\left(\frac{\hat{r}_l}{r_s}\right)^2\left(\left(\frac{\hat{r}_l}{r_s}\right)^4 + 3\left(\frac{\hat{r}_l}{r_s}\right)^2 + 2\right)},$$

and $g(\hat{\theta}_s, \hat{r}_l/r_s)$ is plotted in FIG. 22b as a function of $\hat{r}_l/r_s$. More specifically, FIG. 22b illustrates the value of $g(\theta_s, r_l/r_s)$, as a function of $r_l/r_s$, for $\theta_s=\hat{\theta}_s(r_l/r_s)$ and $\theta_s=54.7°$. The peak values at (1.92, 0.0863) and (2.18, 0.114) are denoted with dots.

One example optimal value of $g(\hat{\theta}_s, \hat{r}_l/r_s)$ at $r_l/r_s \approx 2.18$ is shown in FIG. 22b. Since the peak is pretty flat, the example value of $\hat{r}_l/r_s \approx 2.25$, or the like can be used as an alternative value. For example in further embodiments, the value of $r_l/r_s$ can be about equal to 2.15, 2.16, 2.17, 2.18, 2.19, 2.20, 2.21, 2.22, 2.23, 2.24, 2.25, 2.26, 2.27, 2.28, 2.29, 2.30, 2.31, 2.32, 2.33, 2.34, 2.35, or the like.

Least Material on the Small Sections

Though the example peaks in f( ) and g( ) allow us to use the fewest number of layers, $\hat{\theta}_s$ may not be the ideal angle for a given value of $r_l/r_s$. An alternate way to choose an optimal angle, $\theta_s$, is to choose the angle that deposits the least material on the small sections of the tank 100. The total thickness of material on the small sections, before bending, is given by $$2Mt_s = \frac{8\pi}{3}\frac{1}{\cos\theta_s}\frac{1}{\beta}\frac{r_f^2}{r_s}.$$

Thus, for a selected value of $r_l/r_s$, and $\beta$, lower braiding angles can result in a thinner composite. However, in some embodiments, for any value of $r_l/r_s$, there can be a lower bound to the braiding angle that is possible, before there is simply not enough yarn length to wrap around the outer edge of the bend. That limit can be given by Eq. (7), which denotes the point where f( ) and g( ) are equal to zero. Accordingly, if we choose the minimum allowable value of 0, that will give us the minimum possible thickness, but with an infinite number of layers to achieve net full coverage, since g( )=0.

Conversely, braiding at $\hat{\theta}_s$ can allow the use of a minimum number of layers. However, in some embodiments, the difference between $\hat{\theta}_s$ and the minimum $\theta_s$ may only be only a few degrees. Thus, in some embodiments, the savings in braid thickness that can be achieved by braiding at the minimum $\theta_s$ vs. braiding at $\hat{\theta}_s$ is minimal.

For the example value of $r_l/r_s$, =2.25, for example, $\hat{\theta}_s$ 49.7°, whereas the minimum possible value can be $\theta_s$ 46.2°. The maximum possible difference in braid thickness, for this example, on the thin region is thus)cos(49.7°)/cos (46.2°)≈0.93. Thus, in this example, we could reduce the braid thickness at the thin section by at the most 7% by using an infinite number of braid layers at the lowest possible braid angle. Accordingly, in various embodiments, it does not make sense to vary from $\hat{\theta}'_s$ on the small sections.

Hose Angle on the Small Sections

In embodiments, for mechanical reasons, it can be desirable to braid at the hose angle on the small sections (e.g., $\theta_s$=54.7°). The values of g( ) for this example angle are plotted in FIGS. 22a and 22b. In this example, the value of g( ) is less than if these sections are braided at $\theta_s=\hat{\theta}_s$, so less material can be used on each layer before the jamming threshold is reached. In this case the optimal ratio of $r_l/r_s$, is 1.92, as shown in FIG. 22b. Since the peak is pretty flat, in further embodiments the value of $r_l/r_s$ can be equal to 1.80, 1.81, 1.82, 1.83, 1.84, 1.85, 1.86, 1.87, 1.88, 1.89, 1.90, 1.91, 1.92, 1.93, 1.94, 1.95, 1.96, 1.97, 1.98, 1.99, 2.00, 2.01, 2.02, 2.03, 2.04, 2.05 or the like.

Braid Crimp and Fiber Utilization

In some embodiments, fiber 2010 of a braid 300 (see FIG. 20) can be wavy. In various embodiments, fibers 2010 that are excessively wavy in the braid 300 are not desirable. For example, excessively wavy fibers 2010 can be undesirable because extra fibers 2010 are used to cover the same area, which unduly increases the weight of the braid. Additionally, excessively wavy fibers 2010 can be undesirable because the force vector of the fibers points out-of-plane, meaning that the fibers may be tensioned more than they would be otherwise, decreasing fiber utilization (ii). Thus, in various embodiments, it can be desirable for fiber waviness to be minimized.

In one embodiment, the fiber waviness can be determined by a function of $t_i/w_i=1/\mathcal{A}_i$. In various embodiments, such waviness can have more of an impact on the large-diameter sections, i=1. On these, waviness can be defined as, $$\text{waviness} \approx \frac{1}{\mathcal{A}_1} = \frac{1}{\mathcal{A}_{max}} = \frac{3\sqrt{3}}{16\pi}\frac{p}{v\eta\sigma}\frac{N}{M},$$

Constant Diameter Liner

In some embodiments, a tank 100 can have a variable diameter as shown in FIGS. 1a-e. However, in further embodiments, a tank 100 can comprise a constant diameter. In embodiments that include braiding a constant diameter tank 100, with radius $r_s=r_l$ throughout, the considerations with choosing a braid configuration can be different. For example, in some embodiments, one consideration can be that the braid aspect ratio on the outside of the bend may in some cases be higher than it is on the straight sections. This may cause low braid coverage on the outside of the bend.

In some embodiments, to ensure that the straight sections are properly loaded, it can be desirable to choose $\theta_l$=54.7°. The minimum aspect ratio in various cases can be at the inside of the bend, jamming can be an issue at that location. The maximum aspect ratio, on the other hand, can be on the straight sections and it can be on the outside of the bend. Thus, in some embodiments, $$\mathcal{A}_{min} = \frac{16\pi^2 \rho v r_f^2}{N^2 y} f_2(\theta_s, R/r_l), \quad (37)$$

$$\mathcal{A}_{max} = \frac{16\pi^2 \rho v r_f^2}{N^2 y}\max\{f_1(\theta_s, R/r_l), f_3(\theta_s, R/r_l)\}, \quad (38)$$

$$y = \frac{\pi\sqrt{3}}{NM\eta\sigma}\frac{pr_f^2\rho}{}\cdot\max\left\{1, \sqrt{3f_3(\theta_l, R/r_l)}\left(\frac{6R^2+9R+5r_l}{6R^2+6R}\right)\right\} \quad (39)$$

Largest Diameter Possible

In some embodiments, in order to reduce overall complexity and reduce processing costs, it may be desirable to make liner sections of the largest diameter possible. Accordingly, the following uses the example derived braid equations discussed above to determine the largest $r_l$ that is possible. In this non-limiting example, we focus on satisfying the kinematic and mechanic equations on the large diameter, since the conditions on the small diameter can be satisfied with proper choice of $AR_{max}$, $r_l/r_s$, and $\theta_s$. Thus, the two equations that can be solved are $$y = \frac{\pi\sqrt{3}\,\rho r_f^2 \rho}{NM\eta\sigma} \text{ and } AR_{max} = \frac{16\pi^2 \rho v r_f^2}{3N^2 y}.$$

We can combine these equations to obtain the previously derived example relationship for N, $$N = \frac{16\pi}{3\sqrt{3}} \frac{Mv\eta\sigma}{p \cdot AR_{max}},$$

As well as a new example relationship for $r_l$ $$r_l = \frac{4M\eta\sigma}{3p} \sqrt{\frac{vy}{\rho \cdot AR_{max}}}.$$

In this example embodiment, we have expressed $r_l$ in terms of the number of layers 2020 M, rather than the number of carriers, N. In some embodiments, the number of layers 2020 can be more restrictive criteria, since fiber utilization can decrease with increasing number of layers 2020.

To obtain some numerical values for allowable values of $r_l$, values can be chosen for the other parameters. In one non-limiting example, we can set $\sigma$=700 ksi, p=9 ksi, $\eta$=0.75, v=0.55, and p=1.8 g/cc. We can set y=800 g/km, for single-end 12k fibers, since in various embodiments, fiber utilization can drop if higher weight fibers are used. We can base $AR_{max}$ on a $AR$=1.5 and g( )=0.0863 (one example optimal value for $\theta_s$=54.7° as discussed herein), yielding $AR_{max}$=1.5/0.0863=17.4. Using these values, we can calculate the maximum allowable $r_l$ for various numbers of layers, M, and the required value of N to achieve that value of $r_l$. These values are presented in the following table.

| M | 2 · $r_l$ | N |
|---|-----------|------|
| 2 | 1.65 inches | 40.4 |
| 3 | 2.48 inches | 60.6 |
| 4 | 3.30 inches | 80.8 |

In the table above, the maximum diameter $2r_l$ for various example numbers of layers, assuming single-end 12k fibers is shown. The necessary number of carriers, N, is also presented, though this may be rounded to a multiple of four in accordance with some embodiments.

In the example discussed above, the number of carriers does gets close to the maximum allowable number on conventional braiding machines, which is typically N=144. This number of carriers corresponds to a diameter of 5.8 inches, but would require M=7 layers. However, the level of fiber utilization with this many layers would be unacceptably low for many embodiments.

Non-Axisymmetric Braiding

During bending of an over-braided liner 100B, the braid angle can become larger on the inside of the bend, and smaller on the outside of the bend. This can result in two undesirable effects. Firstly, the braid can jam during the bending process, limiting the bend angle that is achievable and thereby limiting the amount of fiber that can be put in a single braid layer. Secondly, the angles around the circumference of the liner can deviate significantly from the ideal local angles for mechanical equilibrium. For resin-coated braids 300 this can result in significant resin stresses, higher stresses in fibers, and an unbending moment as discussed in greater detail herein.

However, in some embodiments, the small diameter sections can be braided with a non-axisymmetric braid to mitigate these effects. Accordingly to some embodiments, the desired braid pattern, before bending, could have a lower angle on the inside of the bend, and a higher angle on the outside of the bend. After bending, both areas would approach their ideal angle, and be further away from the extreme angles that may cause the previously mentioned issues.

A non-axisymmetric braid can be generated in various suitable ways. For example in one embodiment, a braiding machine can be operated using a non-circular forming ring, and the resulting braid 300 would have a non-axisymmetric distribution of angles. In one specific example implementation, an ellipsoidal forming ring was tested in combination with a cylindrical mandrel. Based on the results of this research, it was determined that a desired pattern of angles can be created by manipulating the relationship between the forming ring and the mandrel of a braiding machine. For example, the mandrel is translated laterally relative to a conventional circular forming ring, it can result in a distribution of angles that generates a desired pattern. One embodiment comprises a flexible forming ring with a plurality of actuators to adjust its shape. This can allow for a greater degree of control over the circumferential distribution of braid angles.

The "Otherbend"

Turning to FIG. 23, in some embodiments, if the ratio of bend radius, R, to small tube radius, $r_s$, is larger, the fibers 2010 can compress less on the inside and outside of the bend, and jamming can be less of an issue. This can allow for greater coverage on the large diameter sections, because it can allow for more fiber. To allow for a larger bend radius, the bend can instead adopt geometry as shown in FIG. 23, or the like, in contrast to the example geometry illustrated in FIG. 3a, and the like. In one embodiment, the length of the corrugated section is greater than the corrugated section shown in FIG. 1, which allows the tube to bend outward before curving back as illustrated in FIG. 23.

In some embodiments, the smaller connector portion 110 of the tank 100 bends outward so that its surface is coplanar with the outer edge of the large diameter tubing portions 130. This is illustrated by the axis $X_1$ and $X_2$ being parallel to the face of the larger diameter tubing portion 130 and coincident with the apex of the bend in the smaller diameter connector portions 110. Accordingly, in such embodiments, the increased bend may not affect how closely the large diameter sections can be packed together. If this condition is satisfied, the bend radius can be calculated as $$2R + 2r_s = 4r_l \quad (40)$$

$$R = 2r_l - r_s, \quad (41)$$

as opposed to the previous example relationship of R=$r_l$.

Given this relationship, it is possible to obtain an alternative relationship for $AR_{max}/AR_{min}$. For example, combining (27) as (11) before, but substituting (41), we arrive at $$A\mathcal{R}_{min} = h(\theta_s/r_\ell/r_s)\beta\frac{M}{N}. \quad (42)$$

$$h(\theta_s, r_\ell/r_s) = 3\left(\frac{r_s}{r_\ell}\right)^2 f\left(\theta_s, \frac{2r_\ell}{r_s} - 1\right).$$

Figure 24B:
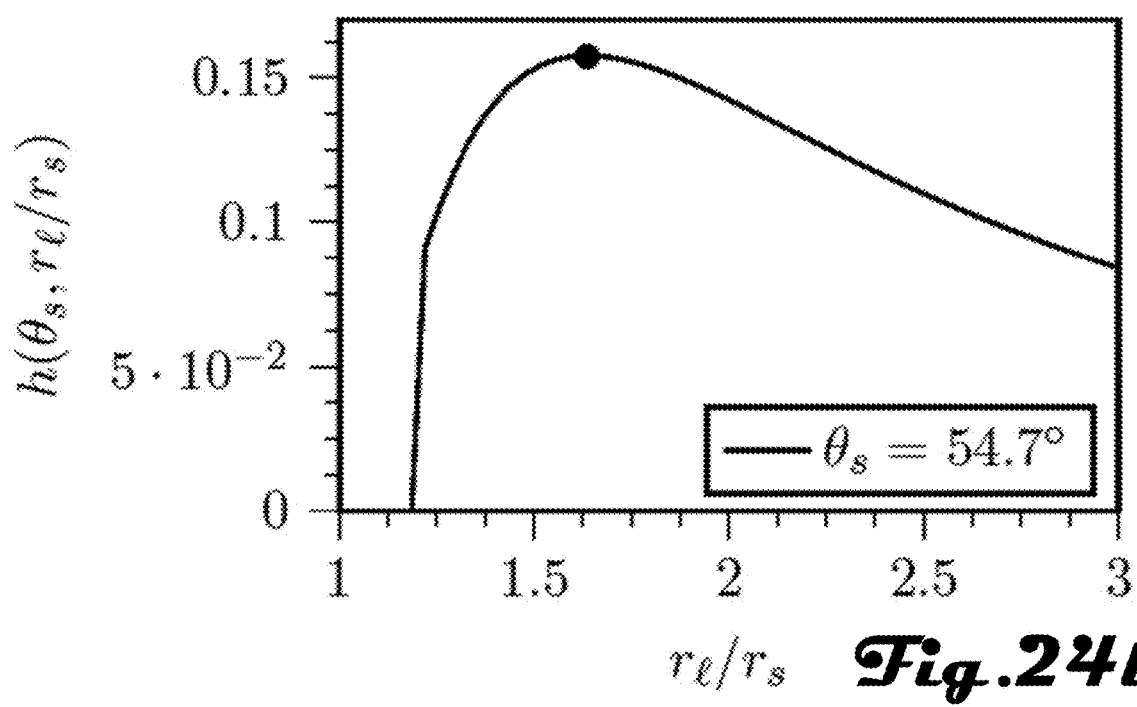
FIG. 24b illustrates the value of $h(\theta_s, r_t/r_s)$, as a function of $r_t/r_s$ for a braid angle of $\theta_s = 54.7°$.

The function $h(\theta_s, r_\ell/r_s)$ is plotted in FIG. 24*a* for various values of $r_\ell/r_s$. In FIG. 24*b* illustrates the value of $h(\theta_s, r_\ell/r_s)$, as a function of $r_\ell/r_s$, for $\theta_s=54.7°$. The peak value at (1.64, 0.157) is denoted with a dot. Note that the values of $h(54.7°, r_\ell/r_s)$ are much greater than the example values of $g(54.7°, r_\ell/r_s)$ in FIG. 21. Since $h(54.7°, r_\ell/r_s)=A\mathcal{R}_{max}/A\mathcal{R}_{min}$, $A\mathcal{R}_{min}$ can be set by jamming considerations, this means that $A\mathcal{R}_{max}$ can be smaller, and therefore the coverage on the larger diameter sections can be higher. Furthermore, in this example, the maximum value of $h(\theta_s, r_\ell/r_s)$ occurs at $r_\ell/r_s$, =1.64, which is a smaller ratio than the optimal for other example bends discussed herein. In some embodiments, smaller values of this ratio can be easier to form on a corrugation machine, so making the wider bend can help with both the braid and the liner in various embodiments.

Bend Geometry

In order to attain a desired bend geometry, the flexible section must be a certain length, and the corrugations must have a certain correct stiffness. If these two parameters are not within a desired range, the bend will not form the desired shape. For example, if the flexible section is too short, the tank 100 simply won't be able to bend. In another example, if the flexible section is too long, the bend will either be too long or too wide, thereby taking up a larger volume than may be desired.

Figure 25A:
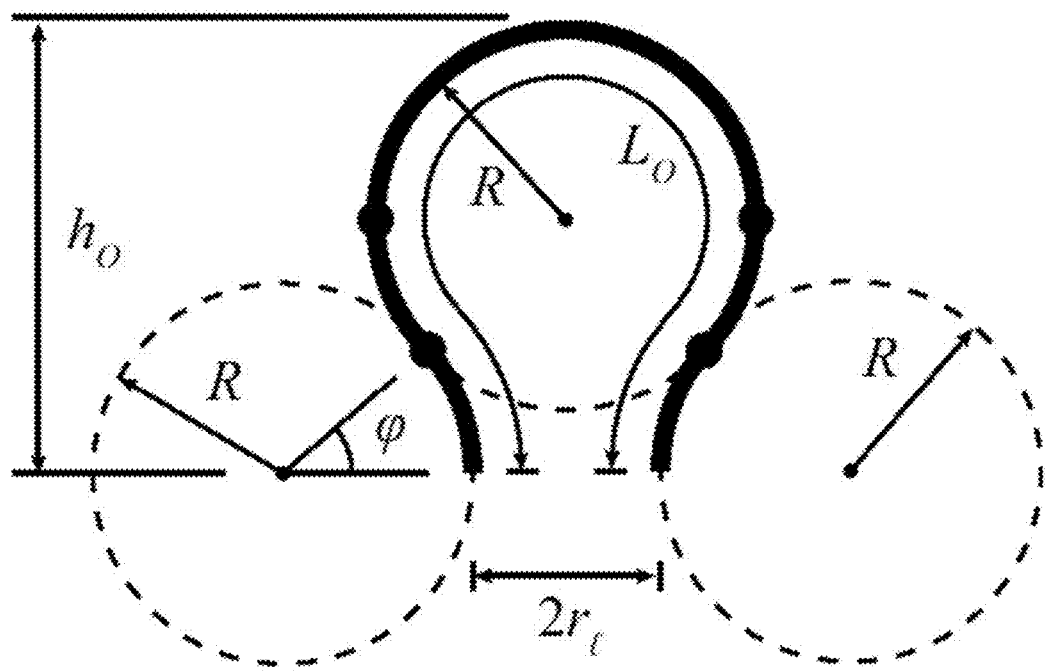
FIG. 25a illustrates an example bend that comprises components with identical curvature and FIG. 25b illustrates the length of a corrugated section of a liner necessary to complete the "Otherbend" in accordance with some embodiments.
Figure 25B:
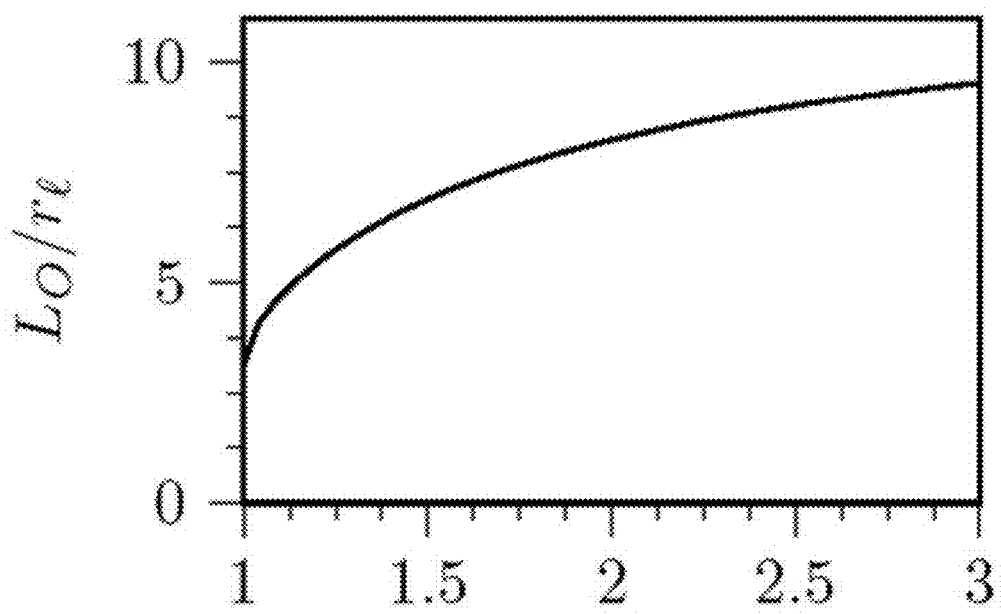

In various embodiments, the bend can have a minimum length and width if all segments are bent at the same radius, R. This configuration is illustrated in FIGS. 25*a* and 25*b*. More specifically, FIG. 25*a* illustrates an example bend that comprises components with identical curvature. FIG. 25*b* illustrates the length of corrugated section necessary to complete the "Otherbend" in accordance with some embodiments.

In some embodiments, the minimum bend radius can be set either through braid jamming and/or by designing the corrugations such that the tube can only bend a certain amount. In some embodiments, designing the corrugations such that the tube can only bend a certain amount can be desirable since it can allow for more flexibility in choosing a braid for a given liner geometry. Furthermore, the corrugations can be shallow if the minimum bend radius is large. This can provide the benefit of allowing a larger extrusion nozzle during the corrugation process. The maximum bend radius can be set by the length of the flexible section of the tank. If the length matches the length required to attain the minimum bend radius, the shape can be set at the one shown in FIG. 25*a*.

The total length of the "Otherbend," $L_O$, can be written as a function of the angle, $\varphi$, shown in FIG. 25*a*, where the angle $\varphi$ is expressed in radians, as $$L_O = \pi R + 4R\varphi.$$

If we enforce the distance between the two ends to be $2r_1$, the angle $\varphi$ can be expressed as $$\phi = \cos^{-1}\left(\frac{R + r_\ell}{2R}\right).$$

Combining these previous two equations with (41) for the bend radius, we arrive at an expression for length of the corrugated section as a function of the two tube radiuses only, $$L_O = (2r_\ell - r_s) \cdot \left[4\cos^{-1}\left(\frac{3r_\ell - r_s}{4r_\ell - 2r_s}\right) + \pi\right]. \quad (44)$$

Volumetric Efficiency

In some embodiments, implementing the "Otherbend" can decrease the volumetric efficiency of the tank as a whole. For example, as a baseline, we can compare the volumetric efficiency of the Otherbend to that of the U-bend described in herein and illustrated in FIG. 3*a*. The volume of an embodiment of the U-bend can be defined as $V_U=\pi^2 r_\ell r_{sU}^2$, where $r_{sU}$ is the small radius of the U-bend. We can normalize this volume by that of two large-diameter cylinders that would take up the same length. The length, $h_U$, is $r_\ell+r_{sU}$. Therefore, the normalized volume in various embodiment can be $$\frac{V_U}{2\pi r^2 h_U} = \frac{\pi^2 r_{sU}^2 r_\ell}{2\pi r_\ell^2 (r_\ell + r_{sU})} \quad (45)$$

As discussed in examples above, in some embodiments, it can be desirable for the U-bend to have a ratio $r_\ell/r_{sU}=1.92$ if both sections are braided at 54.7°. We use this example ratio as a baseline, and compute that for this example Otherbend ratio $V_U/2\pi^2 r^2_{lhU}$, =0.28.

The volume of the Otherbend, $V_O$, can be $V_O=\pi r^2_s L_O$. However, the length of the Otherbend, $h_o$, can be greater than the length of the U-bend, $h_u$, so we can take this into account when comparing the volumetric efficiencies. One example comparison is $$\frac{V_O - 2\pi r_\ell^2(h_O - h_U)}{2\pi r_\ell^2 h_U} = \quad (46)$$

$$\frac{1}{2 + 2\frac{r_{sU}}{r_\ell}}\left\{\left(\frac{r_s}{r_\ell}\right)^2\left(2 - \frac{r_s}{r_\ell}\right)\left[4\cos^{-1}\left(\frac{3 - \frac{r_s}{r_\ell}}{4 - 2\frac{r_s}{r_\ell}}\right) + \pi\right] + 2\left(1 + \sqrt{7 - 10\frac{r_s}{r_\ell} + 3\left(\frac{r_s}{r_\ell}\right)^2} - \frac{r_{sU}}{r_\ell}\right)\right\}$$

Figure 26:
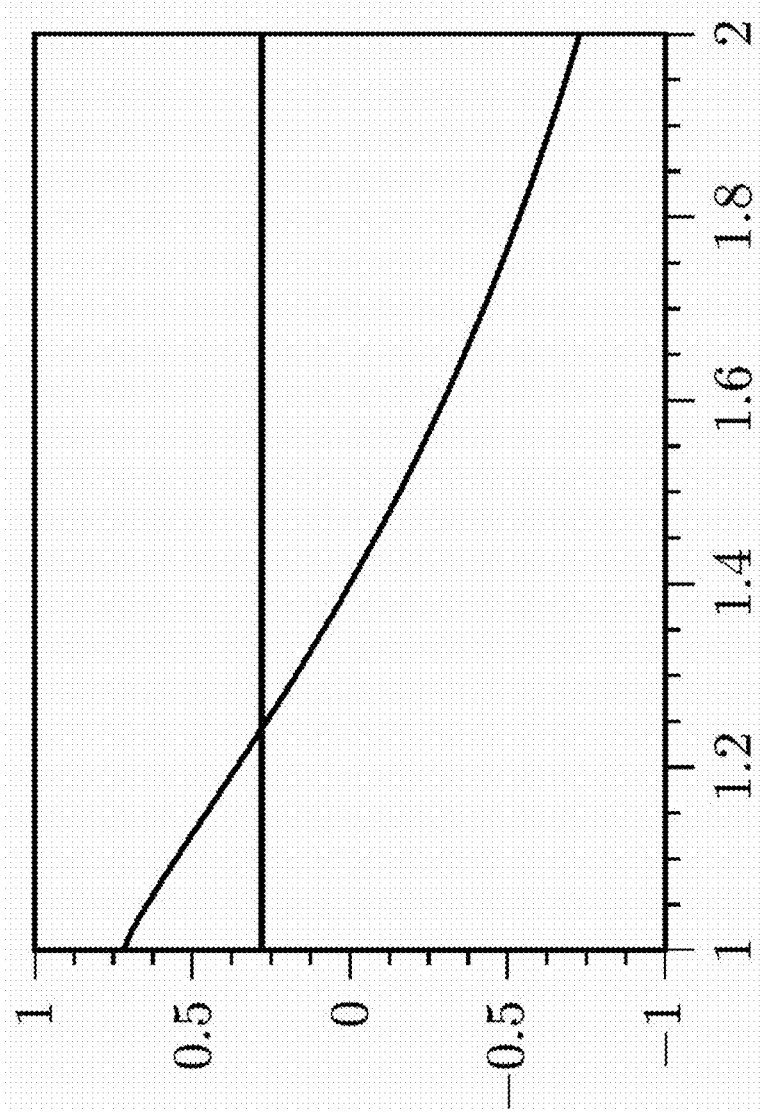
FIG. 26 is a plot that illustrates the relative volume change of using the Otherbend.

This equation (46) is plotted in FIG. 26, which illustrates the relative volume change of using the Otherbend. The horizontal line is at 0.28, and shows the volume of a U-bend with and example ratio of $r_\ell/r_{sU}=1.92$.

In this example, the normalized volume of the Otherbend is equal to the volume of the U-bend at $r_\ell/r_s=1.24$. In various embodiments, for ratios that are less than this, the Otherbend has a greater volume.

In further embodiments, for ratios that are greater, the U-bend can have a greater volume. However, this example analysis neglects the volume of the taper, which also changes as a function of $r_\ell/r_s$. In an example modeling, the volume of the two bends were measured in SolidWorks, including the taper, and it was found that the crossover point can be at $r_\ell/r_s=1.35$.

For the braid to be optimized on the Otherbend, in accordance with some embodiments, the ratio should be $r_l/r_s=1.64$. However, in such embodiments in order to lose a minimal amount of volume, the ratio should be lower. In addition, in some embodiments, a lower ratio can be better for manufacturing the liner. Since the peak of $h(\theta_s, r_l/r_s)$ as illustrated in FIGS. 24a and 24b is relatively flat, in various embodiments, there is room to adjust the ratio without significantly affecting the braid. For example, in some embodiments, ratios between approximately 1.5 and 1.8 can be used. In further embodiments, ratios between approximately 1.2 and 2.1 can be used.

In one preferred implementation, choosing $r_l/r_s=1.5$ is beneficial for the braid, liner, and tank volume. According to example calculations, for $r_l=2.625"$, this ratio loses ~80 mL of internal volume per bend, which is equivalent to ~½" of large-diameter tank length. Since there is a bend on either side of each large-diameter section, the total loss is 1" of large-diameter tank length.

Method for Choosing a Braid Configuration

A braid configuration can be chosen based on various criteria, including one or more of the criteria discussed above, in accordance with various embodiments. For example, it can be desirable to select an optimal braid for a given liner geometry, braid material, burst pressure, and/or the like. The following illustrates one example selection method 2700 illustrated in FIG. 27 that can be based on the example equations derived above.

Figure 27:
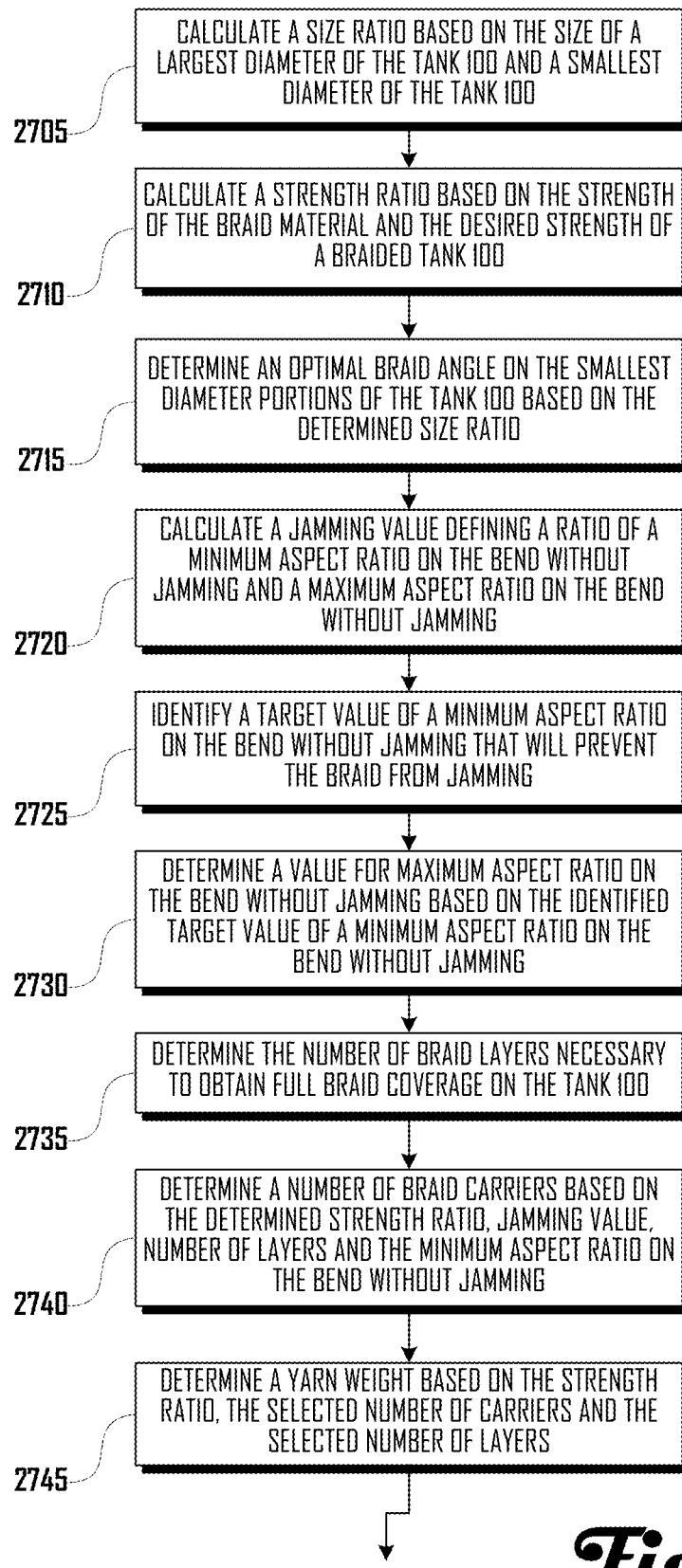
FIG. 27 illustrates an example method of choosing an optimal braid configuration based on various criteria, in accordance with various embodiments.

Turning to FIG. 27, step 2705 is to calculate a size ratio based on the size of a largest diameter of the tank 100 and a smallest diameter of the tank 100. For example, in one embodiment, one can calculate the value of $r_l/r_s$, where $r_l$=outer radius of the tank 100, large diameter section; $r_s$=outer radius of the tank 100, small diameter section. (See e.g., FIGS. 16 and 23).

Values of $r_l/r_s$, for two example liner options, sectioned and corrugated, are shown in the table below. However, these two examples are only two examples of the numerous liner configurations that are within the scope and spirit of the present inventions, and these two examples should not be construed to be limiting.

|  | corrugated | sectioned |
|---|---|---|
| $2r_l$ | 2.625" | 2.625" |
| $2r_s$ | 1.167" | 0.875" |
| $r_l/r_s$ | 2.25 | 3 |

Step 2710 is to calculate a strength ratio based on the strength of the braid material and the desired strength of an over-braided liner 100B. In various embodiments, such a ratio can be calculated based on characteristics of a selected braid material. For example, in one embodiment, one can calculate the value of β where the parameter β can be defined by $$\beta = \frac{16\pi}{3\sqrt{3}} \frac{v\eta\sigma}{p}.$$

v=fiber volume fraction in the braid,
η=fiber strength utilization,
σ=tensile strength of the individual fibers in the yarn,
p=desired burst pressure of the tank, The values of β for two example material options, carbon and Kevlar, are shown in the table below. More specifically, the table below illustrates material properties and calculated values of β. In this example, the value of η=0.63 is from the single-layer carbon burst test discussed above, and v=0.55 is the target fiber volume fraction in the braid.

However, other suitable materials can be used in other embodiments (e.g., Spectra, or the like), and β or other ratio based on the strength of the braid material and the desired strength of an over-braided liner 100 can be calculated empirically, based on observation, or based on reported characteristics of a given material.

|  | σ | p | v | η | β |
|---|---|---|---|---|---|
| Carbon T700S | 711 ksi | 8.1 ksi | 0.55 | 0.63 | 294 |
| Kevlar 49 | 435 ksi | 10.8 ksi | 0.55 | 0.63 | 135 |

Step 2715 is to determine an optimal braid angle on the smallest diameter portions of the tank 100 based on the determined size ratio (i.e., the determined ratio of the size of a largest diameter of the tank 100 and a smallest diameter of the tank 100). For example, in one embodiment, based on the calculated value of $r_l/r_s$, one can determine an optimal braid angle on the thin sections, $\theta_s$, as defined by $$\frac{\hat{R}}{r_s} = \sqrt{\frac{2\cos^2\theta_s}{1 - 2\cos^2\theta_s}} \tag{34}$$

or $$\hat{\theta}_s = \cos^{-1}\left(\sqrt{\frac{\left(\frac{R}{r_s}\right)^2}{2\left(\frac{R}{r_s}\right)^2 + 2}}\right),$$

Step 2720 is to calculate a jamming value defining a ratio of a minimum aspect ratio on the bend without jamming and a maximum aspect ratio on the bend without jamming, the ratio based on the ratio of the size of a largest diameter of the tank 100 and a smallest diameter of the tank 100 and based on the determined value for optimal braid angle on the smallest diameter portions of the tank 100. For example, in one embodiment, one can calculate the value of $g(\theta_s, r_l/r_s)$ using the value of $r_l/r_s$ for the liner and the chosen value of $\theta_s$. As discussed above, in various embodiments, $g(\theta_s, r_l/r_s)$ can be defined as $$g(\theta_s, r_\ell/r_s) = 3\left(\frac{r_s}{r_\ell}\right)^2 f(\theta_s, r_\ell/r_s). \tag{32}$$

$$\frac{AR_{min}}{AR_{max}} = g(\theta_s, r_\ell/r_s),$$

Step 2725 is to identify a target value of a minimum aspect ratio on the bend without jamming ($AR_{min}$) that will prevent the braid from jamming. For example, in EXAMPLE 1 above, it was experimentally determined that the braid jammed at $AR_{min}=1.41$. A target value for $AR_{min}$ that will prevent the braid from jamming can be determined in any suitable way, including generating the selected braid over a selected liner. Prior to bending, measuring the angle of the fibers of the braid. Bending the braided liner to the tightest bend radius possible and measuring this bend radius. Identifying a jammed location on the braid and using Eq. (9) above, estimating the aspect ratio at this jammed location.

Step 2730 is to determine a value for maximum aspect ratio on the bend without jamming based on the identified target value of a minimum aspect ratio on the bend without jamming. For example in one embodiment, one can calculate a maximum aspect ratio on the bend without jamming ($AR_{max}$) through $AR_{max} = AR_{min}/g(\ )$ using equation (32) (reproduced below).

$$\frac{AR_{min}}{AR_{max}} = g(\theta_s, r_f/r_s), \qquad (32)$$

Step 2735 is to determine the number of braid layers necessary to obtain full braid coverage on the tank 100. For example, if the calculated value of $AR_{max}$ is greater than an upper limit that denotes a lack of full coverage, one can determine how many layers, M, would be necessary to ensure full coverage overall. For example, in some embodiments, the maximum achievable value of $AR_{max}$, can be 10. Accordingly, if the calculated value of $AR_{max}$ is 11, two layers may be necessary to ensure full coverage when a braid is applied to the tank 100. In further embodiments, determining the number of layers necessary for full coverage can be done in various suitable ways, including generating a test braid.

Step 2740 is to determine a number of braid carriers based on the determined strength ratio, jamming value, number of layers and the minimum aspect ratio on the bend without jamming. With strength ratio (3, jamming value g( ), number of layers M, and the target value of the minimum aspect ratio on the bend without jamming $AR_{min}$, one can use (31) (reproduced below) to select an ideal value of N, the number of carriers.

$$\frac{\beta}{AR_{max}} = \frac{N}{M} = \frac{\beta g(\theta_s/r_f/r_s)}{AR_{min}}. \qquad (31)$$

However, in some embodiments, available braiding machines may not be able to accommodate the identified ideal number of carriers. If the ideal value is unavailable, it can be desirable to choose a braiding machine with a number of carriers N that is less than the identified ideal value, because in various embodiments, a larger number of carriers can be more likely to result in jamming. Where the number of carriers is modified from the determined ideal value, it can be desirable to determine whether the new $AR_{min}$ still avoids jamming, and that $AR_{max}$ gives full coverage with the number of layers, M.

Step 2745 is to determine a yarn weight based on the strength ratio, the selected number of carriers and the selected number of layers. For example in various embodiments, one can use Eq. (33) (reproduced below) to select a desired yarn weight, g, based on the calculated value of β, and the chosen values of N and M.

However, in various embodiments, the desired yarn weight may not be available. If the desired yarn weight does not exist or is otherwise not available, in some embodiments it can be desirable to select a yarn weight that is greater than the determined target value, because lower yarn weight can result in a lower likelihood of jamming. Where yarn weight has been modified from the calculated ideal yarn weight, it can be desirable to plug this new value N into Eq. (33), and recalculate $AR_{min}$ and $AR_{max}$ and determine if the new values of these aspect ratios still define a braid that is within acceptable parameters.

$$y = \frac{16\pi^2}{3NM} \cdot \frac{v}{\beta} \cdot r_t^2 \rho. \qquad (33)$$

Alternative Method of for Choosing a Braid Configuration

In an alternative embodiment, after selecting a liner geometry and a fiber/braid material, there are three parameters that can be chosen to specify a braid geometry: number of layers M, number of carriers N, and linear weight of the yarn y. These three parameters can determine three metrics of the tank performance: the burst pressure p, the fiber utilization η, and the minimum aspect ratio on the bend $AR_{min}$ (the maximum aspect ratio on the straight sections $AR_{max}$, can then related to $AR_{min}$ through $g(r_f/r_s, \theta_s)$).

$$\begin{array}{ccc} M & & p \\ N & \to & \eta \\ y & & AR_{min} \end{array}$$

In various embodiments, the fiber utilization, η, can also influence the burst pressure, p. In some implementations, burst tests have shown that light weight yarns give better fiber utilization, and that yarns with 12,000 filaments (with y=800 g/km) can provide a desirable balance between light weight for high fiber utilization but still giving enough weight to the braid to achieve a high burst pressure with minimal layers. Accordingly, in various embodiments, linear weight of the yarn, y, can set a value for fiber utilization, The number of carriers, N, and number of layers, M can then be chosen to achieve a burst pressure, p, that is above a desired threshold and a minimum aspect ratio $AR_{min}$ that is above the threshold for jamming, but not too high as to cause low coverage on the large sections through an overly high value of $AR_{max} = AR_{min}/g(r_f/r_s, \theta_s)$. In various embodiments, the number of carriers, N, and the number of layers, M, can be chosen together to satisfy these two criteria through the previously derived equations $$p = \frac{yNM\eta\sigma}{\pi\sqrt{3}\, r_t^2 \rho},$$

$$AR_{min} = \frac{16\pi^2 \rho v r_s^2}{N^2 f} f(\theta_s, R/r_s).$$

In some embodiments, the second equation can set carriers N, through jamming considerations, and then an appropriate number of layers M can be used to achieve the target burst pressure. However, in various embodiments, layers M must be an integer, and carriers N can be limited based on available braiding machines. Accordingly, in various embodiments layers M and carriers N can be set by these two limitations, and an exact burst pressure p and exact aspect ratio $AR_{min}$ may not be specifically achievable due to these limitations.

In further embodiments, an additional tool for tuning the configuration of a braid 300 can be to use layers of differing architecture. In some embodiments, finer tuning of burst pressure p can be achievable by having braid layers of differing architecture. In some embodiments, using layers of differing architecture can make it possible to use heavier yarns in one or more of the layers. For example, initial tests of some implementations have shown that if thin yarns are used on the inner layer, larger yarns may be used on the outer layer, a high fiber utilization can still be reached. In some embodiments, this can allow for fewer layers, thereby decreasing processing costs.

In various embodiments, the burst pressure p can be calculated from layers of mixed architecture by adding the burst pressures of each individual layer together, and the jamming criteria applies to the minimum of all layers, $$p = p_1 + p_2 + \ldots + p_M,$$

$$AR_{min} = \min(AR_{min,1}, AR_{min,2}, \ldots, AR_{min,M}).$$

Example 2: Determining Braid Parameters for Carbon Fiber on a Corrugated Liner In this non-limiting example implementation, $r_l/r_s = 2.25$ was initially defined. With $r_l/r'_s = 2.25$, we calculated $\theta_s$ 49.7°, and $g(\ ) = 0.114$. We selected $AR_{min} = 1.41$ as a target, based on the data from EXAMPLE 1 above, and calculated that $AR_{max} = 12.4$. Since a yarn is unlikely to flatten out beyond TO, $=10$, that means that the coverage factor of each layer will be around $10/12.4 = 0.81$. To compensate for this lower coverage factor, we choose an architecture with $M=2$ layers. With these values of M and $AR_{min}$, and a value of $\beta = 294$ for carbon, we calculated that $N = 47.5$. We selected $N = 46$, under an assumption that there is an available braiding machine with this number of carriers. Additionally, by selecting a fewer number of carriers than the ideal value, we moved further away from the jamming threshold. With all of these values, we calculate a desired yarn yield of $y = 2141$ g/km.

However, this specific yield does not exist, so we choose the next greatest one, which is $y = 2400$ g/km for 3-end of a T700S 12K fiber. As discussed above, choosing a yield greater than the target value allows for fewer carriers, which moved us further away from jamming. Since we have increased the yarn weight by a factor of 1.11, we decreased the carrier number by $1/1.11 = 0.90$, yielding $N = 42$ carriers. With this value of N, and the previously calculated values of $\beta$ and $g(\ )$, we calculated that the actual minimum aspect ratio would be $AR_{min} = 1.60$, which is above the threshold of 1.41. The actual maximum aspect ratio will be $AR_{max} = 14$, for which $M=2$ layers is probably sufficient. Thus, 3-end T700S 12K fibers with $M=2$ layers and $N=46$ carriers was the determined braid architecture in this example implementation.

Bending of Braided Liners

As discussed herein, tanks 100 can be bent and equipped with fittings to define a tank that can hold pressurized fluids (e.g. as show in FIGS. 4, 5a, 5b). During pressurization, the bent tanks can have a tendency to unbend or experience moments that would lead to unbending if uninhibited. In some embodiments, the cause for such unbending and/or unbending moments is that the fiber-angle of the liner braid 300 deviates from the ideal angle on the bent portion of the tanks. This generates a moment through the cross-section of the tank 100 that acts to unbend the tube. A tank must be outfitted with a fixture that resists this unbending moment. The following are example calculations that can be used to estimate the magnitude of such an unbending moment, and should be used to design a fixture to resist said unbending moment.

An additional adverse effect associated with the unbending moment is that the membrane tension in the axial direction on the outside of the bend is higher than it would be for a straight tube. This increased tension must be considered when designing a tank to ensure that it does not burst in this location.

For $\theta_s = 54.7°$, we can now calculate approximations for $\max(\overline{\gamma}_A)$ and $\tau$ that represent their accuracy within the order of the model in some embodiments. The expressions are $$\max(\gamma_A) \approx \frac{pr_s}{2}\left(1 + \frac{5r_s}{2R}\right), \quad (52)$$

$$\tau \approx \frac{5\pi p r_s^4}{4R}, \quad (53)$$

where both have a relative error of $\mathcal{O}((r_s/R)^2)$. This means that, for $R/r_s = 5$, for example, the error is an order-one multiple $(\frac{1}{5})^2 = 4\%$. The error could be 4%, or it could be 40%.

Example 3: Post-Burst 6-Layer Tanks

During previous testing, the 3-layer braid on a liner was observed to burst at $86 \pm 3$ MPa corresponding to a calculated average fiber utilization of $\eta = 78 \pm 3\%$. However, initial testing of a 6-layer braid resulted in a measured burst pressure of $141 \pm 3$ MPa, corresponding to a calculated average fiber utilization of $\eta = 64 \pm 1\%$. The burst pressures of these 6-layer samples are recorded in the table below. This fiber utilization in this example is much less than that measured for the 3-layer braid, so a theoretical study was conducted to determine possible reasons for this decreased efficiency.

As discussed herein, the average fiber utilization can be determined by dividing the measured burst pressure by the theoretical estimation of the burst pressure. This theoretical burst pressure can be calculated using a number of simplifying assumptions, including the thin wall assumption, whereby the tank wall is assumed to be infinitely thin, and the netting analysis assumption, whereby the fibers are assumed to be inextensible and to take the entirety of the load. Possible reasons for fiber utilization failing to reach 100% include damage to fibers during processing, fiber crimp (over-and-under angle), finite thickness effects, and the like.

In transitioning from the 3-layer braid to the 6-layer braid, a change to the composite can be that the thickness of the composite increased, meaning that finite thickness effects could be expected to be responsible for the decrease in measured fiber utilization.

To determine if this was the case, a theoretical model was developed to calculate the 3-dimensional elastic response of a cylinder composed of an arbitrary number of layers of anisotropic elastic laminates (referred to from here on as the "laminate model").

TABLE

| Test No. | Braid | Braid Angle | Burst Pressure (MPa) |
|---|---|---|---|
| 3 | 6-layer, 48-carrier, 12k Hyosung | 54.7° all | 139 |
| 4 | 6-layer, 48-carrier, 12k Hyosung | 54.7° all | 142 |
| 5 | 6-layer, 48-carrier, 12k Hyosung | 54.7° all | 137 |
| 6 | 6-layer, 48-carrier, 12k Hyosung | 54.7° all | 143 |

Example 4: Calculated Strain Profile for a 3-Layer Braid at 54.7°, Pressurized to 86 MPa The laminate model was first applied to the 3-layer braid that burst at $86 \pm 3$ MPa. The predicted strain profile at 86

Figure 28:
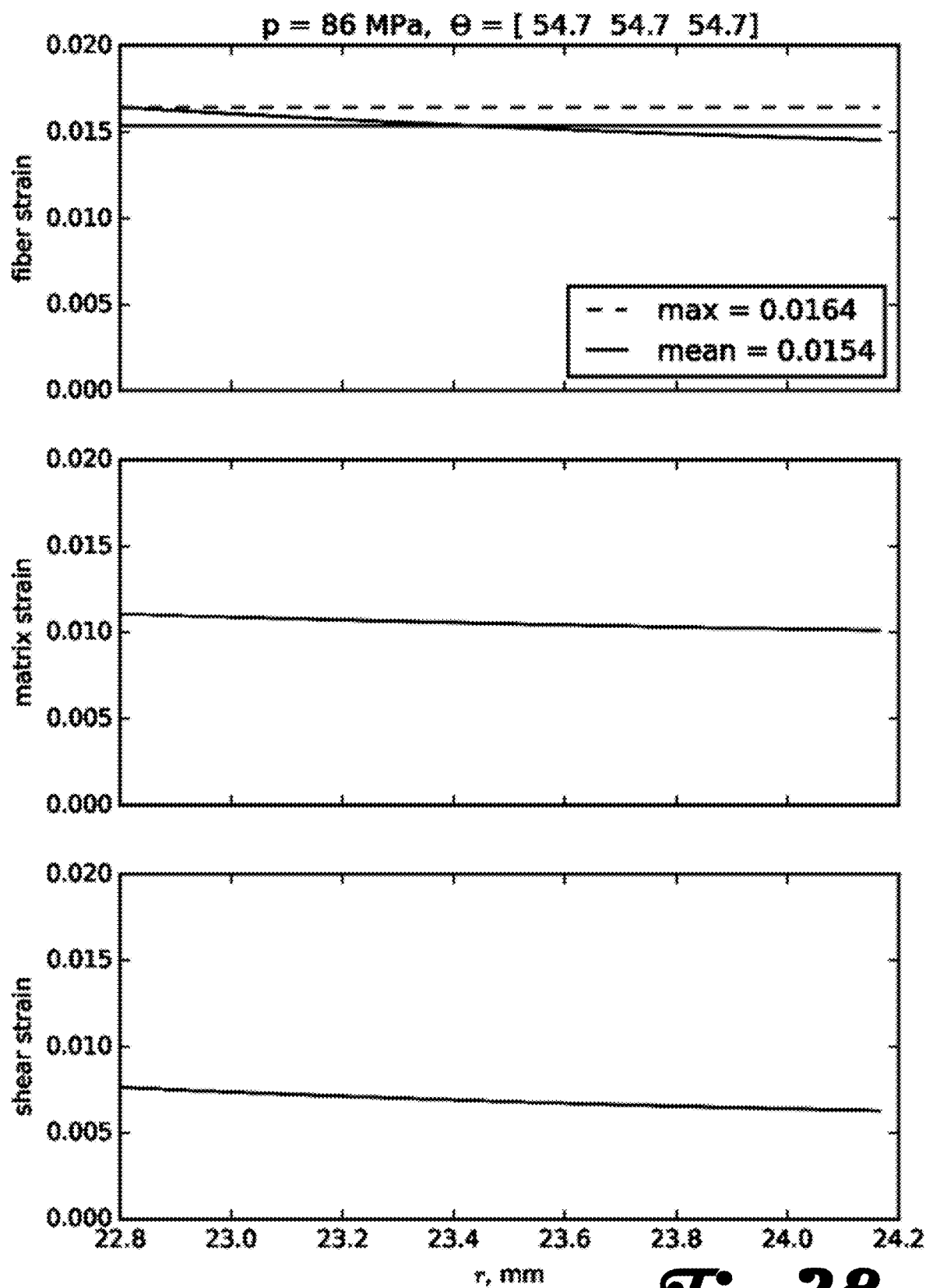
FIG. 28 illustrates plots of a calculated strain profile for a 3-layer braid at 54.7°, pressurized to 86 MPa.

MPa is shown in FIG. 28. The predicted fiber strain is plotted in the top plot, with an average fiber strain of $\varepsilon=0.0154$. Since the ultimate fiber strain for an example embodiment of carbon fiber is $\varepsilon=0.02$, this corresponds to an average fiber utilization of $0.0154/0.02=77\%$. This fiber utilization is nearly equal to that which was calculated using the thinwall and netting assumptions, thereby validating the new calculations.

The maximum fiber strain can also be a useful metric, since the pressure vessel bursts when any fiber reaches its maximum strain. Finite thickness effects can be responsible for the fact that the fiber strain is higher towards the inside of the pressure vessel than the outside. The maximum fiber strain occurs in this example at a fiber utilization of $0.0164/0.02=82\%$, indicating that for the example 3-layer braid, approximately 5% of the deviation from 100% fiber utilization can be caused by non-constant fiber strain through the thickness of the vessel.

Figure 29:
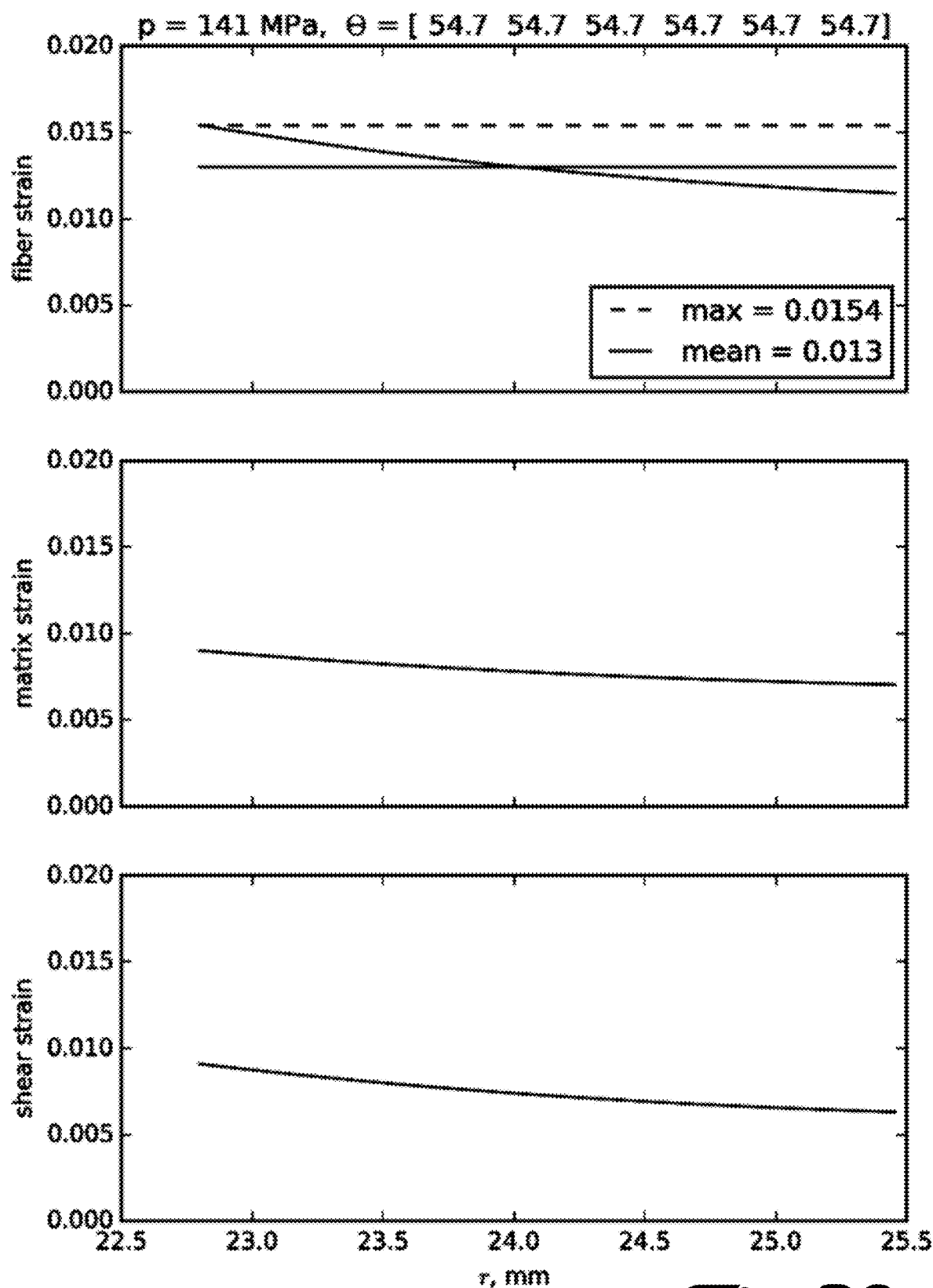
FIG. 29 illustrates plots of a calculated strain profile for a 6-layer braid at 54.7°, pressurized to 141 MPa.

Example 5: Calculated Strain Profile for a 6-Layer Braid at 54.7°, Pressurized to 141 MPa The laminate model was then applied to the 6-layer braid that burst at 141±3 MPa. The resulting strain profiles at 141 MPa are shown in FIG. 29. Note that the average fiber strain of $\varepsilon=0.0130$ corresponds to an average fiber utilization of $0.013/0.02=65\%$, which is again close to that which was calculated using the simplified model.

Another metric is the maximum fiber strain, which is $\varepsilon=0.0154$, corresponding to a maximum fiber utilization of $0.0154/0.02=77\%$. This fiber utilization is 5% less than the maximum fiber utilization predicted for the 3-layer case, and this difference can be accounted for with further analysis. However, there is a difference of $77\%-65\%=12\%$ between the maximum and average fiber utilization for the example 6-layer braid, meaning that 12% of the deviation from 100% can be caused by finite-thickness effects.

This analysis predicts that adopting a smarter fiber architecture, which better shares the load among all fibers, can result in a boost in the average fiber utilization of up to 12%.

Example 6: Calculated Strain Profile for a 7-Layer Braid

Using the laminate model, an optimization routine was run to determine a braid architecture that minimizes the difference in fiber strain through the thickness of the tank wall. It was found that architectures with increasing braid angle through the thickness are expected to perform the best in some embodiments.

Figure 30:
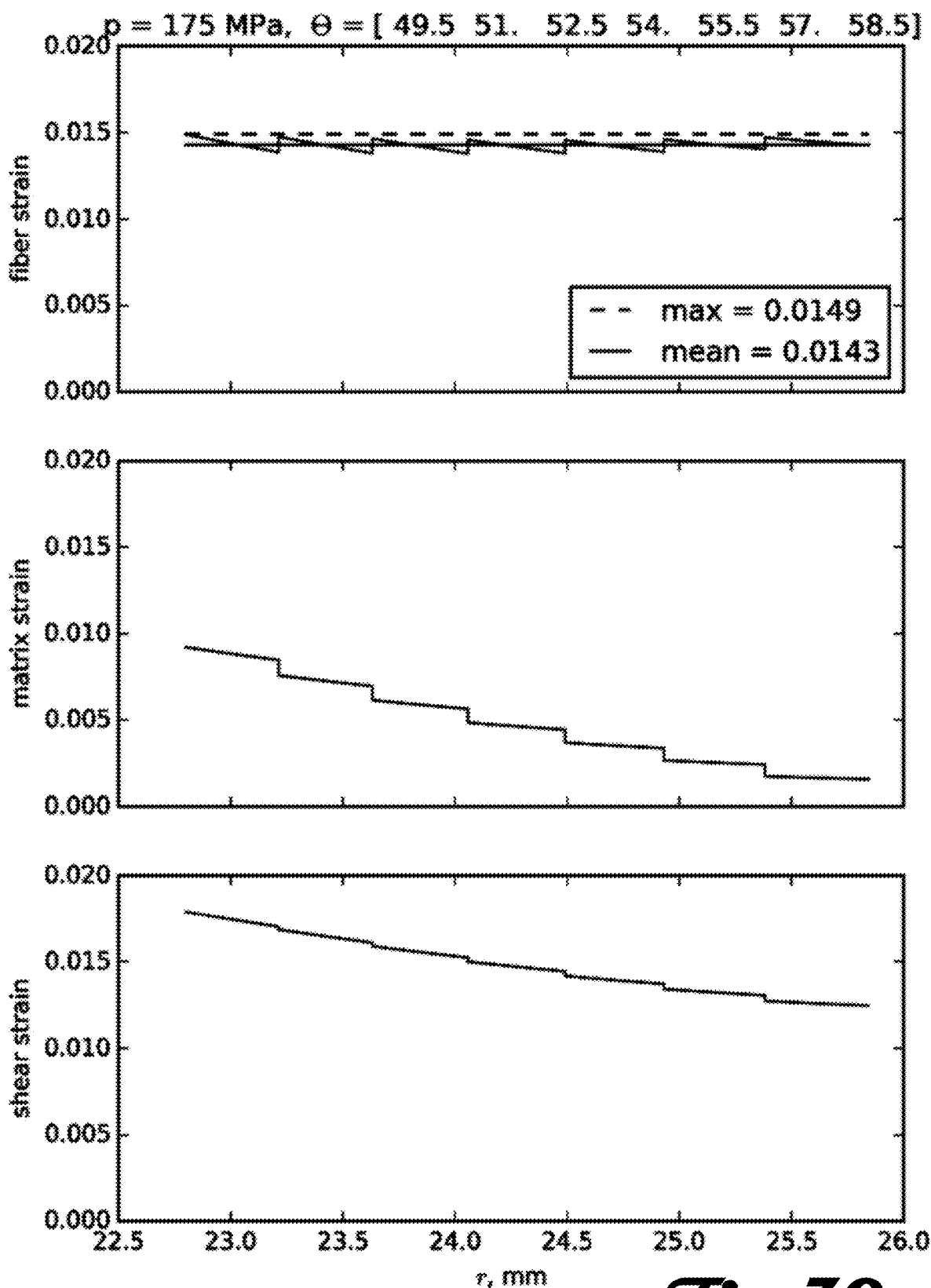
FIG. 30 illustrates plots of a calculated strain profile for a 7-layer braid.

Based on the best-case optimization, it was found that in some examples a 6-layer braid with optimized braid angles, pressurized to 175 MPa, can exceed the maximum fiber strain at which burst has been observed to occur. Therefore, a 7-layer braid with optimized braid angles was chosen as a candidate for optimized braid testing. The predicted strain profile of this candidate braid is shown in FIG. 30. Note that the average fiber strain in this example is $\varepsilon=0.0143$, corresponding to an average fiber utilization of 72%, whereas the maximum fiber strain in this example is $\varepsilon=0.0149$, corresponding to a maximum fiber utilization of 75%. This means only 3% of the deviation of 100% can be caused by finite-thickness effects. Furthermore, the woven nature of the braid may smooth out variations in fiber strain within one braid layer, so the actual difference in strain may be even less in some examples.

In some examples, the expected maximum shear strain of this braid architecture is higher than has been tested before, so the composite could fail due to a shear-induced failure mode. However, the estimates of shear strain produced by the laminate model are all highly conservative, since the matrix and shear stiffness in the laminate model is reduced by a multiplier of 0.3, so in various examples, the strain should still be within a range that can be accommodated by the composite.

To calculate an "expected burst pressure" to be used as the denominator in calculating fiber utilization with observed burst pressure in the numerator, we can deduce the burst pressure that would correspond to an average fiber strain of $\varepsilon=0.02$. Since the laminate model only involved linear elasticity in various examples, we can just scale the expected burst pressure from the results at 175 MPa. The average fiber strain expected at 175 MPa is $\varepsilon=0.0143$, the "expected burst pressure" is $175*0.02/0.0143=245$ MPa.

As discussed herein, the more sophisticated laminate model can illustrate that in some examples a certain percentage of lost fiber utilization is not accounted for by strain variations through the thickness of the braid. Even for the examples of the 3-layer braid, the fibers that were strained to the greatest extent only reached 82% of their predicted ultimate strain, indicating that other imperfections can be responsible for the last 18% of the predicted fiber utilization.

Example 7: Calculated Strain Profile for a 6-Layer Braid at 55.5°, Pressurized to 141 MPa To test the influence of resin strength, example prototypes can be tested with a uniform braid angle of 55.5°. At this braid angle, the laminate model predicts that the average hoop-axial shear strain will be nearly zero in some examples. This angle also corresponds to the ideal braid angle in some examples that results from treating the pressure vessel with a version of the thin-wall netting analysis that is modified to account for first-order effects of the finite thickness of the pressure vessel.

Figure 31:
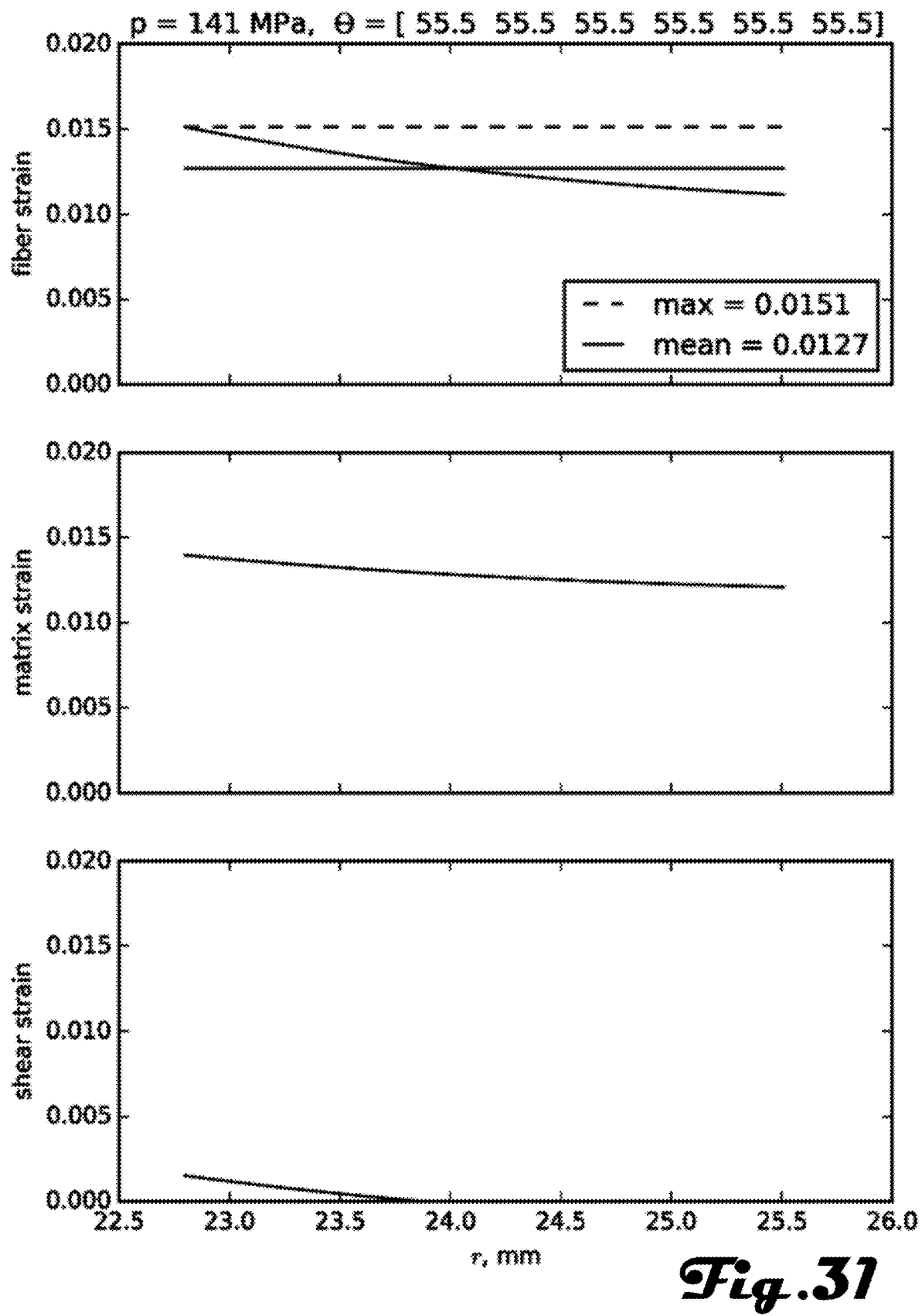
FIG. 31 illustrates plots of a calculated strain profile for a 6-layer braid at 55.5°, pressurized to 141 MPa.

With an inner radius, r, and a pressure vessel thickness, t, the formula for the braid angle for a thick-walled pressure vessel can be:

$$\theta=\tan^{-1}(\sqrt{2+t/r})$$

and for the 6-layer braid, with r=22.8 mm and t=2.7 mm, this formula yields θ=55.5°. The predicted strain profile for this example braid is shown in FIG. 31. Note that the shear strain is negative past r=24.0 mm, but in this example, the axes scales are kept the same to allow for comparison to strain profiles of other braids. Note, too, that in this example the maximum and average fiber strain are nearly the same as for various examples of the 6-layer braid at 54.7°, whereas the matrix strain is slightly higher.

The results of this test can yield information on whether matrix strength properties are influencing the burst pressure significantly in some examples. If the burst pressure is higher than for the 54.7° case, that can indicate that hoop-axial shear was contributing to lower than expected burst pressures, and if the burst pressure is lower it can implicate matrix strain.

Another possible cause for the lower-than-ideal burst pressure in some examples can be weakening of the fibers themselves, relative to their rated strength. This weakening can be caused by defects introduced during manufacturing, by damage during processing (braiding, winding, resin impregnation), or the like.

In some examples Toray T700S fibers (Toray Industries, Inc. of Japan) can be used since they can have strength comparable to the Hyosung H2550 fibers (Hyosung Corporation of South Korea) that was used before in previous example testing. Previous example testing indicated that the T700S performed less well than the H2550 in some examples, but the difference between the two was within the experimental noise, and the experiments were performed on an earlier example prototype that was created on an earlier version of a pilot production line.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives. Although specific embodiments are shown and described herein, further embodiments can include or specifically exclude various elements of the embodiments shown and described herein.

What is claimed is:

1. A method of making a tank for storing compressed fluid, the method comprising:
    generating a plurality of resinated braid layers on an elongated liner, the liner comprising a hollow body defining a plurality of successively alternating connector portions and tubing portions along a length of the liner, with the connector portions having a smallest first diameter than a largest second diameter of the tubing portions and with adjacent connector portions and tubing portions coupled by respective taper portions, a plurality of the connector portions comprising a flexible corrugated portion, the liner configured to be folded such that the tubing portions are disposed parallel and adjacent to each other with the connector portions forming a bend, the generating a plurality of resinated braid layers on the liner including:
        calculating a size ratio based on the smallest first diameter and the largest second diameter of the liner;
        selecting a braid material, the braid material having a tensile strength;
        calculating a strength ratio based on the tensile strength of the braid material and a selected target strength threshold for the tank;
        determining an optimal braid angle for the smallest first diameter portions of the liner based on the calculated size ratio;
        calculating a braid jamming value defining a ratio of a minimum aspect ratio on the bend without braid jamming and a maximum aspect ratio on the bend without braid jamming, the ratio based on size ratio based on the smallest first diameter and the largest second diameter of the liner and based on the determined optimal braid angle on the smallest first diameter portions of the liner;
        identifying a target value of a minimum aspect ratio on the bend without braid jamming that will prevent the braid from jamming;
        determining a value for maximum aspect ratio on the bend without braid jamming based on the identified target value of the minimum aspect ratio on the bend without braid jamming;
        determining a number of braid layers necessary to obtain a full braid coverage on the liner;
        determining a number of braid carriers based on the calculated strength ratio, the braid jamming value, the determined number of layers necessary to obtain a full braid coverage on the liner, and the identified target value of the minimum aspect ratio on the bend without braid jamming;
        determining a yarn weight based on the strength ratio, the determined number of braid carriers and the determined number of layers necessary to obtain a full braid coverage on the liner;
        generating a plurality of braid layers over the liner comprising the selected braid material, with the number of braid layers corresponding to the determined number of layers necessary to obtain a full braid coverage on the liner and with the braid layers being braided corresponding to the optimal braid angle, the determined number of braid carriers and the determined yarn weight; and
    applying resin to one or more of the generated braid layers.

2. The method of claim 1, wherein the selected braid material comprises at least one of carbon fiber, Kevlar fiber or Spectra fiber.

3. The method of claim 1, wherein the determining a number of braid carriers is further based on braiding machine limitations, and wherein the determined number of braid carriers is less than an identified ideal number of braid carriers.

4. The method of claim 1, wherein the determining the yarn weight is further based on available yarn parameters, and wherein the determined yarn weight is less than a determined ideal yarn weight target value.

5. The method of claim 1, wherein the selected target strength threshold for the tank comprises a selected burst pressure threshold for the tank.

6. The method of claim 1, wherein the optimal braid angle is between 54.7° and 55.5°.

7. The method of claim 1, wherein the number of braid layers is three, six or seven.

8. A method of making a tank, the method comprising:
    generating one or more braid layers on an elongated liner, the liner comprising a hollow body defining a plurality of successively alternating connector portions and tubing portions along a length of the liner, with the connector portions having a smallest first diameter than a largest second diameter of the tubing portions and with adjacent connector portions and tubing portions coupled by respective taper portions, a plurality of the connector portions comprising a flexible portion, the liner configured to be folded such that the tubing portions are disposed parallel and adjacent to each other with the flexible connector portions forming a bend, the generating one or more braid layers on the liner including:
        calculating a size ratio based on the smallest first diameter and the largest second diameter of the liner;
        selecting a braid material, the braid material having a tensile strength;
        calculating a strength ratio based on the tensile strength of the braid material and a selected target strength threshold for the tank, the calculated strength ratio used to determine a number of braid carriers and/or a yarn weight;
        determining an optimal braid angle for the smallest first diameter portions of the liner based on the calculated size ratio; and
        generating one or more braid layers over the liner comprising the selected braid material and with the one or more braid layers being braided corresponding to the optimal braid angle.

9. The method of claim 8, wherein the generating one or more braid layers on the liner further includes:
   determining a plurality number of braid layers necessary to obtain a full braid coverage on the liner; and
   generating a plurality of braid layers over the liner corresponding to the determined plurality number of braid layers necessary to obtain a full braid coverage on the liner.

10. The method of claim 9, wherein the generating one or more braid layers on the liner further includes:
    calculating a braid jamming value defining a ratio of a minimum aspect ratio on the bend without braid jamming and a maximum aspect ratio on the bend without braid jamming, the ratio based on size ratio based on the smallest first diameter and the largest second diameter of the liner and based on the determined optimal braid angle on the smallest first diameter portions of the liner;
    identifying a target value of a minimum aspect ratio on the bend without braid jamming that will prevent the braid from jamming; and
    determining a value for maximum aspect ratio on the bend without braid jamming based on the identified target value of the minimum aspect ratio on the bend without braid jamming.

11. The method of claim 10, wherein the generating one or more braid layers on the liner further includes:
    determining a number of braid carriers based on the calculated strength ratio, the braid jamming value, the determined number of layers necessary to obtain a full braid coverage on the liner, and the identified target value of the minimum aspect ratio on the bend without braid jamming;
    determining a yarn weight based on the strength ratio, the determined number of braid carriers and the determined number of layers necessary to obtain a full braid coverage on the liner; and
    generating the one or more braid layers over the liner further corresponding to the determined number of braid carriers and the determined yarn weight.

12. The method of claim 11, wherein the determining a number of braid carriers is further based on braiding machine limitations, and wherein the determined number of braid carriers is less than an identified ideal number of braid carriers.

13. The method of claim 11, wherein the determining the yarn weight is further based on available yarn parameters, and wherein the determined yarn weight is less than a determined ideal yarn weight target value.

14. The method of claim 8, wherein the optimal braid angle is 54.7°.

15. The method of claim 8, wherein the number of braid layers is three or more.

16. A method of making a braided liner, the method comprising: selecting a braid configuration for the braided liner having a liner comprising a hollow body defining a plurality of successively alternating connector portions and tubing portions along a length of the liner, with the connector portions having a smallest first diameter than a largest second diameter of the tubing portions and with adjacent connector portions and tubing portions coupled by respective taper portions, a plurality of the connector portions comprising a flexible portion, the liner configured to be folded such that the tubing portions are disposed parallel and adjacent to each other with the flexible connector portions forming a bend, the selecting the braid configuration for the liner including:
    calculating a size ratio based on the smallest first diameter and the largest second diameter of the liner;
    selecting a braid material, the braid material having a tensile strength;
    calculating a strength ratio based on the tensile strength of the braid material and the calculated strength ratio used to determine a number of braid carriers and/or a yarn weight; and
    determining an optimal braid angle for the smallest first diameter portions of the liner based on the calculated size ratio; and generating one or more braid layers over the liner comprising the selected braid material and with the one or more braid layers being braided corresponding to the optimal braid angle.

17. The method of claim 16, wherein the selecting the braid configuration for the liner further includes determining a plurality number of braid layers necessary to obtain a full braid coverage on the liner.

18. The method of claim 17, the selecting the braid configuration for the liner further includes:
    calculating a braid jamming value defining a ratio of a minimum aspect ratio on the bend without braid jamming and a maximum aspect ratio on the bend without braid jamming, the ratio based on size ratio based on the smallest first diameter and the largest second diameter of the liner and based on the determined optimal braid angle on the smallest first diameter portions of the liner;
    identifying a target value of a minimum aspect ratio on the bend without braid jamming that will prevent the braid from jamming; and
    determining a value for maximum aspect ratio on the bend without braid jamming based on the identified target value of the minimum aspect ratio on the bend without braid jamming.

19. The method of claim 18, the selecting the braid configuration for the liner further includes:
    determining a number of braid carriers based on the calculated strength ratio, the braid jamming value, the determined number of layers necessary to obtain a full braid coverage on the liner, and the identified target value of the minimum aspect ratio on the bend without braid jamming; and
    determining a yarn weight based on the strength ratio, the determined number of braid carriers and the determined number of layers necessary to obtain a full braid coverage on the liner.

* * * * *